US008873070B2

(12) United States Patent
Okutsu et al.

(10) Patent No.: US 8,873,070 B2
(45) Date of Patent: Oct. 28, 2014

(54) IMAGE PROCESSING APPARATUS AND METHOD OF STARTING IMAGE PROCESSING APPARATUS

(75) Inventors: Toshihisa Okutsu, Kawasaki (JP); Hidetoshi Tanno, Kawasaki (JP); Takahiro Haraguchi, Kawasaki (JP); Makoto Kikugawa, Tokyo (JP); Junichi Goda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1056 days.

(21) Appl. No.: 11/624,138

(22) Filed: Jan. 17, 2007

(65) Prior Publication Data

US 2007/0206211 A1 Sep. 6, 2007

(30) Foreign Application Priority Data

Jan. 19, 2006 (JP) ................................ 2006-010655

(51) Int. Cl.
*G06K 15/00* (2006.01)
*G03G 15/00* (2006.01)

(52) U.S. Cl.
CPC ...... *G03G 15/50* (2013.01); *G03G 2215/00126* (2013.01)
USPC .......... 358/1.13; 358/1.14; 709/227; 717/174

(58) Field of Classification Search
USPC ................................ 358/1.1, 1.13, 1.14, 1.15
See application file for complete search history.

(56) References Cited

U.S. PATENT DOCUMENTS 5,550,997 A * 8/1996 Ip et al. ......................... 711/103
5,963,337 A 10/1999 Inui
6,252,609 B1 * 6/2001 Kanno .......................... 345/501
6,564,177 B1 5/2003 Matsunaga
6,671,565 B1 * 12/2003 Kobayashi ...................... 700/75
6,799,315 B2 * 9/2004 Waki et al. .................... 717/148
6,947,162 B2 * 9/2005 Rosenberg et al. .......... 358/1.15
7,058,332 B2 6/2006 Moroi
7,085,420 B2 * 8/2006 Mehrotra ...................... 382/232
7,362,983 B2 4/2008 Moroi
7,574,156 B2 8/2009 Moroi
7,577,943 B2 * 8/2009 Chilimbi et al. .............. 717/130
7,809,297 B2 10/2010 Moroi
7,817,298 B2 * 10/2010 Tanno et al. ................. 358/1.16
7,839,930 B2 * 11/2010 Holcomb et al. ........ 375/240.13

(Continued)

FOREIGN PATENT DOCUMENTS

CN 001570884 A 1/2005
CN 001609803 A 4/2005

(Continued)

OTHER PUBLICATIONS

Fasoldt, Make your own launcher for startup programs, 1998, 2001, http://web.archive.org/web/20011224120720/http://www.aroundcny.com/technofile/texts/bklauncher98.html.*

*Primary Examiner* — Ashish K Thomas
(74) *Attorney, Agent, or Firm* — Canon U.S.A., Inc. IP Division

(57) ABSTRACT

An image processing apparatus has a plurality of functions and is adapted to make one or more functions operable by activating programs corresponding to functions. The image processing apparatus includes a selection unit adapted to select a function to be enabled in advance to the other functions when power of the image processing apparatus is turned on or when operation of the image processing apparatus is resumed from a low-power standby state, and a control unit adapted to perform control such that a program corresponding to the function selected by the selection unit is made executable in advance to the other programs.

7 Claims, 42 Drawing Sheets

(56) References Cited

U.S. PATENT DOCUMENTS

| | | | | |
|---|---|---|---|---|
| 7,941,541 | B2 * | 5/2011 | Chang et al. | 709/227 |
| 2001/0010704 | A1 | 8/2001 | Schelstraete | |
| 2001/0040704 | A1 | 11/2001 | Kanno | |
| 2003/0103232 | A1 | 6/2003 | Twede | |
| 2003/0217359 | A1 | 11/2003 | Ohi | |
| 2004/0258429 | A1 | 12/2004 | Moroi | |
| 2005/0253823 | A1 | 11/2005 | Kazama et al. | |
| 2006/0028903 | A1 | 2/2006 | Hada | |
| 2006/0075150 | A1 | 4/2006 | Hwang | |
| 2006/0188282 | A1 | 8/2006 | Moroi | |
| 2008/0226327 | A1 | 9/2008 | Moroi | |
| 2009/0263152 | A1 | 10/2009 | Moroi | |

FOREIGN PATENT DOCUMENTS

| | | | | |
|---|---|---|---|---|
| CN | 001684490 | A | 10/2005 | |
| CN | 1756288 | A | 4/2006 | |
| EP | 1445940 | A2 | 8/2004 | |
| JP | 07-271603 | A | 10/1995 | |
| JP | 10-063487 | A | 3/1998 | |
| JP | 11252289 | A * | 9/1999 | H04N 1/00 |
| JP | 2000-020285 | A | 1/2000 | |
| JP | 2000-263847 | A | 9/2000 | |
| JP | 2000-322264 | A | 11/2000 | |
| JP | 2001-117707 | A | 4/2001 | |
| JP | 2002-014817 | A | 1/2002 | |
| JP | 2003-280916 | A | 10/2003 | |
| JP | 2004-249722 | A | 9/2004 | |
| JP | 2005-094301 | A | 4/2005 | |
| JP | 2005-293472 | A | 10/2005 | |
| JP | 2005-318280 | A | 11/2005 | |
| JP | 2006-074747 | A | 3/2006 | |
| WO | 2004/066072 | A2 | 8/2004 | |
| WO | 2004/111822 | A1 | 12/2004 | |

* cited by examiner

FIG. 11

1720

| MANAGEMENT NUMBER (1720a) | FUNCTION NAME (1720b) | PRIORITY FUNCTION FLAG (1720c) | LOAD COMPLETION FLAG (1720d) |
|---|---|---|---|
| 0 | COPY | false | false |
| 1 | FAX | false | false |
| 2 | SCAN | false | false |
| 3 | PRINTER | false | false |

FIG. 38

| DIRECTORY INFORMATION |
|---|
| FIRST DATA PROCESSING PROGRAM<br>SET OF PROGRAM CODES CORRESPONDING TO STEPS OF FLOW CHART SHOWN IN FIG. 6 |
| SECOND DATA PROCESSING PROGRAM<br>SET OF PROGRAM CODES CORRESPONDING TO STEPS OF FLOW CHART SHOWN IN FIGS. 7A AND 7B |
| THIRD DATA PROCESSING PROGRAM<br>SET OF PROGRAM CODES CORRESPONDING TO STEPS OF FLOW CHART SHOWN IN FIG. 12 |
| FOURTH DATA PROCESSING PROGRAM<br>SET OF PROGRAM CODES CORRESPONDING TO STEPS OF FLOW CHART SHOWN IN FIG. 13 |
| FIFTH DATA PROCESSING PROGRAM<br>SET OF PROGRAM CODES CORRESPONDING TO STEPS OF FLOW CHART SHOWN IN FIG. 18 |
| SIXTH DATA PROCESSING PROGRAM<br>SET OF PROGRAM CODES CORRESPONDING TO STEPS OF FLOW CHART SHOWN IN FIG. 22 |
| SEVENTH DATA PROCESSING PROGRAM<br>SET OF PROGRAM CODES CORRESPONDING TO STEPS OF FLOW CHART SHOWN IN FIG. 23 |
| EIGHT DATA PROCESSING PROGRAM<br>SET OF PROGRAM CODES CORRESPONDING TO STEPS OF FLOW CHART SHOWN IN FIG. 28 |
| NINTH DATA PROCESSING PROGRAM<br>SET OF PROGRAM CODES CORRESPONDING TO STEPS OF FLOW CHART SHOWN IN FIG. 29 |
| TENTH DATA PROCESSING PROGRAM<br>SET OF PROGRAM CODES CORRESPONDING TO STEPS OF FLOW CHART SHOWN IN FIG. 33 |
| ELEVENTH DATA PROCESSING PROGRAM<br>SET OF PROGRAM CODES CORRESPONDING TO STEPS OF FLOW CHART SHOWN IN FIG. 37 |

IMAGE PROCESSING APPARATUS AND METHOD OF STARTING IMAGE PROCESSING APPARATUS

BACKGROUND OF THE INVENTION

1. Field of the Invention

The present invention relates to a technique to reduce time needed to enable a desired function of an image processing apparatus.

2. Description of the Related Art

In an image processing apparatus such as a digital multifunction apparatus (also called a multifunction peripheral (MFP)), it is known to store a program in the form of a binary image on a hard disk and execute the program by a CPU after loading the program from the hard disk into a RAM.

A typical digital multifunction apparatus is capable of executing a plurality of functions such as a copy function, a printer function, etc., and the program is configured to achieve these respective functions. As the digital multifunction apparatus has higher performance and/or a greater number of functions, the size of the program in the form of the binary image increases. This results in an increase in time needed to load the program from the hard disk into the RAM, and thus a user has to wait for a long time until the digital multifunction apparatus becomes ready to be used.

That is, a user has to wait until the whole program has been loaded into the RAM even when the user wants to use only a particular function.

Japanese Patent Laid-Open No. 2000-20285 discloses a technique to install a plurality of operating systems (OS) on a device and selectively load an operating system as required. However, this technique allows it to simply select an OS and a reduction in the starting time of the device is not achieved.

Japanese Patent Laid-Open No. 2000-322264 discloses a technique to split a program into a plurality of program modules. This makes it possible to load a particular program module into a RAM and execute it without having to load all program modules. However, in this technique disclosed in Japanese Patent Laid-Open No. 2000-322264, the program modules are loaded in a predetermined order, and it is not allowed to change the order of loading the program modules as required. When a user wants to use a particular function, if a program module of this function is not loaded at an early stage in the program loading process, this technique is not useful for the user. For example, when it is specified to load program modules in the order a copy program, a scan program, a send program, and a facsimile program, if a user wants to use the facsimile function, the user has to wait until all programs modules have been loaded because the facsimile program module is loaded at last. Thus, for this user, no reduction in the waiting time is achieved.

SUMMARY OF THE INVENTION

In view of the above, the present invention provides a technique to start an image processing apparatus in a short time when electric power of the image processing apparatus is turned on or when the operation of the image processing apparatus is resumed from a low-power standby state thereby providing great convenience to users.

More specifically, the present invention provides an image processing apparatus having a plurality of functions and being configured to make the functions operable by activating respective programs corresponding to the functions, including a selection unit configured to select a function in accordance with a command issued by a user when power of the image processing apparatus is turned on or when operation of the image processing apparatus is resumed from a low-power standby state, and a control unit configured to perform control such that a program corresponding to the function selected by the selection unit is made executable in advance to the other programs.

The present invention also provides an image processing apparatus having a plurality of functions and being configured to make the functions operable by activating respective programs corresponding to the functions, including a storage unit configured to store a plurality of programs corresponding to the respective functions, a reading unit configured to read data from a removable storage medium when power of the image processing apparatus is turned on or when operation of the image processing apparatus is resumed from a low-power standby state, and a control unit configured to, if the data read by the reading unit includes priority function information indicating a function to be activated preferentially in advance to the other functions, read a program corresponding to the function indicated by the priority function information and making the program executable, in advance to the other programs.

The present invention also provides an image processing apparatus having a plurality of functions and being configured to make the functions operable by activating respective programs corresponding to the functions, including a storage unit configured to store, in connection with each piece of user information, priority function information indicating a function to be activated preferentially in advance to the other functions, an input unit configured to input user information when power of the image processing apparatus is turned on or when operation the image processing apparatus is resumed from a low-power standby state, a control unit configured to perform control such that when the storage unit includes priority function information corresponding to user information input via the input unit, a program specified by the priority function information is activated so as to become executable in advance to the other programs.

The present invention also provides an image processing apparatus having a plurality of functions and being configured to make the functions operable by activating respective programs corresponding to the functions, including a detection unit configured to detect whether a document is set on a reading unit configured to read an image from a document or on a document feeding unit configured to feed documents to the reading unit, and a control unit configured to perform control such that when power of the image processing apparatus is turned on or when operation of the image processing apparatus is resumed from a low-power standby state, if the detection unit detects that a document is set on the reading unit or the document feeding unit, a program corresponding to a function of reading the document is activated so as to become executable in advance to the other programs.

The present invention also provides an image processing apparatus having a plurality of functions and being configured to make the functions operable by activating programs corresponding to the functions, including an acceptance unit configured to accept a command to turn on the power of the image processing apparatus or resume operation of the image processing apparatus from a low-power standby state, a control unit configured to, when an operation associated with a particular function is performed within a predetermined time period after the acceptance means accepts the command, activate a program corresponding to the particular function so as to become executable in advance to the other programs.

The present invention also provides an image processing apparatus having a plurality of functions and being configured to make the functions operable by activating respective programs corresponding to the functions, including a storage unit configured to store numbers of times the functions have been used, separately for each function, a control unit configured to, when power of the image processing apparatus is turned on or when operation of the image processing apparatus is resumed from a low-power standby state, controlling the order of activating the programs corresponding to the respective functions, in accordance with counts stored in the storage unit in terms of the numbers of times the respective functions have been used.

The present invention also provides an image processing apparatus having a plurality of functions and being configured to make the functions operable by activating respective programs corresponding to the functions, including one or more interface units configured to interface with one or more external apparatus, a control unit configured to, when power of the image processing apparatus is turned on or when operation of the image processing apparatus is resumed from a low-power standby state, control the order of activating the programs on the basis of a connection status of at least one or more of the interface units.

The present invention also provides a method of controlling an image processing apparatus having a plurality of functions and being configured to make the functions operable by activating respective programs corresponding to the functions, including selecting a function in accordance with a command issued by a user when power of the image processing apparatus is turned on or the image processing apparatus is resumed from a low-power standby state, and performing control such that a program corresponding to the selected function is made executable in advance to the other programs.

The present invention also provides a method of controlling an image processing apparatus having a plurality of functions and being configured to make the functions operable by activating respective programs corresponding to the functions, including reading data from a removable storage medium when power of the image processing apparatus is turned on or when operation of the image processing apparatus is resumed from a low-power standby state, if the data read in the reading step includes priority function information specifying a function to be made usable in advance to the other functions, activating a program corresponding to the function specified by the priority function information so as to become executable in advance to the other programs.

The present invention also provides a method of controlling an image processing apparatus having a plurality of functions and including storage unit for storing, in connection with each piece of user information, priority function information indicating a function to be activated preferentially in advance to the other functions, the image processing apparatus being capable of making functions operable by activating respective programs corresponding to the respective functions. The method includes inputting user information when power of the image processing apparatus is turned on or the image processing apparatus is resumed from a low-power standby state, and when the storage unit includes priority function information corresponding to user information input, activating a program corresponding to a function specified by the priority function information so as to become executable in advance to the other programs.

The present invention also provides a method of controlling an image processing apparatus having a plurality of functions and being configured to make the functions operable by activating respective programs corresponding to the functions, including, when power of the image processing apparatus is turned on or when operation of the image processing apparatus is resumed from a low-power standby state, detecting whether a document is set on a reading unit for reading an image from a document or on document feeding unit for feeding documents to the reading unit, and if it is detected that a document is set on the reading unit for reading an image from a document or on document feeding unit for feeding documents to the reading unit, activating a program corresponding to a document reading function so as to become executable in advance to the other programs.

The present invention also provides a method of controlling an image processing apparatus having a plurality of functions and being adapted to make the functions operable by activating respective programs corresponding to the functions, including accepting a command to turn on the power of the image processing apparatus or resume the image processing apparatus from a low-power standby state, when an operation associated with a particular function is performed within a predetermined time period after the command is accepted, activating a program corresponding to the particular function so as to become executable in advance to the other programs.

The present invention also provides a method of controlling an image processing apparatus having a plurality of functions and being configured to make the functions operable by activating respective programs corresponding to the functions, including storing, in a storage unit, numbers of times the functions have been used separately for each function, and in a starting procedure performed after the power of the image processing apparatus is turned on or in a similar restarting procedure performed after operation of the image processing apparatus is resumed from a low-power standby state, activating programs in the order of highest to lowest number of times of usage on the basis of the numbers, stored in the storing step, of times the respective functions have been used.

The present invention also provides a method of controlling an image processing apparatus having one or more interface units for interfacing with one or more external apparatus and being capable of executing a plurality of functions by activating respective programs corresponding to the functions, comprising, when power of the image processing apparatus is turned on or when operation of the image processing apparatus is resumed from a low-power standby state, detecting a connection status of at least one of the interface unit, controlling the order of activating the plurality of programs on the basis of the result of the detection.

The present invention also provides a computer readable medium containing computer-executable instructions for controlling an image processing apparatus having a plurality of functions and being configured to make the functions operable by activating respective programs corresponding to the functions. The computer readable medium includes computer-executable instructions for reading data from a removable storage medium when power of the image processing apparatus is turned on or when operation of the image processing apparatus is resumed from a low-power standby state; and computer-executable instructions for, if the data read includes priority function information specifying a function to be made usable in advance to the other functions, activating a program corresponding to the function specified by the priority function information so as to become executable in advance to the other programs.

Further features and aspects of the present invention will become apparent from the following description of exemplary embodiments with reference to the attached drawings.

BRIEF DESCRIPTION OF THE DRAWINGS

FIG. 11 shows an example of a program load management table according to an embodiment of the present invention.

FIG. 38 is a diagram showing an exemplary memory map of a storage medium that stores various data processing programs readable by an image processing apparatus (digital multifunction apparatus) according to an embodiment of the present invention.

DESCRIPTION OF THE EMBODIMENTS

The present invention is described in further detail below with reference to exemplary embodiments in conjunction with the accompanying drawings.

First Exemplary Embodiment

[Exemplary Configuration of Image Forming System]

Figure 1:
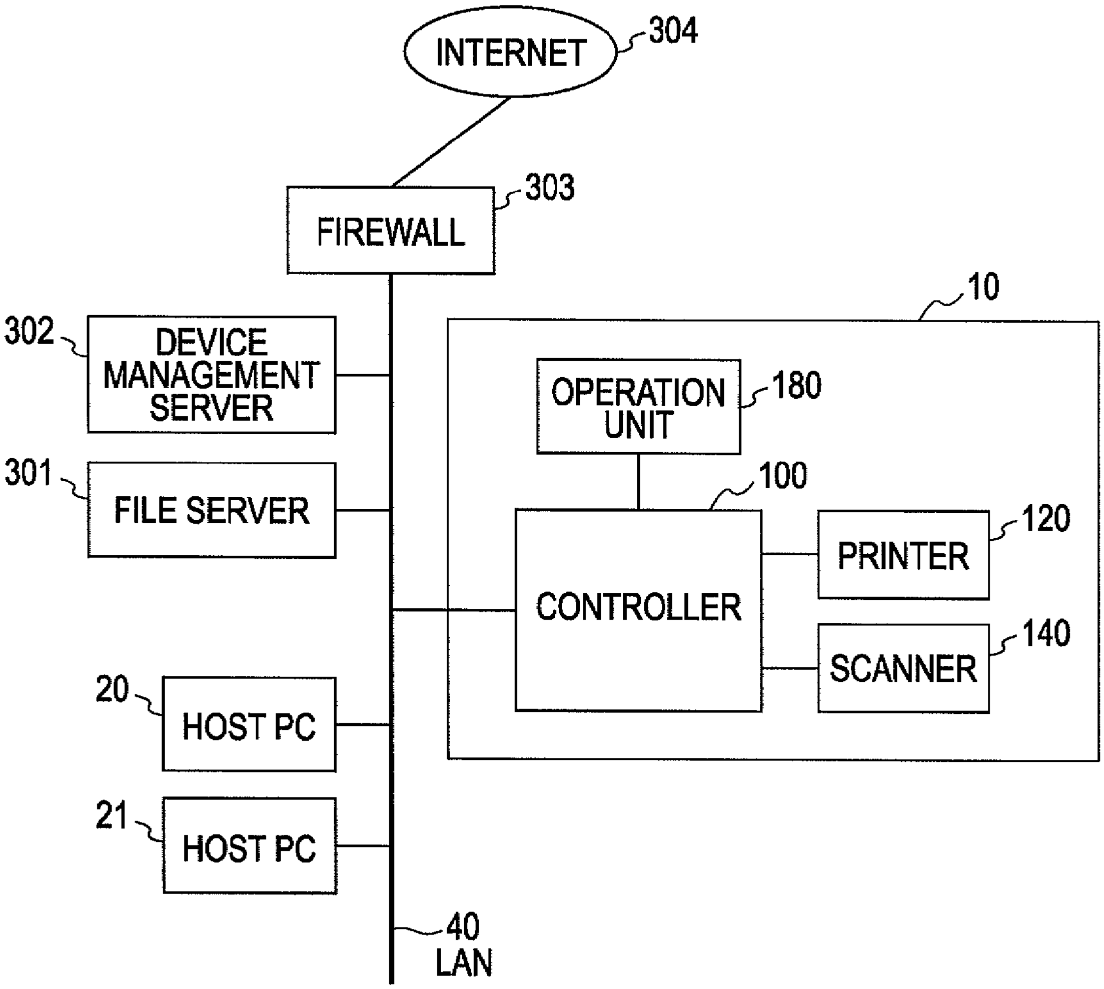
FIG. 1 is a block diagram showing an example of a configuration of a system including a digital multifunction apparatus according to an embodiment of the present invention.

FIG. 1 is a block diagram showing an example of a configuration of a system including a digital multifunction apparatus according to an embodiment of the present invention.

In FIG. 1, reference numeral 304 denotes an Internet communication network. Reference numeral 303 denotes a firewall that connects a LAN 40 to an external communication network (Internet 304) and manages communication security. Reference numeral 302 denotes a device management server that manages devices 10, 20, 21, and 301 connected via the LAN 40. Reference numeral 301 denotes a file server that allows a plurality of users to share data via the LAN 40.

Reference numeral 10 denotes a digital multifunction apparatus (also called a multifunction peripheral (hereinafter, referred to as an MFP)) capable of inputting/outputting image data. In the MFP 10, an operation unit 180 is used by a user to input an operation command or data. An image scanner 140 is adapted to scan an image in accordance with a command given by the operation unit 180 or the host personal computer 20 or 21. A printer 120 is adapted to print data supplied from the host personal computer 20 or 21 or from the server 301 on paper.

A controller unit 100 controls inputting/outputting of image data from/to the scanner 140 or the printer 120 in accordance with a command from the operation unit 180 or the host personal computer 20 or 21. More specifically, for example, the controller unit 100 controls an operation such as storing of image data captured via the scanner 140 into a memory in the controller unit 100, outputting such image data to the host personal computer 20 or 21, or printing image data using the printer 120.

The MFP 10 has means for, when the power of the MFP 10 is turned on or when the MFP 10 is resumed from a low-power standby mode (also called a sleep mode), enabling a particular one or more of functions available on the MFP 10 so as to become usable in advance to the other functions. The MFP 10 is capable of executing a plurality of functions. In the present embodiment, it is assumed by way of example that the MFP 10 is capable of executing a copy function, a facsimile function, a scan function, and a printer function.

[Exemplary Scanner and Printer]

Figure 2:
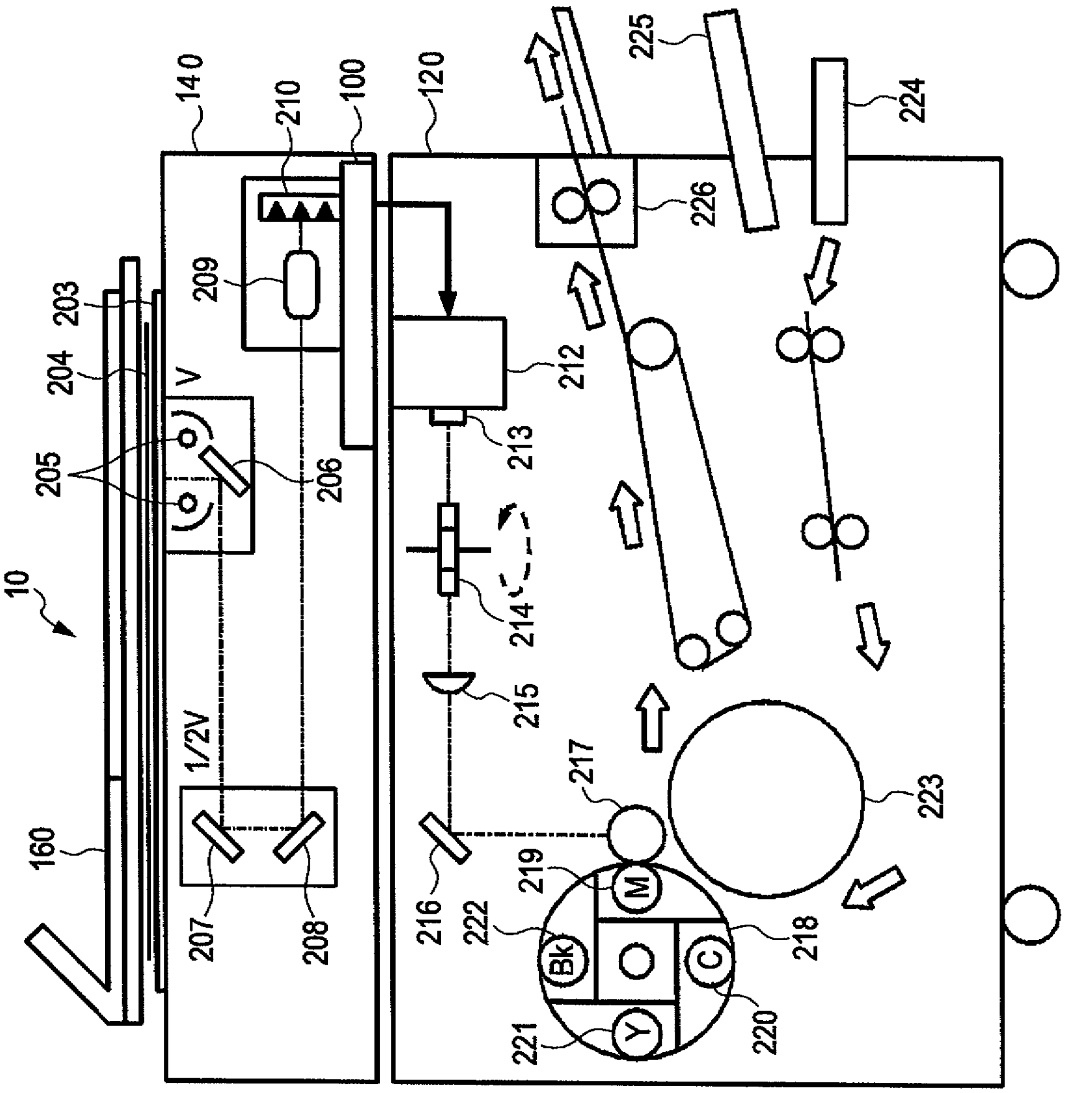
FIG. 2 is a cross-sectional view showing examples structures of a scanner and a printer of the digital multifunction apparatus shown in FIG. 1.

FIG. 2 is a cross-sectional view showing example structures of the scanner 140 and the printer 120 in the MFP 10 shown in FIG. 1.

As shown in FIG. 2, when a document 204 is placed on document glass 203 of the scanner 140, the document 204 is illuminated with light emitted from a lamp 205, and light reflected from the document 204 is directed to a lens 209 via mirrors 206, 207, and 208. The light is focused by the lens 209 and an optical image is formed on a three-line sensor (CCD) 210, which converts an optical signal into an electrical image signal including a red (R) component, a green (G) component, and a blue (B) component. The resultant electrical image signal is sent to the controller unit 100.

A carriage, on which the lamp 205 and the mirror 206 are disposed, is moved at a speed of v and the mirrors 207 and 208 are moved at a speed of ½ v in a direction perpendicular to a main scanning direction in which electrical scanning is performed by the line sensor thereby scanning the entire area of a document.

Image data obtained by scanning the document is stored in a memory in the controller unit 100. The controller unit 100 reads the image data from the memory and performs electrical processing on the image data to separate the image data into color components, that is, a magenta (M) component, a cyan (C) component, a yellow (Y) component, and a black (Bk) component. The resultant color component data are sent to the printer 120.

The scanner 140 scans one document four times such that one of M, C, Y, and Bk components is obtained one of scanning operations, and the obtained M, C, Y, and Bk components are sent to the printer 120. A document feeder (DF) 160 may be mounted on the scanner 140. The document feeder 160 feeds one by one document sheets placed on the document feeder 160 to the scanner 140. The document feeder 160 has a sensor (not shown) to detect whether a stack of document sheets is placed on the document feeder 160.

The document feeder 160 also serves as a pressure plate by which a document sheet placed on the document glass 203 is pressed against the document glass 203. The scanner 140 has a sensor (not shown) to detect whether the pressure plate (the document feeder 160) is open or closed.

If the printer 120 receives the M, C, Y, and Bk image signals sent from the scanner 140 via the controller unit 100, the signals are supplied to the laser driver 212. The laser driver 212 drives a semiconductor laser 213 such that output optical power thereof is modulated in accordance with the image signals. Laser light output from the semiconductor laser 213 strikes the surface of a photosensitive drum 217 via a polygon mirror 214, a f-θ lens 215, and a mirror 216.

A rotary developing apparatus 218 includes a magenta developing unit 219, a cyan developing unit 220, a yellow developing unit 221, and a black developing unit 222, which are in turn brought into contact with a photosensitive drum 217 to develop a latent image formed on the surface of the photosensitive drum 217 into a visual toner image.

Paper fed from a paper cassette 224 or 225 is wrapped around a transfer drum 223, and the toner image is transferred from the photosensitive drum 217 to the paper. After four color images (M, C, Y, and Bk images) are sequentially transferred to the paper, the paper is passed through a fixing unit 226 to fix the toner on the paper.

[Exemplary Controller Unit]

Figure 3:
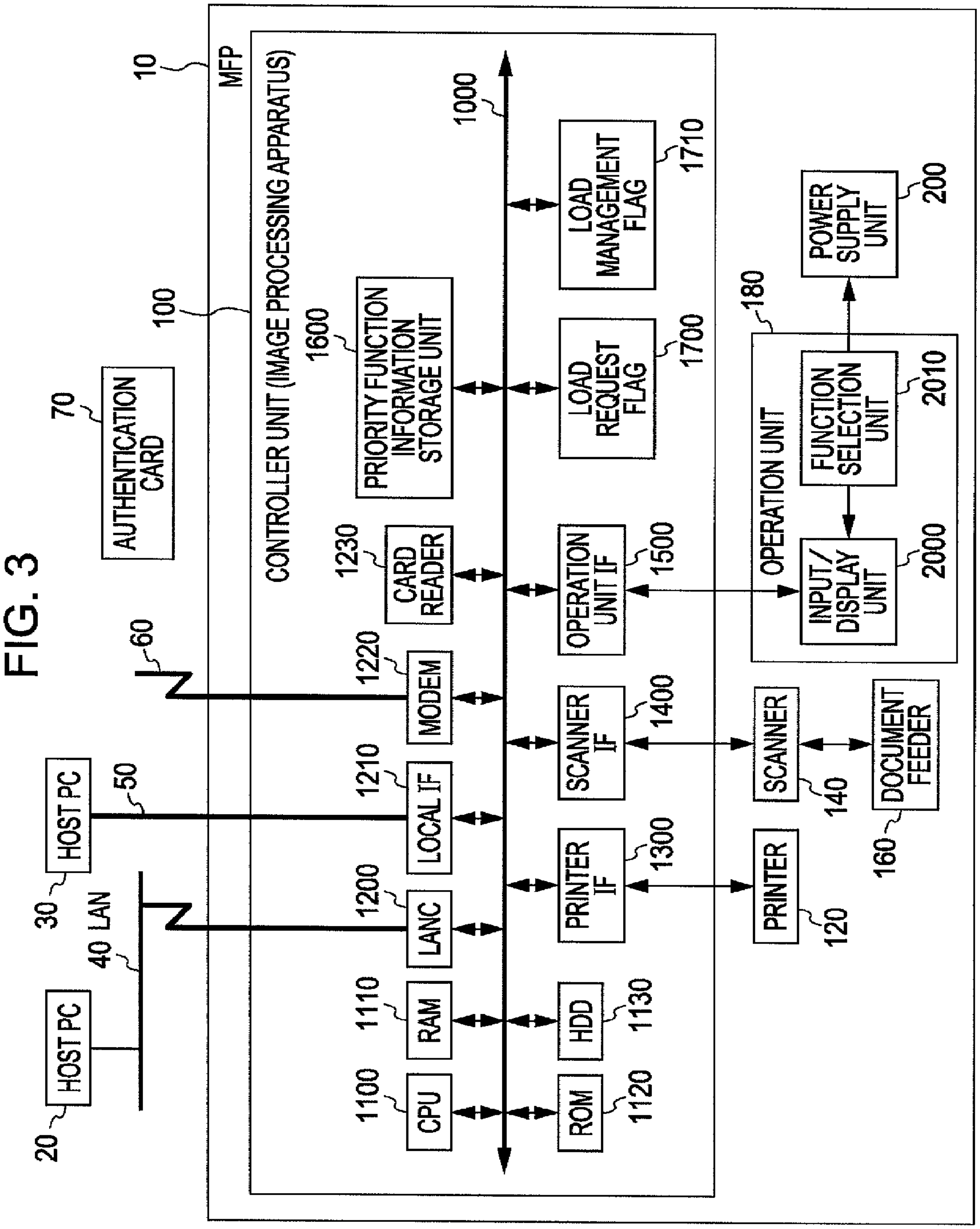
FIG. 3 is a diagram showing an example configuration of the digital multifunction apparatus shown in FIG. 1 and a controller unit thereof.

FIG. 3 is a block diagram showing an example configuration of the MFP 10 shown in FIG. 1 and a controller unit 100 thereof.

The controller unit 100 is connected to the scanner 140 serving as an image input device and also to the printer 120 serving as an image output device. The controller unit 100 is also connected to a local area network (LAN) 40 and a public switched telephone network (PSTN) 60 to input/output image information or device information.

A CPU 1100 is a controller responsible for control over the whole system. A RAM 1110 is a memory used as a system work memory by the CPU 1100. The RAM 1110 is also used as an image memory to temporary store image data.

A ROM 1120 is a boot ROM in which a system boot program is stored. In a hard disk drive (HDD) 1130, various data such as system software, image data, software counter values, etc. area stored.

The system software includes programs to realize various functions such as a copy function, a facsimile function, a scan function, a printer function, an operation (user interface (UI)) function, etc. The system software is configured in the form of split programs corresponding to the respective functions and stored on the HDD 1130. The system software may be stored in a compressed form on the HDD 1130. When the MFP 10 is started, the system software is loaded into the RAM 1110 and converted (for example, decompressed) into a proper form.

The software counter includes a counter adapted to perform counting separately for respective paper sizes and a counter adapted to perform counting separately for respective data sizes whereby the number of pages and the amount of data processed by the CPU 1100 are counted. Instead of storing the counter values in the HDD 1130, they may be stored in another type of memory such as an EEPROM if the values are retain when the power is turned off.

A LAN controller (LANC) 1200 is connected to the LAN 40 and controls inputting/outputting of image data to be output and information necessary to control devices. The LANC 1200 also serves to receive image data, which is to be output, from the host PC 20 on the network or an output image data management apparatus (not shown) in response to an operation by a user on the operation unit 180.

A local I/F 1210 is an interface such as a USB interface or a Centronics interface for interfacing with the host computer 30 or an external printer (not shown) via a cable 50 whereby data is input and output (transmitted). The transmission of data may be performed in various forms such as serial transmission, transmission using a bi-centronics interface, wireless transmission such as Bluetooth wireless transmission. A modem 1220 is connected to the PSTN 60 and serves to input/output data via the PSTN 60. A card reader I/F 1230 is a device for interfacing with an authentication card 70 in the form of an IC card thereby allowing it to read data from the authentication card 70.

A printer I/F 1300 is connected to the printer 120 to communicate with the CPU of the printer 120. A scanner I/F 1400 is connected to the scanner 140 to communicate with the CPU of the scanner 140.

The input/display unit I/F 1500 is an interface with the operation unit (UI) 180 and outputs, to the operation unit 180, image data to be displayed on the operation unit 180. The input/display unit I/F 1500 also serves to transfer information input by a user by operating the operation unit 180 to the CPU 1100.

A priority function storage unit 1600 is a unit for storing information indicating which one of the functions (the copy function, the facsimile function, the scan function, and the printer function) available on the MFP is to be activated preferentially in advance to the other functions when the power of the MFP is turned on or the MFP is resumed from the sleep mode.

A program load request flag 1700 is a flag indicating whether to load a program corresponding to a function specified by a user. More specifically, when the program load request flag 1700 is set to a "true" state, the program specified by the information stored in the priority function storage unit 1600 is loaded. That is, when the program load request flag 1700 is in the "true" state, a program corresponding to a particular function is activated preferentially in advance to the other programs so that the function becomes usable at an early stage in the starting process in advance to the other functions. On the other hand, when the program load request flag 1700 is in a "false" state, the MFP 10 becomes usable after all programs have been activated.

Load management flags 1710 are flags indicating whether programs corresponding to the respective functions have been loaded in the RAM 1110. More specifically, the program load management flags 1710 indicate the load status of each of the programs corresponding to the copy function, the facsimile function, the scan function, and the printer function. That is, when a flag in the program load management flags 1710 is in the "true" state, a program corresponding to this flag has already been loaded in the RAM 1110.

The operation unit 180 includes an input/display unit 2000 and a function selection unit 2010. The input/display unit 2000 includes input means such as a numeric keypad, a copy start button, etc. and display means such as an LCD device. The function selection unit 2010 includes hard keys for selecting functions of the MFP. The function selection unit 2010 also includes a button to control the power of the MFP. The details of the operation unit 180 including its appearance will be described later.

The power supply unit 200 is a unit for supplying electric power to the MFP 10. In the present embodiment, a user is allowed to turn on/off of the power of the MFP 10 by operating the function selection unit 2010. Further, the aforementioned features of the controller unit 100 are in communication via a bus 1000.

[Exemplary Split Program Structure]

Figure 4:
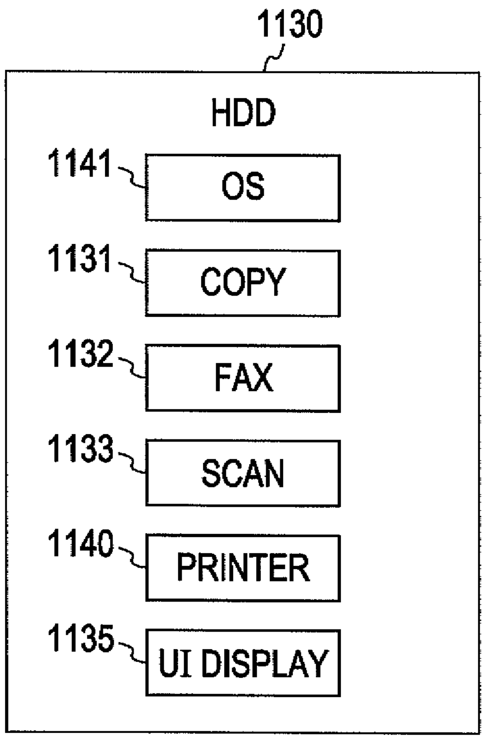
FIG. 4 is a block diagram showing exemplary bootable system software in the form of split programs stored in an HDD shown in FIG. 3.

FIG. 4 is a block diagram showing exemplary system software in the form of split programs stored in the HDD 1130 shown in FIG. 3.

An operating system (OS) 1141 is a basic program for controlling the whole system. The OS 1141 includes a program to display information on the input/display unit 2000 before a UI display program 1135, which will be described later, is loaded. A copy program 1131, a facsimile program 1132, a scan program 1133, a printer program 1140, and a UI display program 1135 are respectively programs to implement the copy function, the facsimile function, the scan function, the printer function, and the UI display function. Note that the term "program" is herein used to describe a combination of a program and associated data. That is, each "program" includes a program code and associated data. These programs corresponding to the respective functions are allowed to be loaded separately in the RAM 1110. In the present description, such programs are referred to as split programs. Additional programs for implementing other functions may also be installed in the MFP 10.

When the power of the MFP 10 is turned on, the CPU 1100 first reads a boot program from the ROM 1120 and then loads the OS 1141 and programs 1131 to 1135 corresponding to the respective functions from the HDD 1130 into the RAM 1110 (if necessary, the programs are decompressed) so that the CPU 1100 can execute the programs loaded in the RAM 1110 to provide the functions corresponding to the programs.

When a program corresponding to a function to be enabled is loaded, if a UI display program 1135 is loaded together with the program into the RAM 1110, it becomes possible to use the function whose program has been loaded in the RAM 1110. For example, to enable the copy function, the OS 1141, the copy program 1131, and the UI display program 1135 are sequentially loaded.

By employing the split program structure such as that shown in FIG. 4 for the system program of the MFP 10, it becomes possible to load, into the RAM 1110, a particular program corresponding to a function to be used in advance to the other programs, thereby allowing the function to become operable in a short time.

[Exemplary Appearance of Operation Unit]

Figure 5:
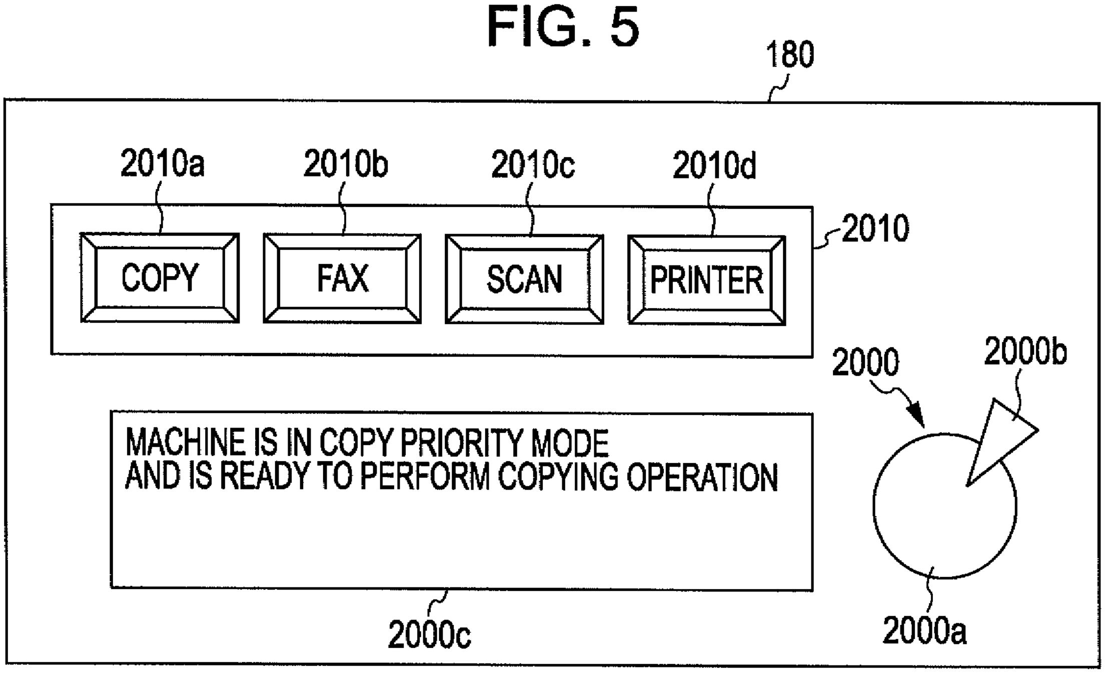
FIG. 5 is a plan view showing an example of the external appearance of an operation unit shown in FIG. 3.

FIG. 5 is a plan view showing an example of the external appearance of the operation unit 180 shown in FIG. 3. With reference to FIG. 5 in conjunction with FIG. 3 showing the block configuration of the controller unit, the operation unit 180 is described below.

The function selection unit 2010 has buttons (hard keys) 2010*a* to 2010*d* for selecting a function (the copy function, the facsimile function, the scan function, or the printer function).

When the power of the MFP 10 is in the OFF state, if one of the buttons 2010*a* to 2010*d* is pressed, the power of the MFP 10 is turned on and the MFP 10 is started in a mode in which the selected function is made usable in advance to the other functions. As described above, the operation unit 180 also includes the input/display unit 2000 having input unit such as the copy start button 2000*a* and the stop button 2000*b* and display unit such as the LCD display 2000*c*.

The LCD display 2000*c* may be in a form having a touch panel, in which the buttons 2010*a* to 2010*d* are displayed as soft keys on the LCD display 2000*c*. In this case, when a switch (not shown) is pressed to turn on the power of the MFP 10, the buttons 2010*a* to 2010*d* are displayed on the LCD display 2000*c*.

A program for displaying the buttons 2010*a* to 2010*d* on the LCD 2000*c* may be included in the boot program stored in the ROM 1120 or may be a part of the OS 1141.

In FIG. 5, if a user presses one of the buttons 2010*a* to 2010*d* corresponding to a function to be used, the CPU 1100 loads programs necessary to preferentially enable the function corresponding to the pressed button from the HDD 1130 into the RAM 1110. For example, when the copy button 2010*a* is pressed by a user, the OS 1141, the copy program 1131, and the UI display program 1135 are preferentially loaded into the RAM 1110 in advance to the other programs. At this point of time, the MFP 10 becomes ready to execute the copy function. Programs corresponding to the other functions are loaded into the RAM 1100 after the copy function has become ready to operate, and these other functions become ready to operate when the loading of the programs is completed.

[Exemplary Process of Preferentially Enabling a Particular Function in Advance to the Other Functions]

Figure 6:
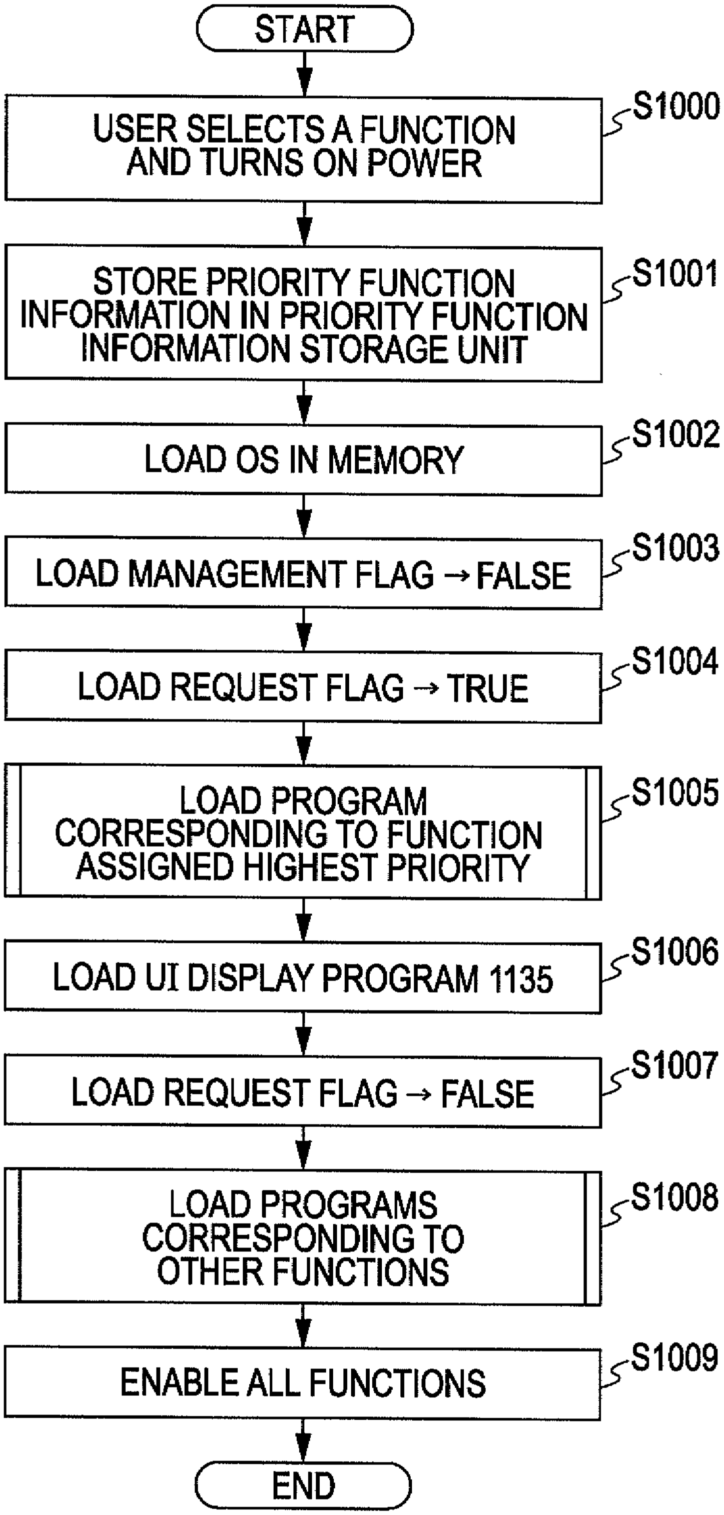
FIG. 6 is a flow chart showing an example of a control procedure according to an embodiment of the present invention.

FIG. 6 is a flow chart showing an example of a first control procedure to enable a particular function so as to become usable in advance to the other function, according to an embodiment of the present invention. More specifically, in this control procedure, when a particular function to be used is selected by operating the function selection unit 2010 of the MFP 10 in the OFF state, the power of the MFP 10 is turned on, and the MFP 10 is started up so that the selected particular function first becomes ready to be used and then the other functions are enabled. Note that the process shown in these flow charts is performed by the controller unit 100. More specifically, in response to the operation of the function selection unit 2010, the process is performed by the CPU 1100 by executing the system boot program stored in the ROM 1120. In this figure, S1000 to S1009 denote step numbers. With reference to this figure, the respective steps are described in detail below.

First, in step S1000, if a user presses one of buttons 2010*a* to 2010*d* on the function selection unit 2010 of the operation unit 180 to specify a function to be used, the function selection unit 2010 performs the following process. That is, the function selection unit 2010 controls the power supply unit 200 to turn on the power of the MFP 10. The process then proceeds to step S1001. In step S1001, the function selection unit 2010 stores, in the priority function storage unit 1600 via the input/display unit I/F 1500, switch-pressing information indicating a function specified to be activated preferentially in advance to the other functions.

Next, in step S1002, the CPU 1100 loads the OS 1141 from the HDD 1130 into the RAM 1110 and advances the process to step S1003. Note that step S1002 may be executed before step S1001 or steps S1001 and S1002 may be executed concurrently.

In step S1003, the CPU 1100 resets all program load completion flags stored in the program load management flags 1710 corresponding to the respective functions to a "false" state. Thereafter, the process proceeds to step S1004. In the present embodiment, it is assumed by way of example that the MFP 10 has four functions, a copy function, a facsimile function, a scan function, and a printer function, and thus there are four program load completion flags corresponding to these four functions.

In step S1004, the CPU 1100 sets the program load request flag 1700 into a "true" state to indicate that the program corresponding to the function specify the user should be loaded. The process then proceeds to step S1005.

In step S1005, the CPU 1100 loads a program corresponding to a function specified by a user into the RAM 1110. The details of step S1005 will be described later with reference to FIG. 7. Thereafter, the process proceeds to step S1006.

In step S1006, the CPU 1100 loads a UI display program 1135 from the HDD 1130 into the RAM 1110 and executes the program loaded in the RAM 1110. Thus, in this step, the function specified by the user becomes ready to be used. Thereafter, the process proceeds to step S1007.

In step S1007, the CPU 1100 resets the program load request flag 1700 into a "false" state to indicate that remaining programs should be loaded into the RAM 1110. The CPU 1100 then advances the process to step S1008.

In step S1008, the CPU 1100 loads other programs into the RAM 1110 and advances the process to step S1009. The details of step S1008 will be described later with reference to FIGS. 7A and 7B.

In step S1009, the CPU 1100 enables the functions corresponding to the programs loaded in the RAM 1110 and ends the present process.

[Exemplary Process of Loading Programs in the RAM]

Figure 7A:
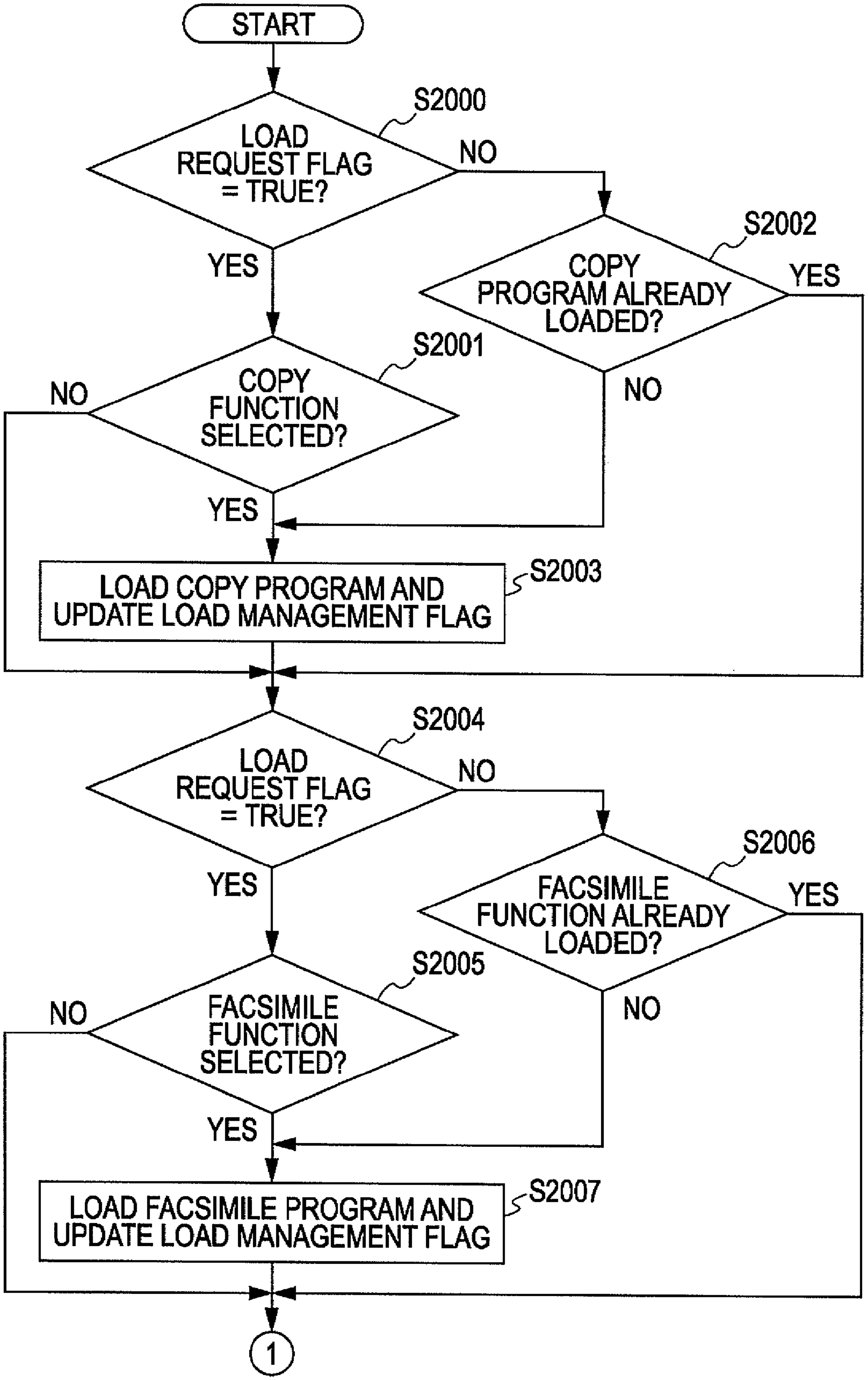
FIG. 7A is a flow chart showing an example of a second control procedure according to an embodiment of the present invention.
Figure 7B:
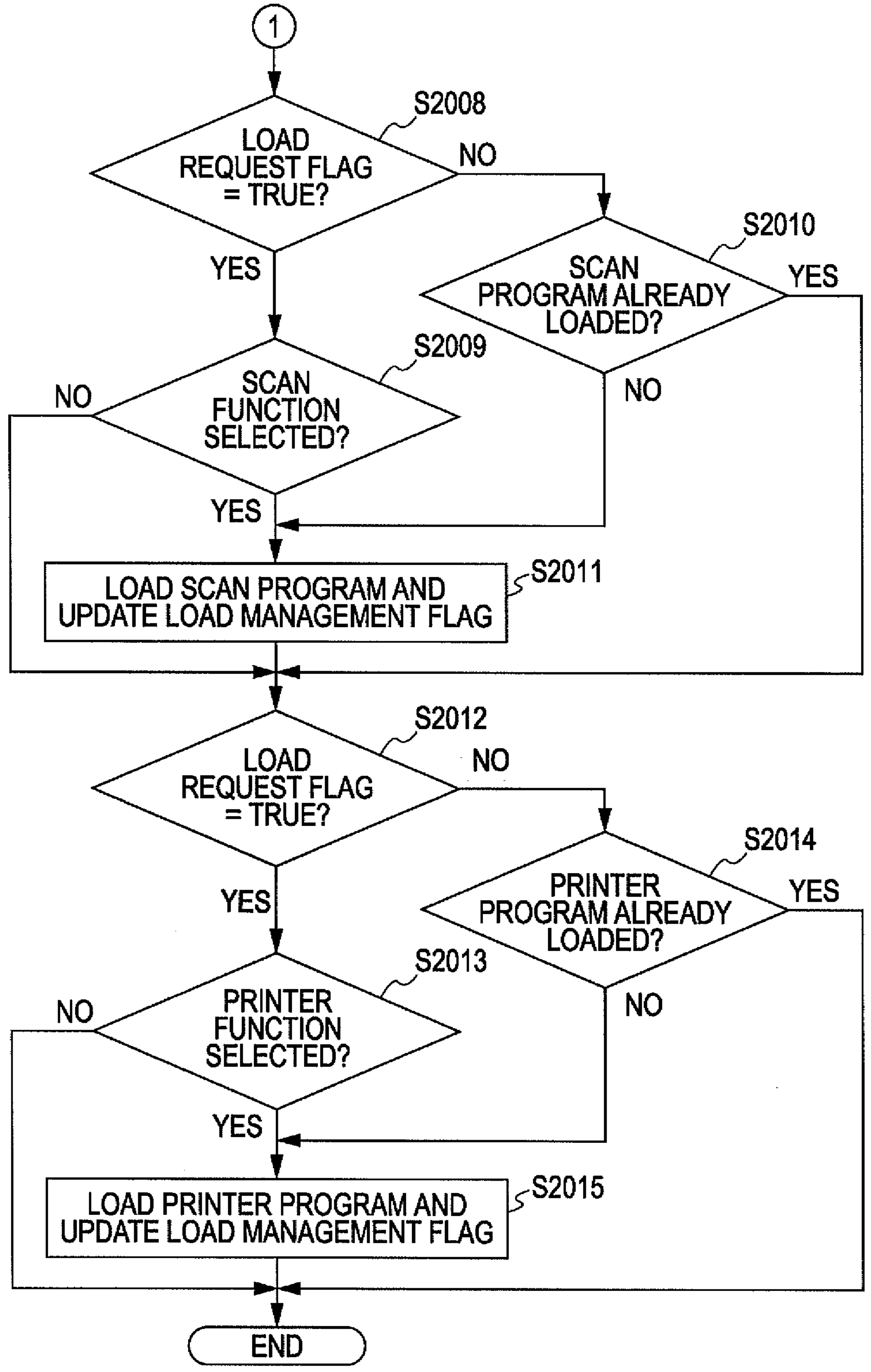
FIG. 7B is a flow chart showing an example of the second control procedure according to an embodiment of the present invention.

FIGS. 7A and 7B are flow charts showing exemplary details of steps S1005 and S1008 shown in FIG. 6 in the second control procedure according to the present embodiment of the invention. Note that the processes shown in these flow charts are performed by the controller unit 100. More specifically, the processes are realized by executing the system boot program stored in the ROM 1120 by the CPU 1100. In these figures, S2000 to S2015 denote step numbers. With reference to these figures, the respective steps are described in detail below.

In step S2000, the CPU 1100 determines the state of the program load request flag 1700. If it is determined that the program load request flag 1700 is in a "true" state, the CPU 1100 advances the process to step S2001.

In step S2001, the CPU 1100 determines whether the data stored in the priority function storage unit 1600 indicates that the copy function is selected. If it is determined in step S2001 that the copy function is selected, the CPU 1100 advances the process to step S2003.

In step S2003, the CPU 1100 loads the copy program 1131 from the HDD 1130 into the RAM 1110. The CPU 1100 then sets a flag associated with the copy program 1131 in the program load management flags 1710 into the "true" state to indicate that the copy program 1131 has been loaded. The CPU 1100 then advances the process to step S2004.

On the other hand, in the case in which the CPU 1100 determines in step S2001 that the copy function is not selected, the CPU 1100 advances the process to step S2004.

In the case in which the CPU 1100 determines in step S2000 that the program load request flag 1700 is not in the "true" state, the CPU 1100 advances the process to step S2002.

In step S2002, the CPU 1100 checks the program load management flags 1710 to determine whether the flag associated with the copy program 1131 is in the "true" state indicating that the copy program 1131 has been loaded. If it is determined that the flag indicates that the copy program 1131 is not in the "true" state (that is, if the answer to step S2002 is No), the CPU 1100 advances the process to step S2003 to load the copy program 1131.

In the case in which the CPU 1100 determines in step S2002 that, of the program load management flags 1710, the flag associated with the copy program 1131 is in the "true"

state (that is, if the answer to step S2002 is Yes), the CPU 1100 advances the process to step S2004.

In steps S2004 to S2007, the facsimile program 1132 is loaded into the RAM 1110 as described in detail below.

In step S2004, the CPU 1100 determines the state of the program load request flag 1700. If it is determined that the program load request flag 1700 is in a "true" state, the CPU 1100 advances the process to step S2005.

In step S2005, the CPU 1100 determines whether the data stored in the priority function storage unit 1600 indicates that the facsimile function is selected. If it is determined that the facsimile function is selected, the CPU 1100 advances the process to step S2007.

In step S2007, the CPU 1100 loads the facsimile program 1132 from the HDD 1130 into the RAM 1110. The CPU 1100 then sets a flag associated with the facsimile program 1132 in the program load management flags 1710 into the "true" state to indicate that the facsimile program 1132 has been loaded. The CPU 1100 then advances the process to step S2008.

On the other hand, in the case in which the CPU 1100 determines in step S2005 that the facsimile function is not selected, the CPU 1100 advances the process to step S2008.

In the case in which the CPU 1100 determines in step S2004 that the program load request flag 1700 is not in the "true" state, the CPU 1100 advances the process to step S2006.

In step S2006, the CPU 1100 checks the program load management flags 1710 to determine whether the flag associated with the facsimile program 1132 is in the "true" state indicating that the facsimile program 1132 has been loaded. If it is determined that the flag is not in the "true" state (that is, if the answer to step S2006 is No), the CPU 1100 advances the process to step S2007 to load the facsimile program 1132.

In the case in which the CPU 1100 determines in step S2006 that, of the program load management flags 1710, the flag associated with the facsimile program 1132 is in the "true" state (that is, if the answer to step S2006 is Yes), the CPU 1100 advances the process to step S2008.

In steps S2008 to S2011 shown in FIG. 7B, the scan program 1133 is loaded into the RAM 1110 as described in detail below.

In step S2008, the CPU 1100 determines the state of the program load request flag 1700. If it is determined that the program load request flag 1700 is in a "true" state, the CPU 1100 advances the process to step S2009.

In step S2009, the CPU 1100 determines whether the data stored in the priority function storage unit 1600 indicates that the scan function is selected. If it is determined that the scan function is selected, the CPU 1100 advances the process to step S2011.

In step S2011, the CPU 1100 loads the scan program 1133 from the HDD 1130 into the RAM 1110. The CPU 1100 then sets a flag associated with the scan program 1133 in the program load management flags 1710 into the "true" state to indicate that the scan program 1133 has been loaded. The CPU 1100 then advances the process to step S2012.

On the other hand, in the case in which the CPU 1100 determines in step S2009 that the scan function is not selected, the CPU 1100 advances the process to step S2012.

In the case in which the CPU 1100 determines in step S2008 that the program load request flag 1700 is not in the "true" state, the CPU 1100 advances the process to step S2010.

In step S2010, the CPU 1100 checks the program load management flags 1710 to determine whether the flag associated with the scan program 1133 is in the "true" state indicating that the scan program 1133 has been loaded. If it is determined that the flag is not in the "true" state (that is, if the answer to step S2010 is No), the CPU 1100 advances the process to step S2011 to load the scan program 1133.

In the case in which the CPU 1100 determines in step S2010 that the flag associated with the scan program 1133 in the program load management flags 1710 is in the "true" state (that is, if the answer to step S2010 is Yes), the CPU 1100 advances the process to step S2012.

In steps S2012 to S2015, the printer program 1134 is loaded into the RAM 1110 as described in detail below.

In step S2012, the CPU 1100 determines the state of the program load request flag 1700. If it is determined that the program load request flag 1700 is in a "true" state, the CPU 1100 advances the process to step S2013.

In step S2013, the CPU 1100 determines whether the data stored in the priority function storage unit 1600 indicates that the printer function is selected. If it is determined that the printer function is selected, the CPU 1100 advances the process to step S2015.

In step S2015, the CPU 1100 loads the printer program 1134 from the HDD 1130 into the RAM 1110. The CPU 1100 then sets a flag associated with the printer program 1134 in the program load management flags 1710 into the "true" state to indicate that the printer program 1134 has been loaded, and the CPU 1100 ends the present process.

On the other hand, in the case in which the CPU 1100 determines in step S2013 that the printer function is not selected, and the CPU 1100 ends the present process.

In the case in which the CPU 1100 determines in step S2012 that the program load request flag 1700 is not in the "true" state, the CPU 1100 advances the process to step S2014.

In step S2014, the CPU 1100 checks the program load management flags 1710 to determine whether the flag associated with the printer program 1134 is in the "true" state indicating that the printer program 1134 has been loaded. If it is determined that the flag is not in the "true" state (that is, if the answer to step S2014 is No), the CPU 1100 advances the process to step S2015 to load the printer program 1134.

In the case in which the CPU 1100 determines in step S2014 that, of the program load management flags 1710, the flag associated with the printer program 1134 is in the "true" state (that is, if the answer to step S2014 is Yes), the CPU 1100 ends the present process.

In the above-described process according to the flow charts shown in FIGS. 7A and 7B, it is assumed that the MFP 10 has four functions, that is, the copy function, the facsimile function, the scan function, and the printer function. In a case in which the MFP 10 has an additional function, steps S2000 to S2003 are repeated after step S2015.

[Exemplary Loading of Split Programs When There is Only One Priority Function]

FIGS. 8A to 8D show an example of a process of loading programs from the HDD 1130 into the work memory area in the RAM 1110. In this specific example, it is assumed that the copy function is enabled preferentially in advance to the other functions.

Figure 8A:
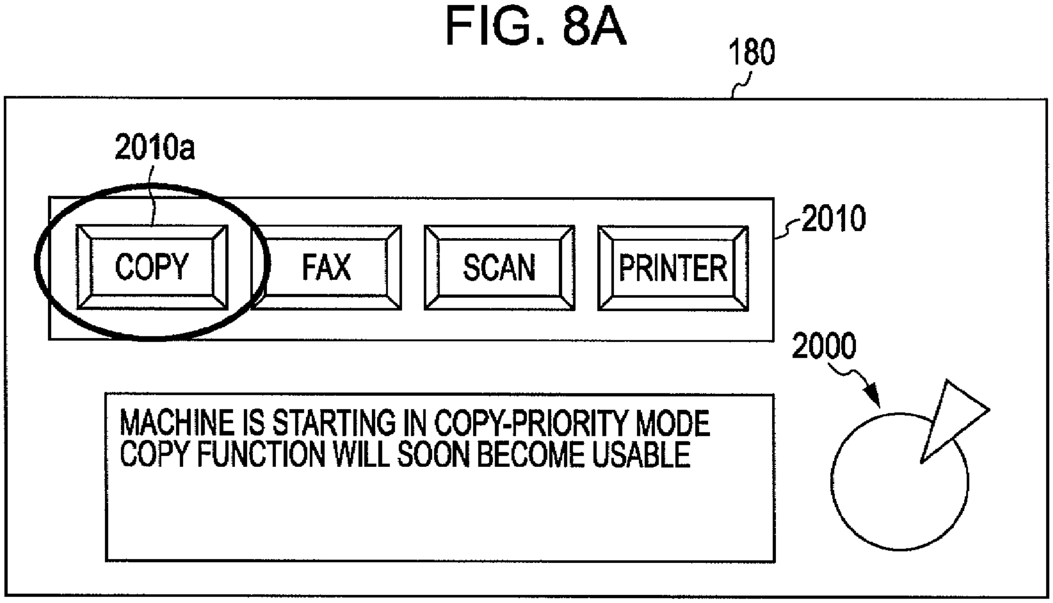
FIGS. 8A to 8D are diagrams showing an example of a manner in which a CPU loads bootable split programs into a work memory area of a RAM.

FIG. 8A shows a state in which a user has pressed a button 2010*a* on the function selection unit 2010 of the operation unit 180 to select the copy function. In response, the power of the MFP 10 is turned on, the data in the priority function storage unit 1600 is written so as to indicate that the copy function is selected, and the process is started to activate the copy function so as to become usable in a state in which highest priority is given to the copy function.

Figure 8B:
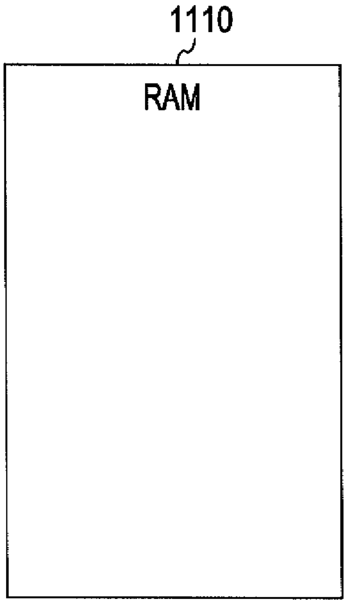

FIG. 8B shows an exemplary state in which the power of the MFP 10 has been turned on but no programs have yet been loaded from the HDD 1130 into the RAM 1110.

Figure 8C:
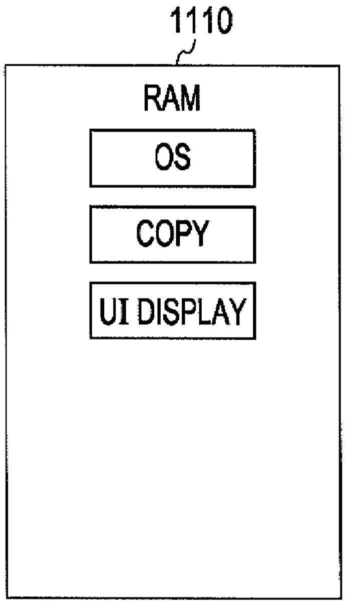

FIG. 8C shows a state in which the OS 1141, the copy program 1131, and the UI display program 1135 have been loaded from the HDD 1130 into the RAM 1110, and the program of the copy function has been activated. This state occurs when in the process of the flow chart shown in FIG. 6, steps from S1001 to S1006 have been performed. By this point of time, the copy program 1131 and programs necessary to execute the copy program 1131, that is, the OS 1141 and the UI display program 1135, have been loaded in the RAM 1110 serving as a main memory, and thus the copy function is ready to be executed.

Figure 8D:
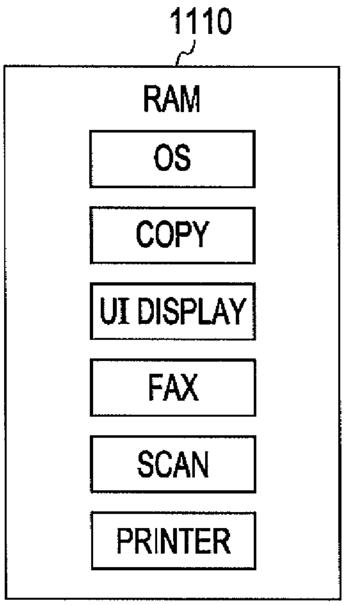

FIG. 8D shows a state in which in addition to the copy program 1131, other programs have been loaded from the HDD 1130 into the RAM 1110. This state occurs when in the process of the flow chart shown in FIG. 6, steps from S1001 to S1009 have been performed. In this state, all functions of the MFP 10 are ready to be executed.

[Exemplary Loading of Split Programs to Preferentially Activate a Plurality of Functions]

FIGS. 9A to 9D show an example of a process of loading programs from the HDD 1130 into the work memory area in the RAM 1110. In this specific example, it is assumed that a user selects the copy function and the facsimile function.

Figure 9A:
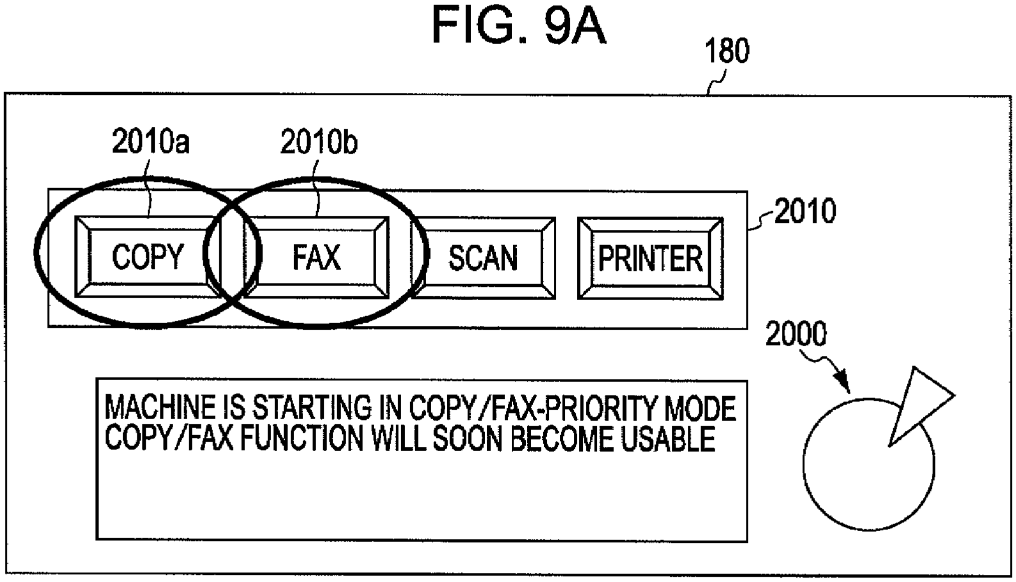
FIGS. 9A to 9D are diagrams showing an example of a manner in which a CPU loads bootable split programs into a work memory area of a RAM.

FIG. 9A shows a state in which a user has pressed buttons 2010*a* and 2010*b* on the function selection unit 2010 of the operation unit 180 to select both the copy function and the facsimile function. In response, the power of the MFP 10 is turned on, data is written in the priority function storage unit 1600 so as to indicate that the copy function and the facsimile function are selected, and the process is started to activate the copy function and the facsimile function so as to become usable in a state in which highest priority is given to these two functions.

Figure 9B:
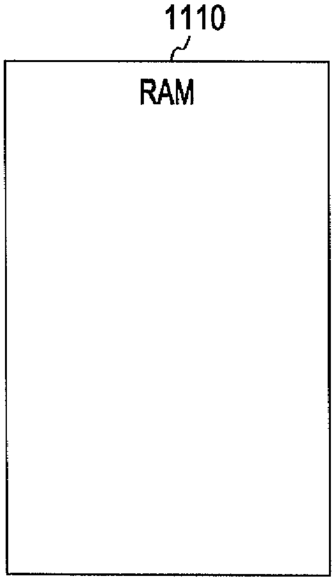

FIG. 9B shows a state in which the power of the MFP 10 has been turned on but no programs have yet been loaded from the HDD 1130 into the RAM 1110.

Figure 9C:
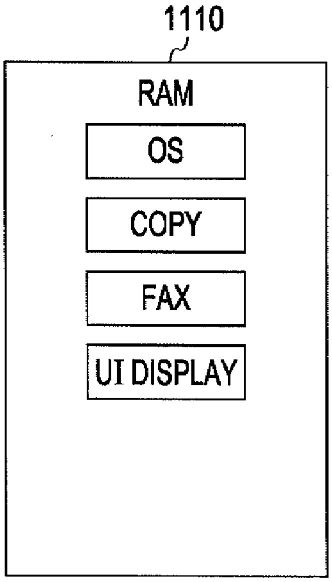

FIG. 9C shows a state in which the copy program 1131 and the facsimile program 1132 have been loaded from the HDD 1130 into the RAM 1110. This state occurs when in the process of the flow chart shown in FIG. 6, steps from the beginning to S1006 have been performed. In this state, the copy program 1131 and the facsimile program 1132 have been loaded in the RAM 1110 into a state in which the CPU 1100 can execute them, and thus the copy function and the facsimile functions are ready to be used even if the other functions are not ready to be used.

Figure 9D:
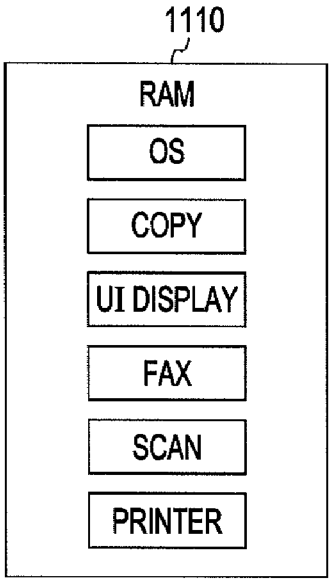

FIG. 9D shows a state in which in addition to the copy program 1131 and the facsimile program 1132, other programs have been loaded from the HDD 1130 into the RAM 1110. This state occurs when in the process of the flow chart shown in FIG. 6, steps from the beginning to S1009 have been performed. In this state, all functions of the MFP 10 are ready to be executed.

In the present embodiment, as described above, the programs are prepared in the form of split programs corresponding to the respective functions provided by the MFP 10 so that it is allowed to enable each function separately. The function selection unit 2010 for selecting functions also serves as a unit for turning on the power of the MFP 10. Selection information indicating selected functions is sent from the function selection unit 2010 to the priority function storage unit 1600 and stored therein. Thus, the present embodiment makes it possible to start up the MFP 10 in a short time so that a particular function selected by a user is activated preferentially in advance to the other functions. Because the other functions are also activated after the selected particular function, all functions become usable eventually. This is very convenient for users. Because the MFP 10 can be started up very quickly, users do not hesitate to turn off the MFP 10 after the MFP 10 is used. This allows a reduction in power consumption.

Second Exemplary Embodiment

In the first embodiment described above, loading of programs is managed using the program load request flag 1700 and the program load management flags 1710. Instead, in a second embodiment described below, loading of programs is managed in accordance with a table in which a selection status of each program and a loading status indicating whether each program has been loaded in the RAM 1110 are described. In this second embodiment, the order of loading programs can also be determined in accordance with the table. The details of the second embodiment are described below.

[Exemplary Controller Unit]

Figure 10:
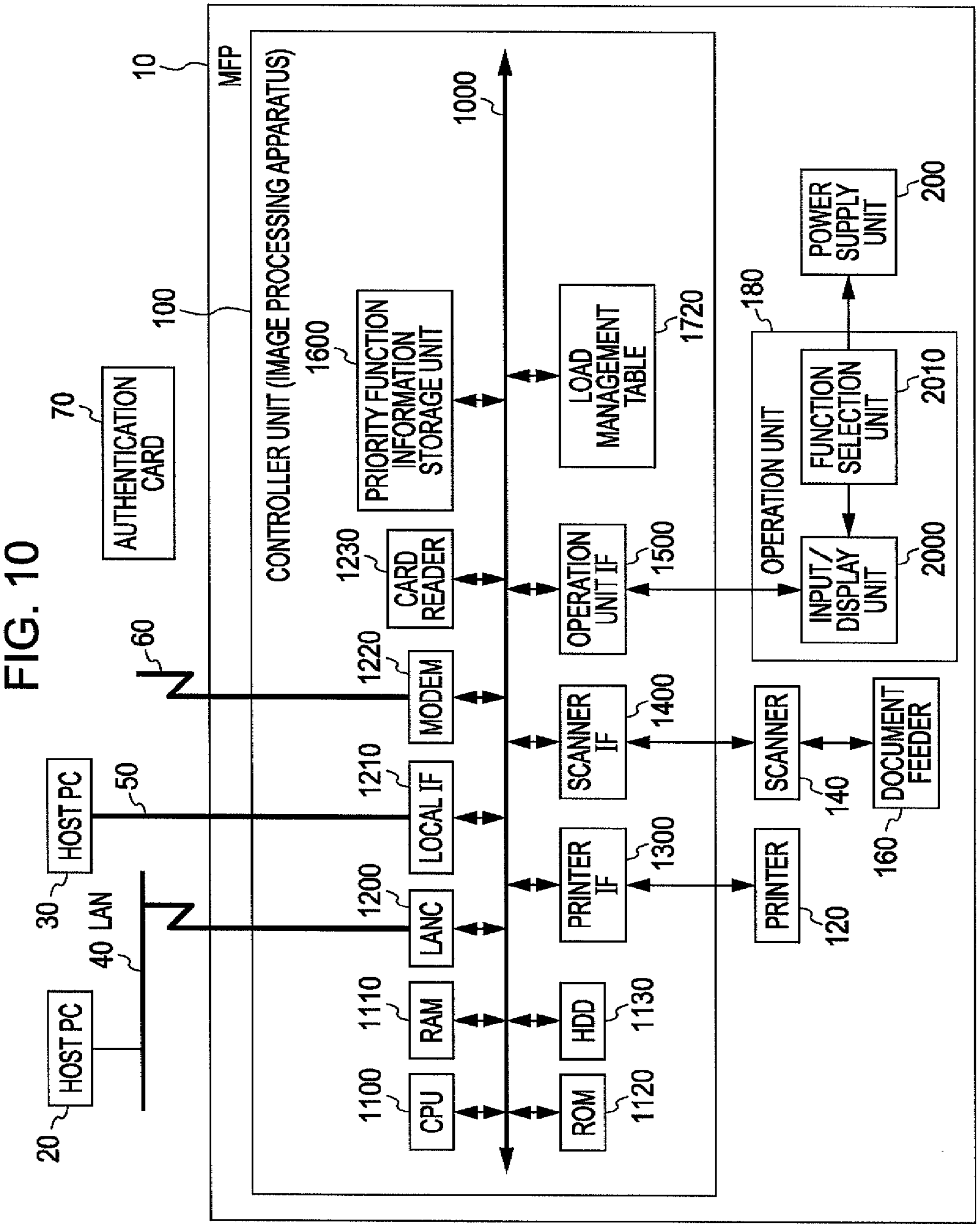
FIG. 10 is a block diagram showing an example configuration of a digital multifunction apparatus and a controller unit thereof according to an embodiment of the present invention.

FIG. 10 is a block diagram showing a configuration of a MFP 10 and a controller unit 100 thereof according to a second embodiment of the present invention. In FIG. 10, similar parts to those in FIG. 3 are denoted by similar reference numerals and a duplicated explanation thereof is omitted herein.

The MFP 10 shown in FIG. 10 according to the second embodiment is different from that according to the first embodiment shown in FIG. 3 in that the program load request flag 1700 and the program load management flags 1710 shown in FIG. 3 are replaced by the program load management table 1720.

The program load management table 1720 includes selection status information indicating functions to be enabled preferentially in advance to the other functions and load status information indicating whether corresponding programs have been loaded into the RAM 1110. The program load management table 1720 also indicates the order of loading programs.

FIG. 11 shows an example of the program load management table 1720 shown in FIG. 10.

As shown in FIG. 11, the program load management table 1720 has a field in which a management number 1720*a* is described, a field in which a function name 1720*b* is described, a field in which a priority function flag 1720*c* is stored, and a field in which a program load completion flag 1720*d* is stored.

The function name 1720*b* is a name of a function such as "copy", "facsimile", "scan", and "printer", which respectively correspond to the copy program 1131, the facsimile program 1132, the scan program 1133, and the printer program 1134. The priority function flag 1720*c* is a flag indicating whether a corresponding function is specified to be enabled preferentially in advance to the other functions. When the priority function flag 1720*c* is set to a "true" state, a corresponding function is specified to be enabled preferentially, while when the priority function flag 1720*c* is set to a "false" state, a corresponding function is not specified to be enabled preferentially, When the program load completion flag 1720*d* is in a "true" state, a corresponding program has been loaded into the RAM 1110, while when the program load completion flag 1720*d* is in a "false" state, a corresponding program has not yet been loaded into the RAM 1110.

The management numbers 1720*a* indicate the order of loading programs. This means that it is possible to change the order of loading programs by changing the values of the management numbers 1720$a$ in the program load management table 1720.

The management numbers 1720$a$ and the function names 1720$b$ are predetermined when the MFP 10 is shipped from a factory or determined by an administrator of the MFP 10 and they are recorded in the program load management table 1720. The program load management table 1720 may be rewritten by the administrator or an operator at an arbitrary time by operating the operation unit 180. This allows it to change the order of loading programs.

[Exemplary Process of Preferentially Enabling a Particular Function]

Figure 12:
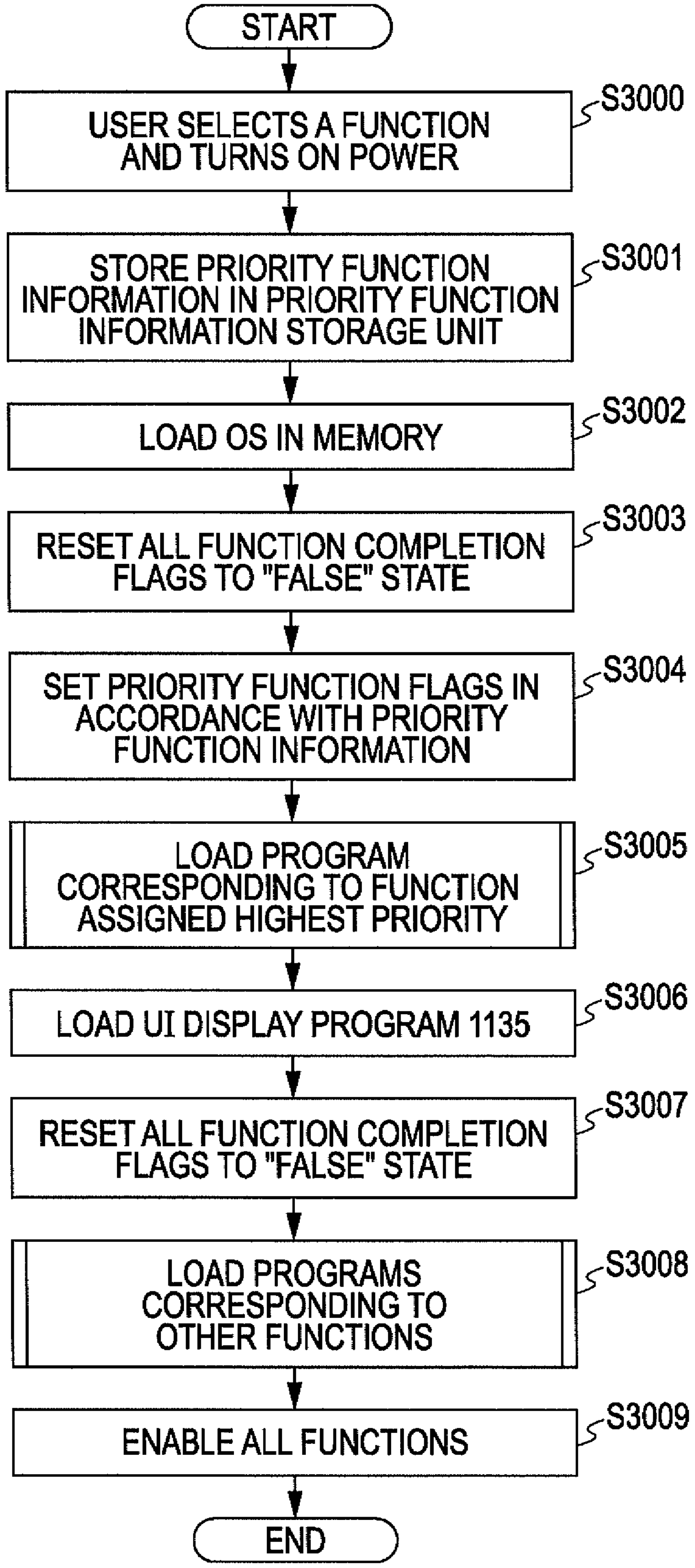
FIG. 12 is a flow chart showing an example of a control procedure according to an embodiment of the present invention.

FIG. 12 is a flow chart showing an example of a third control procedure to enable a particular function preferentially in advance to the other functions according to the second embodiment of the present invention. More specifically, when a particular function to be used is selected by operating the function selection unit 2010 of the MFP 10 in the OFF state, the power of the MFP 10 is turned on, and the MFP 10 is started up so that the selected particular function first becomes ready to be used and then the other functions are enabled. Note that the process shown in these flow charts is performed by the controller unit 100. More specifically, in response to the operation of the function selection unit 2010, the process is performed by the CPU 1100 by executing the system boot program stored in the ROM 1120. In this figure, S3000 to S3009 denote step numbers. With reference to this figure, the respective steps are described in detail below.

First, in step S3000, if a user presses one of buttons 2010$a$ to 2010$d$ on the function selection unit 2010 of the operation unit 180 to specify a function to be used, the function selection unit 2010 performs the following process. That is, the function selection unit 2010 controls the power supply unit 200 to turn on the power of the MFP 10. The process then proceeds to step S3001. In step S3001, pressed-switch information indicating which switch of the function selection unit 2010 is pressed is sent from the function selection unit 2010 to the priority function storage unit 1600 via the input/display unit I/F 1500 and is stored priority function storage unit 1600.

Next, in step S3002, the CPU 1100 loads the OS 1141 from the HDD 1130 into the RAM 1110 and advances the process to step S3003.

In step S3003, the CPU 1100 resets all program load completion flags 1720$d$ in the program load management table 1720 into the "false" state. The CPU 1100 then advances the process to step S3004.

In step S3004, the CPU 1100 sets the values of the respective priority function flags 1720$c$ in the program load management table 1720 into the "true" state or the "false" state according to the switch-pressing information which indicates which switch has been pressed and which is stored in the priority function storage unit 1600. For example, the information stored in the priority function storage unit 1600 indicates that only the copy function is selected, the CPU 1100 sets the priority function flag associated with the copy function into the "true" state and the priority function flags associated with the other functions into the "false" state. Thus, in this step, it is specified to load the program corresponding to the function selected by the user. The CPU 1100 then advances the process to step S3005.

In step S3005, the CPU 1100 loads the program corresponding to the function specified as a priority function into the RAM 1110. The details of this step will be described later with reference to FIG. 13. The process then proceeds to step S3006.

In step S3006, the CPU 1100 loads the UI display program 1135 from the HDD 1130 into the RAM 1110. The CPU 1100 then executes the programs loaded in the RAM 1110. Thus, in this step, the function specified by the user as the function with the highest priority becomes ready to be used. Thereafter, the CPU 1100 advances the process to step S3007.

In step S3007, the CPU 1100 resets all priority function flags 1720$c$ in the program load management table 1720 into the "false" state. Thus, in this step, programs to be further loaded are specified. Thereafter, the CPU 1100 advances the process to step S3008.

In step S3008, the CPU 1100 loads the programs specified to be further loaded in the RAM 1110. The details of this step will be described later with reference to FIG. 13. Thereafter, the CPU 1100 advances the process to step S3009.

In step S3009, the CPU 1100 executes the programs loaded in the RAM 1110 so as to enable the corresponding functions to be usable, and the CPU 1100 ends the present process.

[Exemplary Loading of Programs into RAM]

Figure 13:
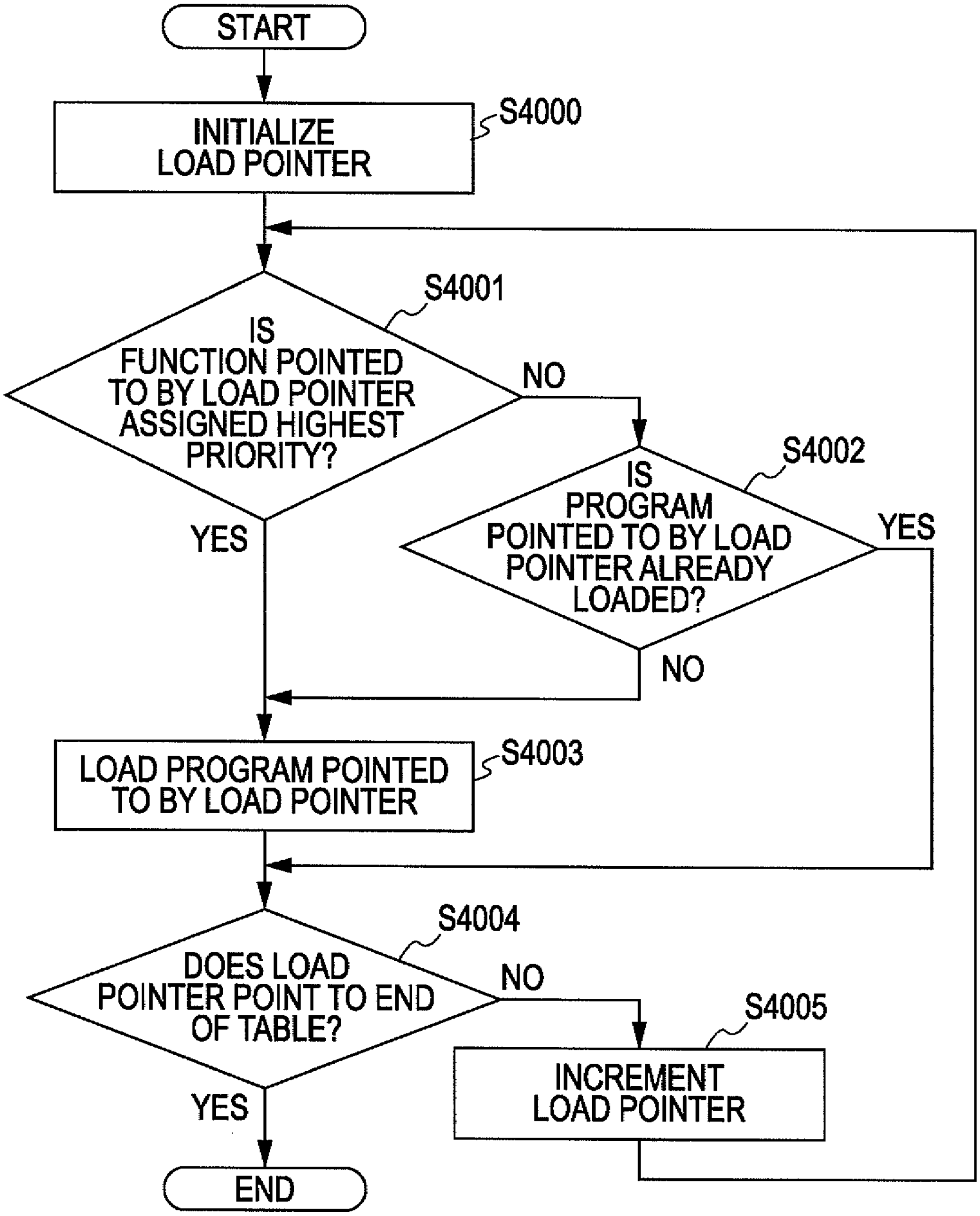
FIG. 13 is a flow chart showing an example of a control procedure according to an embodiment of the present invention.

FIG. 13 is a flow chart showing exemplary details of steps S3005 and S3008 shown in FIG. 12 in the fourth control procedure according to the present embodiment of the invention. Note that the process shown in this flow chart is performed by the controller unit 100 and more specifically, the process is realized by executing the system boot program stored in the ROM 1120 by the CPU 1100. In this figure, S4000 to S4005 denote step numbers. With reference to this figure, the respective steps are described in detail below.

In the process of the flow chart shown in FIG. 13, programs are loaded into the RAM 1110 in accordance with information described in the program load management table 1720, and the program load completion flags in the program load management table 1720 are rewritten when the programs are loaded. A load pointer is an internal variable used to identify a function to be processed by pointing to a corresponding function name in the program load management table 1720. More specifically, the load pointer has a value equal to the value of one of management numbers 1720$a$.

First, in step S4000, the CPU 1100 initializes the load pointer to "0" and advances the process to step S4001.

In step S4001, the CPU 1100 determines whether a priority function flag 1720$c$ associated with a function having a management number 1720$a$ pointed to by the load pointer is set in the "true" state (that is, whether the function is specified to be activated in a state in which the function is allowed to be used in advance to the other functions). If it is determined that the priority function flag 1720$c$ associated with the function having the management number 1720$a$ pointed to by the load point is in the "true" state (that is, the function is specified to be activated in the state in which the function is allowed to be used in preference to the other functions), the CPU 1100 advances the process to step S4003.

In step S4003, the CPU 1100 loads the program of the function corresponding to the management number 1720$a$ pointed to by the load pointer into the RAM 1110 from the HDD 1130. The CPU 1100 then sets the program load completion flag 1720$d$ into the "true" state, and the CPU 1100 advances the process to step S4004.

On the other hand, it is determined in step S4001 that the priority function flag 1720$c$ associated with the function having the management number 1720$a$ pointed to by the load pointer is not in the "true" state (that is, the function is not specified to be activated in the state in which the function is allowed to be used in preference to the other functions), the CPU 1100 advances the process to step S4002.

In step S4002, the CPU 1100 determines whether the program load completion flag 1720$d$ associated with the function having the management number 1720*a* pointed to by the load pointer is in the "true" state. If it is determined that the program load completion flag 1720*d* is not in the "true" state, that is, if it is determined that the corresponding program has not been loaded in the RAM 1110, the CPU 1100 advances the process to step S4003 to load the program.

On the other hand, in the case in which it is determined in step S4002 that the program load completion flag 1720*d* associated with the function having the management number 1720*a* pointed to by the load pointer is in the "true" state, that is, if the program has already been loaded in the RAM 1110, the CPU 1100 advances the process to step S4004.

In step S4004, the CPU 1100 determines whether the value of the load pointer points to a management number 1720*a* at the end of the program load management table 1720. If it is determined in step S4004 that the value of the load pointer points to the management number 1720*a* at the end of the program load management table 1720, the CPU 1100 ends the process.

On the other hand, in the case in which it is determined in step S4004 that the value of the load pointer points to a management number 1720*a* which is not at the end of the program load management table 1720, the CPU 1100 advances the process to step S4005.

In step S4005, the CPU 1100 increments the value of the load pointer by 1 and then returns the process to step S4001.

As described above, in addition to the advantages provided by the first embodiment, the second embodiment further provides the advantage that the order of loading the functions other than the function assigned the highest priority is allowed to be changed by changing the values of the management numbers 1720*a* in the program load management table 1720.

Exemplary Third Embodiment

In the first and second embodiments described above, when a particular function is selected by a user when the MFP 10 is in the OFF state or in the sleep mode, the selected function is enabled preferentially in advance to the other functions. Instead, in a third embodiment described below, a function to be enabled preferentially in advance to the other functions is determined for each user in accordance with information described in an authentication card, as described in detail below.

[Exemplary Controller Unit]

Figure 14:
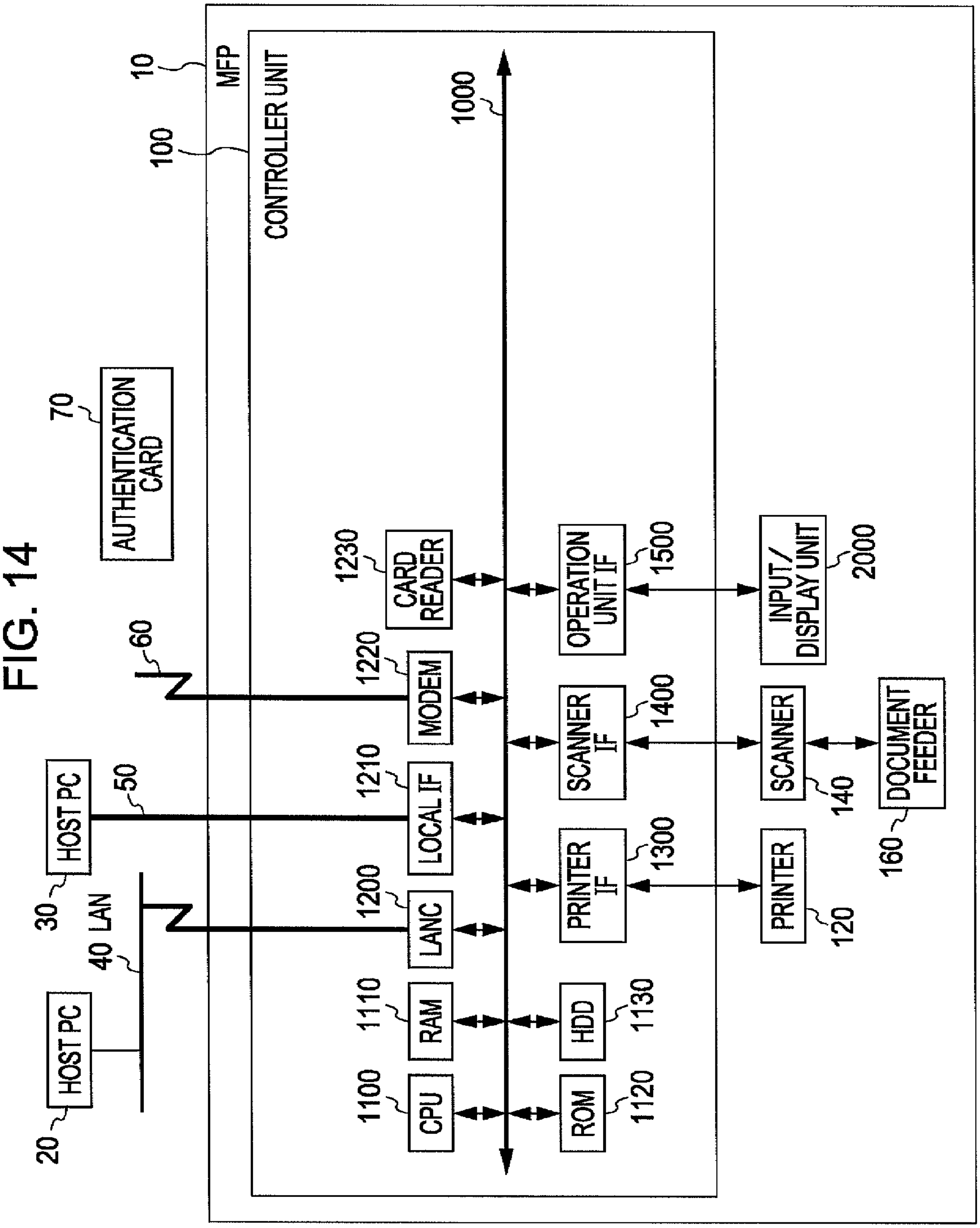
FIG. 14 is a block diagram showing an example configuration of a digital multifunction apparatus and a controller unit thereof according to an embodiment of the present invention.

FIG. 14 is a block diagram showing a configuration of a MFP 10 and a controller unit 100 thereof according to a third embodiment of the present invention. In FIG. 14, similar parts to those in FIG. 3 are denoted by similar reference numerals and a duplicated explanation thereof is omitted herein.

The input/display unit 2000 includes input unit such as a numeric keypad, a copy start button, etc. and display unit such as an LCD device. The input/display unit 2000 is connected to the input/display unit I/F 1500 and the power supply unit (not shown). The input/display unit I/F 1500 is an interface with the input/display unit 2000 and outputs, to the input/display unit 2000, image data to be displayed on the LCD display (not shown) of the input/display unit 2000. The input/display unit I/F 1500 also serves to transfer information input by a user by operating the input/display unit 2000 of the MFP 10 to the CPU 1100.

The MFP 10 also has a power switch (in the form of a hard switch) for turning on/off the electric power supplied from the power supply unit.

[Exemplary Split Programs]

Figure 15:
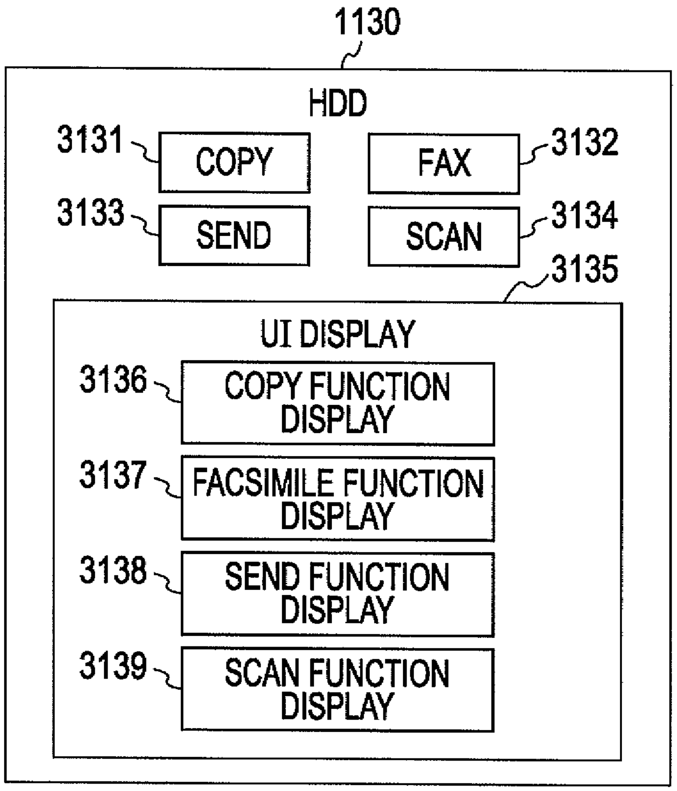
FIG. 15 is a block diagram showing an exemplary bootable system software in the form of split programs stored in an HDD shown in FIG. 14.

FIG. 15 shows exemplary system software in the form of split programs stored in the HDD 1130 shown in FIG. 14.

A copy program 3131, a facsimile program 3132, a send program 3133, a scan program 3134, and a UI display program 3135 are respectively programs to implement the copy function, the facsimile function, the send function, the scan function, and the UI display function. The send function refers to a function of sending data such as document image data read by the MFP 10 as e-mail or using a FTP protocol over a network.

The UI display program 3135 is split into programs for the respective functions. That is, the UI display program 3135 includes a copy function display program 3136, a facsimile function display program 3137, a send function display program 3138, and a scan function display program 3139.

When the power of the MFP 10 is turned on, the CPU 1100 reads the boot program from the ROM 1120. The CPU 1100 then loads programs corresponding to respective functions from the HDD 1130 into the RAM 1110 (if necessary, the programs are decompressed) to make the respective functions executable.

[Exemplary Loading of Split Programs]

FIGS. 16A to 16D show an example of a process of loading split programs such as those shown in FIG. 15 into the work memory area in the RAM 1110. In this specific example, it is assumed that the copy function is enabled preferentially in advance to the other functions.

Figure 16A:
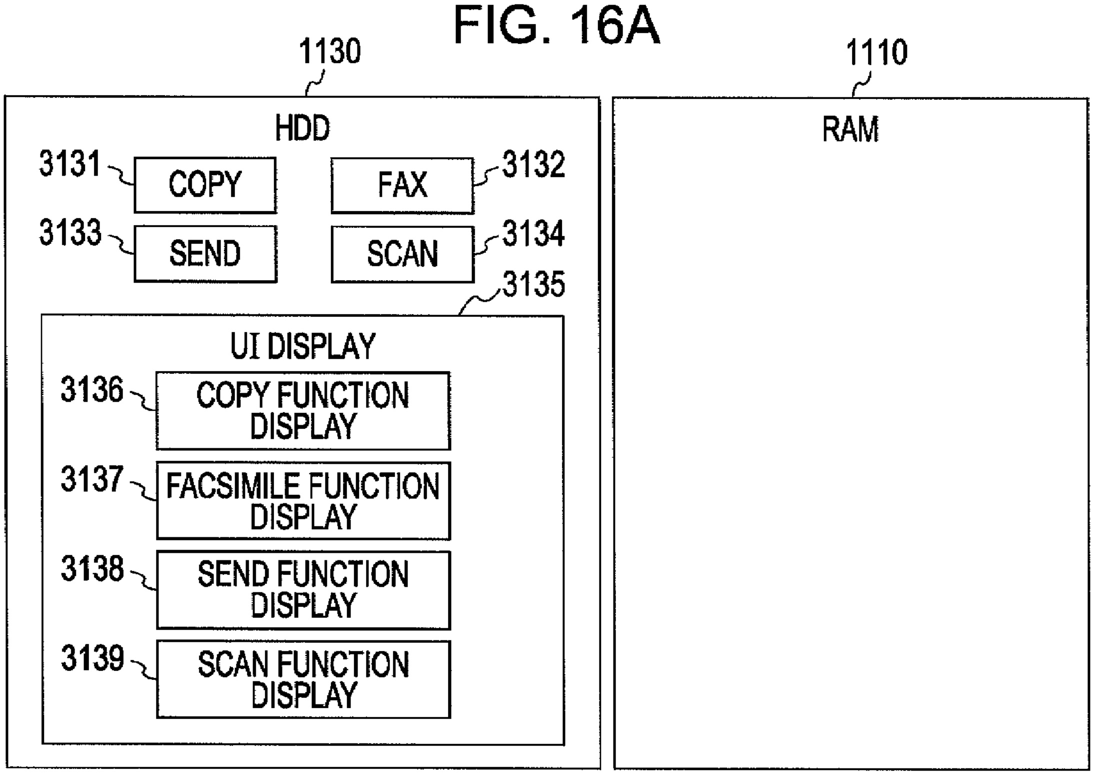
FIGS. 16A through 16D are diagrams showing an exemplary manner in which a CPU loads bootable split programs shown in FIG. 15 into a work memory area of a RAM.

FIG. 16A shows a state in which the power of the MFP 10 has been turned on, but no programs have yet been loaded from the HDD 1130 into the RAM 1110.

Figure 16B:
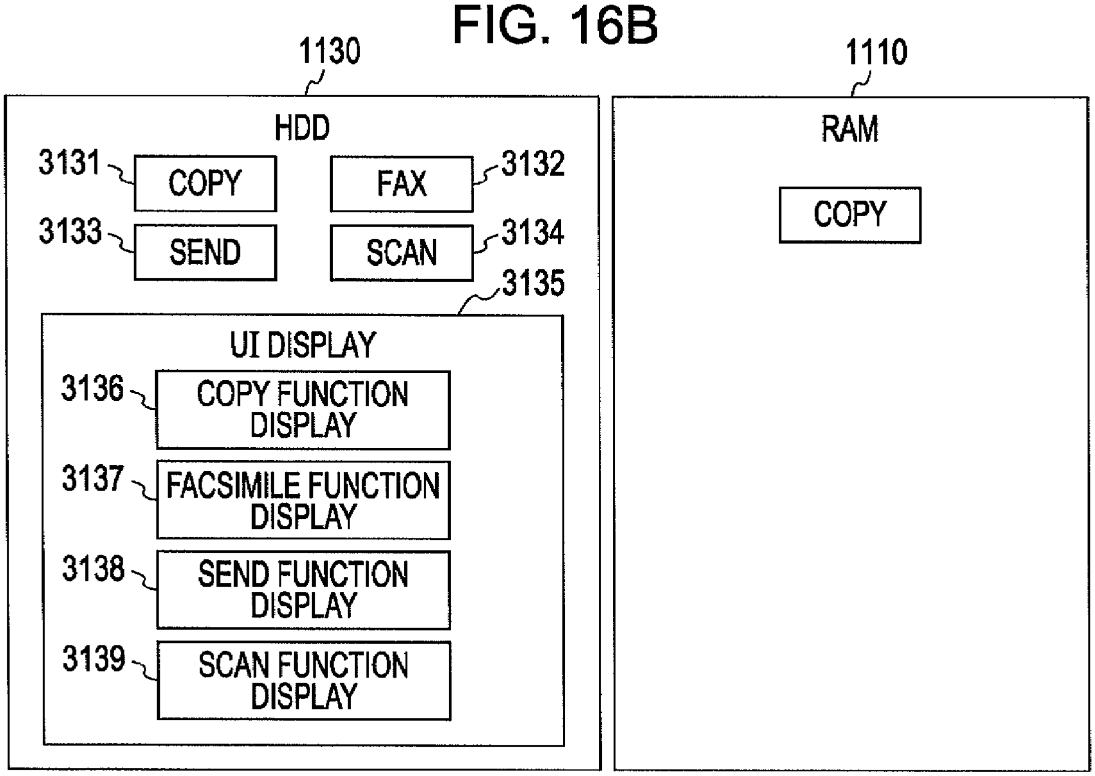

FIG. 16B shows a state in which the copy program 3131 has been loaded from the HDD 1130 into the RAM 1110. In this state, because the copy program 3131 has already been loaded in the RAM 1110, the copy program is ready to be executed. However, in practice, to use the copy function, it is necessary to also load the copy function display program 3136 in the RAM 1110. In the state shown in FIG. 16B, if the copy function display program 3136 is further loaded into the RAM 1110, the copy function becomes usable.

Figure 16C:
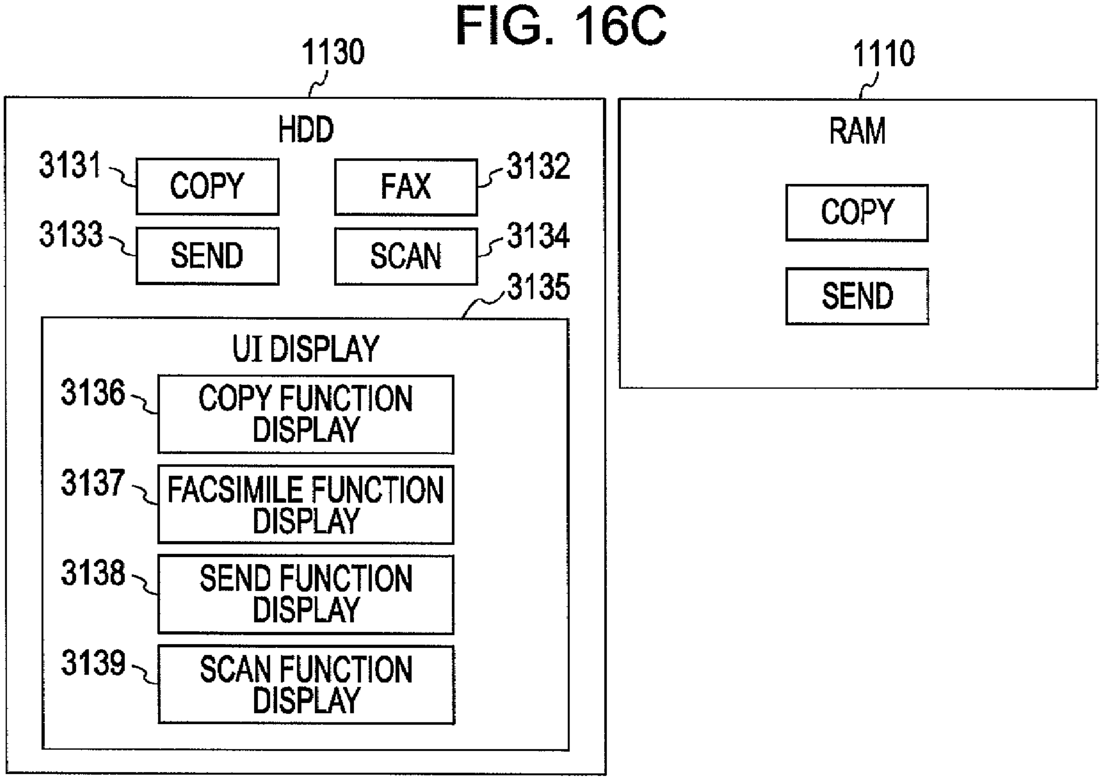

FIG. 16C shows a state in which the send program 3133 has been further loaded from the HDD 1130 into the RAM 1110. In this state in which the send program 3133 has also been loaded in the RAM 1110, the copy function and the send function are usable.

Figure 16D:
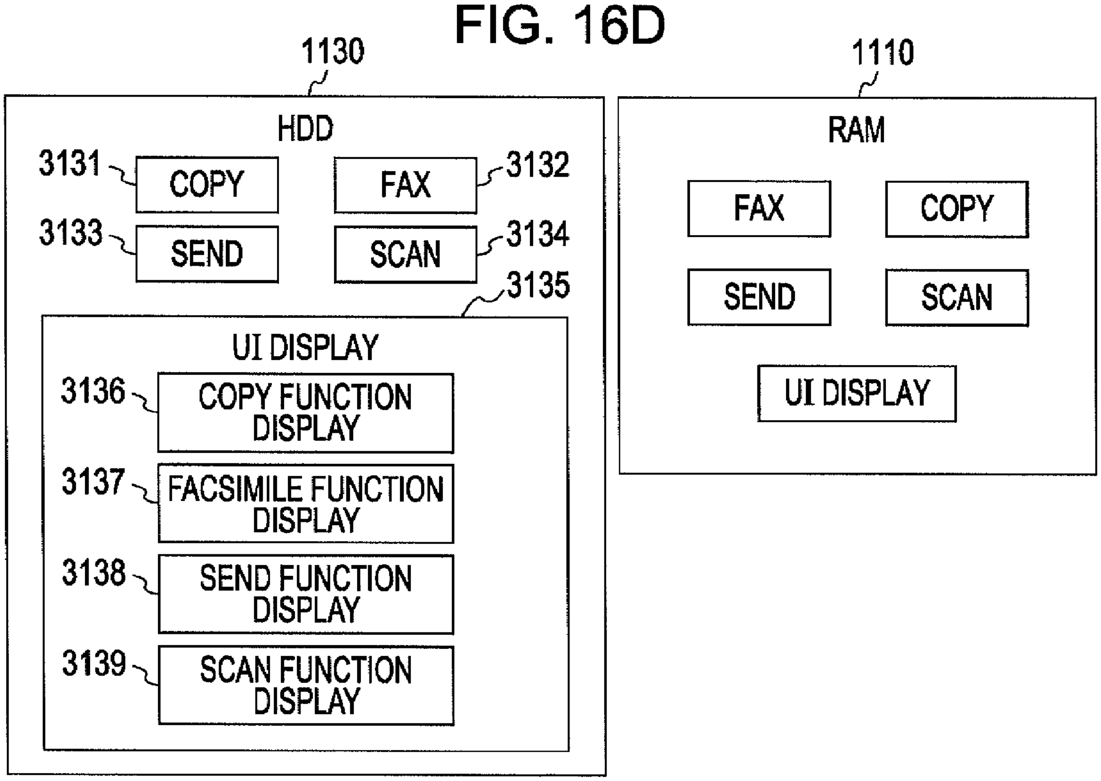

FIG. 16D shows a state programs of all functions of the MFP 10 have been loaded from the HDD 1130 into the RAM 1110. In this state, all functions of the MFP 10 are ready to be executed.

[Exemplary Authentication Card]

FIG. 17 shows an example of an authentication card 70 for use with the MFP 10 according to an embodiment of the present invention.

Figure 17A:
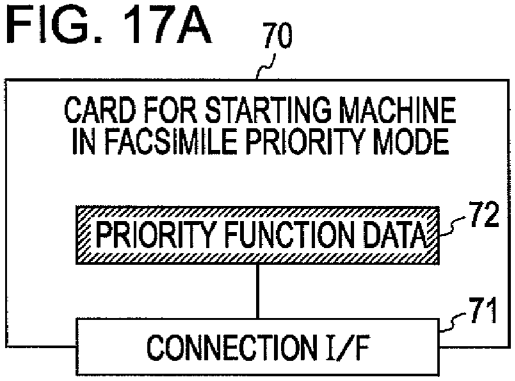
FIGS. 17A through 17E shows an example of an authentication card for use with a digital multifunction apparatus according to an embodiment of the present invention.

As shown in FIG. 17A, the authentication card 70 includes, at least, a memory 72 for storing priority function data 74 (FIG. 17B) and a connection interface 71 for connecting the memory 72 to the card reader I/F 1230 of the MFP 10.

Figure 17B:
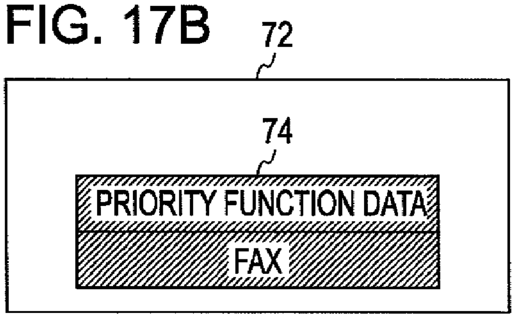
Figure 17D:
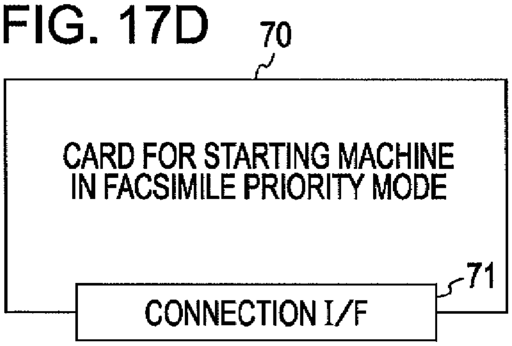
Figure 17C:
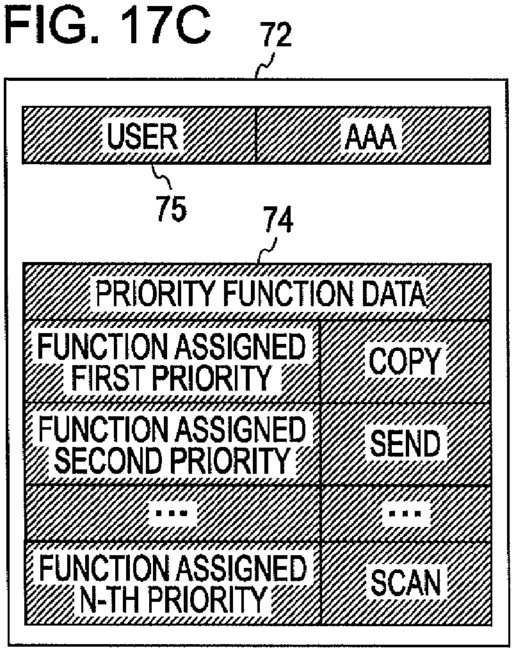

FIGS. 17B and 17C show examples of configurations of the memory 72.

In the example shown in FIG. 17B, the memory 72 is configured so as to store only priority function data 74.

In the example shown in FIG. 17C, the memory 72 is configured so as to store data (user information) 75 indicating a user of the card and priority function data 74. In the example shown in FIG. 17C, the memory 72 is configured so as to store data of a plurality of functions to each of which priority is assigned.

FIG. 17D shows an example of an authentication card including a memory 72 configured in the manner shown in FIG. 17B. In this example, only the priority function data 74 is stored in the memory 72 of the authentication card 70, and thus a label is attached to the card to indicate which function is specified as the function with the highest priority in the priority function data 74. In the specific example shown in FIG. 17D, the facsimile function is specified as the function with the highest priority.

When a user wants to quickly use the facsimile function, if the user connects this authentication card 70 to the card reader I/F 1230 of the MFP 10 and turns on the power of the MFP 10, then the facsimile function is first enabled in advance to the other functions, thereby allowing the user to immediately use the facsimile function.

Figure 17E:
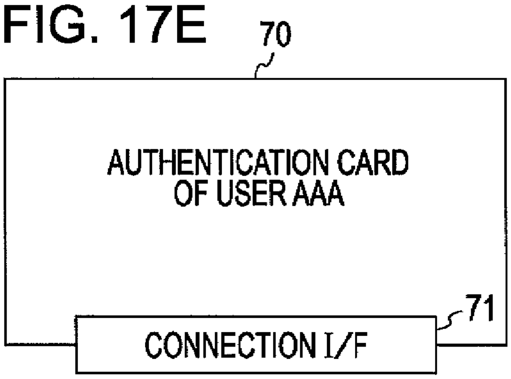

FIG. 17E shows an example of an authentication card including a memory 72 configured in the manner shown in FIG. 17C. In this specific example, a label is attached to the authentication card 70 to indicate that this card is possessed by a user "AAA". The authentication card 70 has a memory 72 in which user information indicating a user is authorized to use the MFP 10 is stored. In the memory 72 of the authentication card 70, priority function data 74 indicating the order of enabling functions for use by the user "AAA" is also stored. When a user uses the MFP 10, the MFP 10 checks the user information described in the authentication card 70 to determine whether the user is an authorized user. The authentication using the authentication card 70 may be performed using a known technique, and thus a further detailed explanation thereof is omitted herein.

It is allowed to easily change the priority function data 74 shown in FIG. 17. For example, in a state in which the authentication card 70 is inserted in the card reader 1230, the priority function data 74 may be rewritten by a user by operating the input/display unit 2000.

[Exemplary Process of Starting Up MFP]

Figure 18:
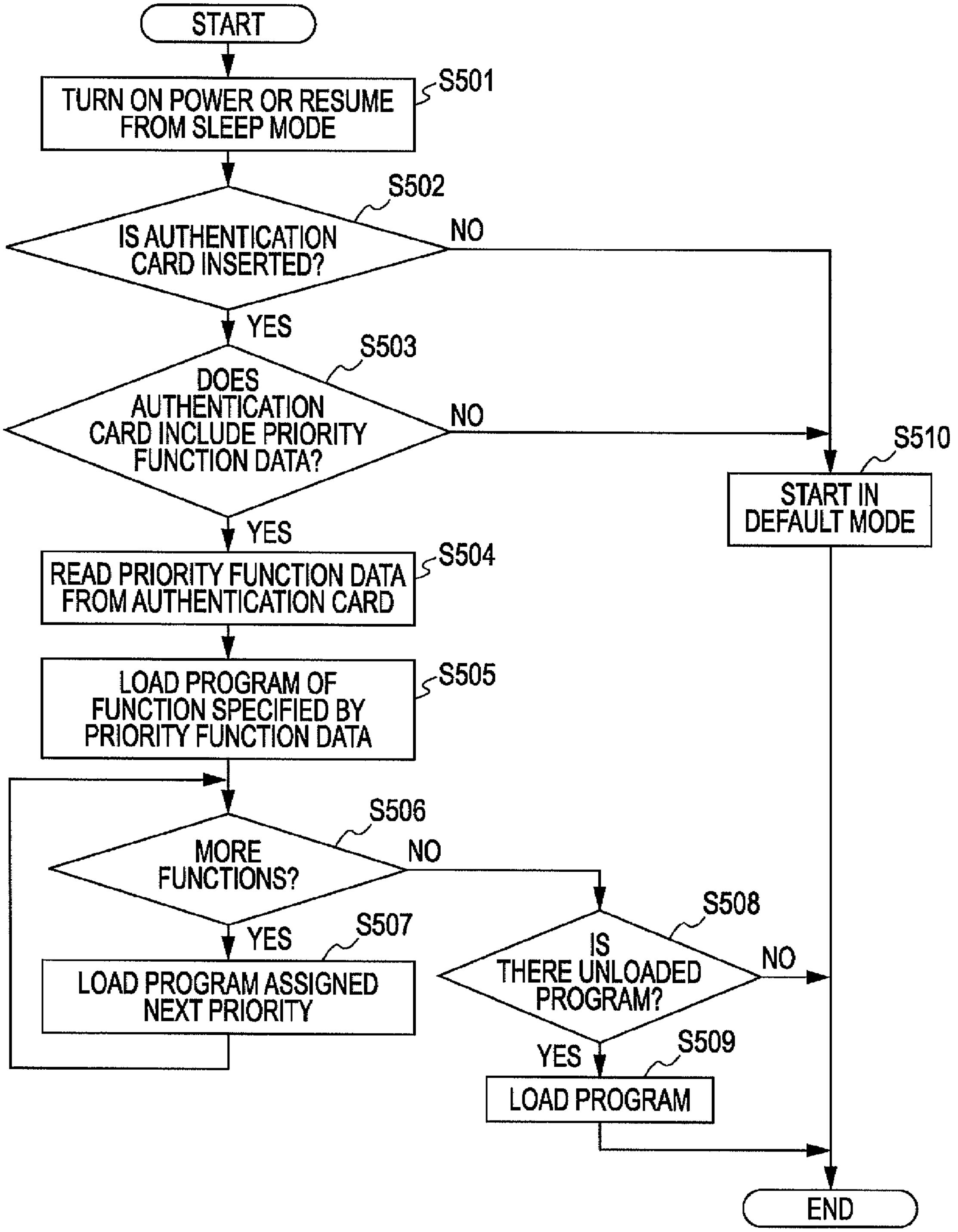
FIG. 18 is a flow chart showing an example of a control procedure according to an embodiment of the present invention.

FIG. 18 is a flow chart showing an example of a control procedure to start up the MFP 10 when the power of the MFP 10 is turned on or the MFP 10 is resumed from the sleep mode according to the present embodiment of the invention. In the following discussion, it is assumed that the authentication card 70 in the state shown in FIG. 17C is connected to the card reader I/F 1230 of the MFP 10. Note that the process shown in this flow chart is performed by the controller unit 100, and more specifically, the process is realized by executing the system boot program stored in the ROM 1120 by the CPU 1100. In this figure, S501 to S510 denote step numbers. With reference to this figure, the respective steps are described in detail below.

First, if the MFP 10 is accepts a power-on command or a command to resume from the sleep mode which needs a boot procedure similar to that performed when the power is turned on (step S501), the process proceeds to step S502.

In step S502, the CPU 1100 determines whether the authentication card 70 is connected (and thus it is possible to read data stored in the authentication card 70). If it is determined that the authentication card 70 is in the connected state (and thus it is possible to read data stored in the authentication card 70), then, in step S503, the CPU 1100 further determines whether priority function data 74 is stored in the authentication card 70.

If it is determined in step S503 that priority function data 74 is stored in the authentication card 70, then in step S504, the CPU 1100 reads the priority function data 74 from the authentication card 70. The CPU 1100 then advances the process to step S505.

Steps S502 to S504 are executed by the CPU 1100 at an early stage in the boot program reading process. Herein the "early stage" refers to a stage at which programs corresponding to functions are not yet read from the HDD 1130. In other words, the boot program stored in the ROM 1120 is adapted to read the function data 74 at the early stage.

Next, in step S505, in accordance with the data read in step S504, the CPU 1100 loads a program of a function assigned first priority from the HDD 1130 into the work memory area of the RAM 1110. The CPU 1100 executes the loaded program so as to enable the function of the program. For example, if the copy function is assigned the first priority, then in step S505 the copy program 3131 is loaded from the HDD 1130 into the RAM 1110.

After completion of loading of the program, in step S506, the CPU 1100 determines whether there is a function assigned next priority. If it is determined that there is a function assigned next priority, the CPU 1100 advances the process to step S507. In step S507, the CPU 1100 loads a program of a function assigned second priority from the HDD 1130 into the work memory area of the RAM 1110. In the following explanation, it is assumed by way of example that the CPU 1100 determines from the priority function data 74 that the send function is assigned the next priority. In this case, in step S107, the CPU 1100 loads the send program 3133 from the HDD 1130 into the work memory area of the RAM 1110.

When the programs of the respective functions are loaded from the HDD 1130 into the RAM 1110 in steps S505 and S507, the CPU 1100 may perform an additional process to load UI display programs corresponding to the respective programs loaded in steps S505 and S507 into the RAM 1110, together with the above-described programs of the functions. Note that this is performed only when the UI display program 3135 is in a form in which the program is divided into a plurality of UI display program modules corresponding to the respective functions, as shown in FIG. 15.

For example, when the copy program 3131 is loaded in step S505 from the HDD 1130 into the RAM 1110, the CPU 1100 loads the copy function display program module 3136 into the RAM 1110. This makes it possible to display a UI to notify a user that the copy function is ready to be used in advance to the other functions.

After step S507 is completed, the CPU 1100 returns the process to step S506 to determine whether there is a further function assigned next priority. Steps S506 and S507 are performed repeatedly unit programs of all priority functions to be activated have been loaded.

If the CPU 1100 determines in step S506 there is no more priority function to be activated, the CPU 1100 advances the process to step S508.

In the example of the authentication card 70 shown in FIG. 17C, the scan program 3134 is specified as a priority function to be activated at last. Therefore, if the scan program 3134 is loaded from the HDD 1130 into the RAM 1110, then in step S506 it is determined that there is no more priority function to be activated, and thus the process proceeds to step S508.

In step S508, the CPU 1100 determines whether there are more programs to be loaded into the RAM 1110. If it is determined that there are more programs to be loaded, the CPU 1100 advances the process to step S509.

In step S509, the CPU 1100 loads the programs, which should be loaded into the RAM 1110, from the HDD 1130 into the RAM 1110. The CPU 1100 then executes the loaded programs so as to enable the corresponding functions to become usable, and the CPU 1100 ends the present process.

On the other hand, in the case in which it is determined in step S508 that there are no more programs to be loaded into the RAM 1110, the CPU 1100 ends the process.

In a case in which it is determined in step S502 that no authentication card 70 is connected, the process proceeds to step S510.

Also in a case in which it is determined in step S503 that the authentication card 70 does not have priority function data 74, the process proceeds to step S510.

In step S510, the CPU 1100 starts up the MFP 10 in accordance with the default procedure. That is, the CPU 1100 loads the programs of the respective functions from the HDD 1130 into the RAM 1110 in the default order. When all programs have been loaded, the MFP 10 becomes ready to be used, and thus the CPU 1100 ends the present process.

As described above, by employing the high-speed system program start-up method using the authentication card 70 in which functions to be enabled preferentially in advance to the other functions are specified for each user, it is allowed to quickly start up the MFP 10 such that a particular function which will be used by a user is quickly brought into a ready-for-use state preferentially in advance to the other functions.

Fourth Exemplary Embodiment

In the third embodiment described above, start-up of a priority function is controlled for each user in accordance with priority function data stored in the authentication card 70. Instead, in a fourth embodiment described below, information indicating a function used by each user in a previous operation is stored in the controller unit 100. When the MFP 10 is turned on or reduced from the sleep mode, user authentication is performed, and the function used by the user in a previous operation is started up in a preferential start-up mode.

[Exemplary Controller Unit]

Figure 19:
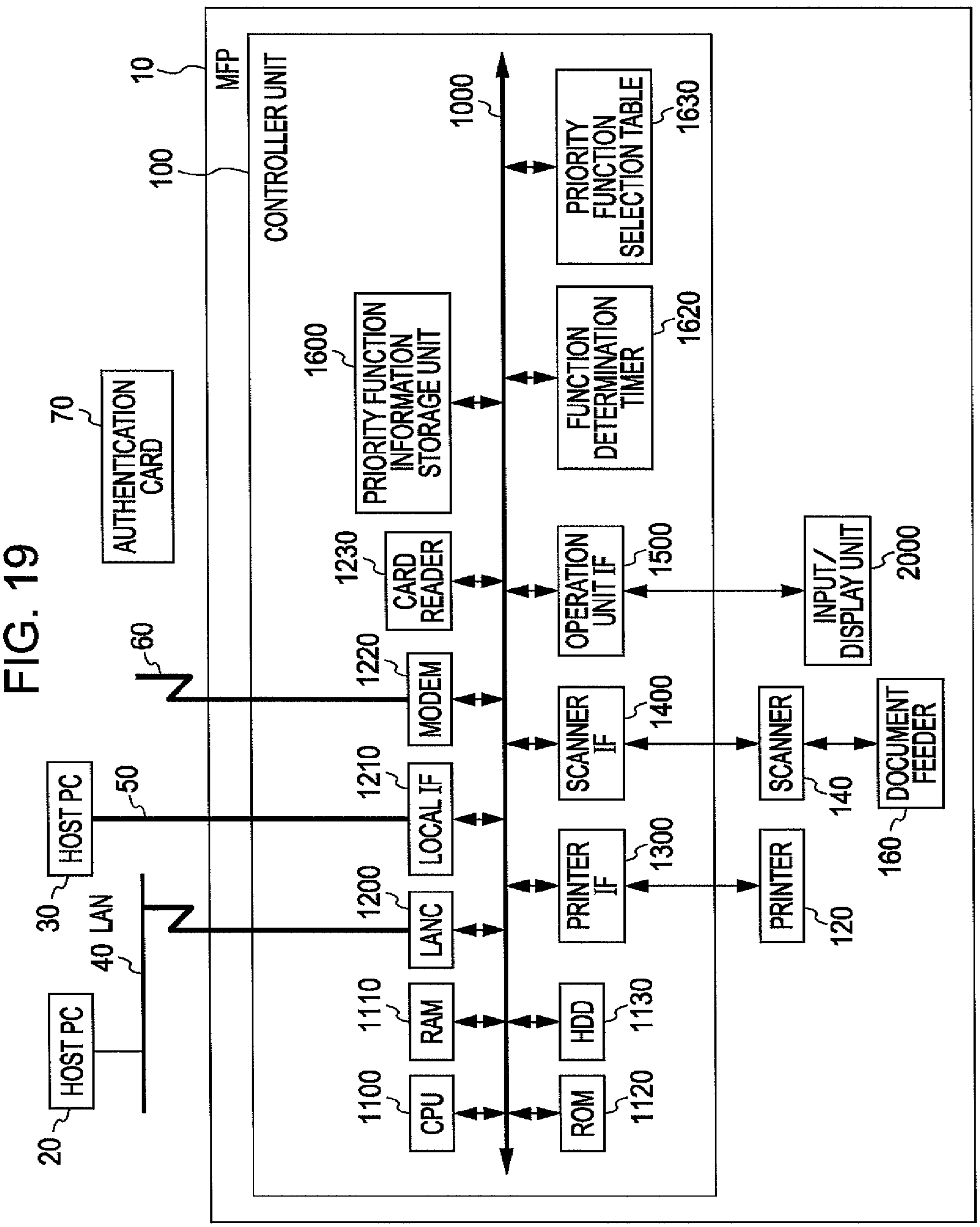
FIG. 19 is a block diagram showing an example configuration of a digital multifunction apparatus and a controller unit thereof according to an embodiment of the present invention.

FIG. 19 is a block diagram showing a configuration of a MFP 10 and a controller unit 100 thereof according to a fourth embodiment of the present invention. In FIG. 19, similar parts to those in FIG. 3 or 14 are denoted by similar reference numerals.

In FIG. 19, the priority function storage unit 1600 stores information indicating which one of the functions (the copy function, the facsimile function, the send function, and the printer function) of the MFP 10 should be started up preferentially when the power of the MFP 10 is turned on or when the MFP 10 is resumed from the sleep mode.

The MFP 10 has a power switch (in the form of a hard switch) although not shown in FIG. 19. When the power switch is pressed, the electric power is turned on and electric power is supplied from a power supply unit (not shown).

[Exemplary Split Program]

Figure 20A:
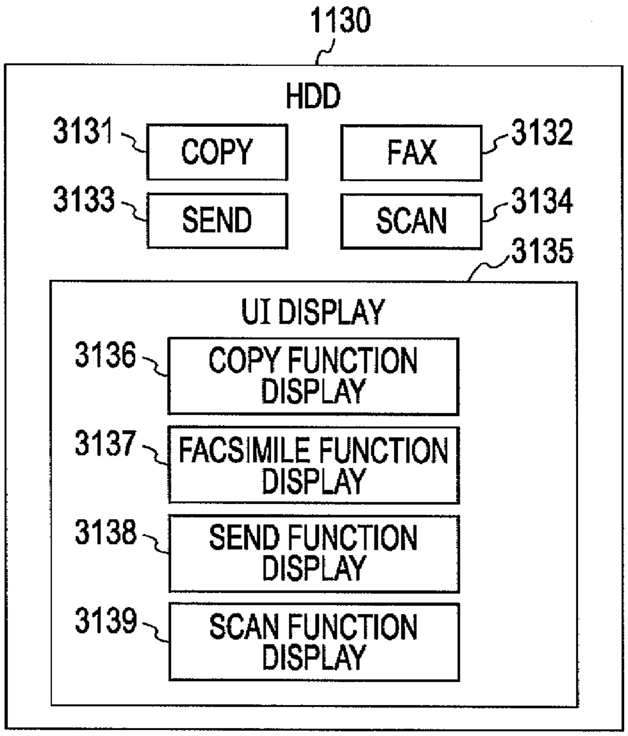
FIGS. 20A to 20C are block diagrams showing exemplary bootable system software in the form of split programs stored in an HDD shown in FIG. 14 and also showing a manner in which a system is booted.
Figure 20B:
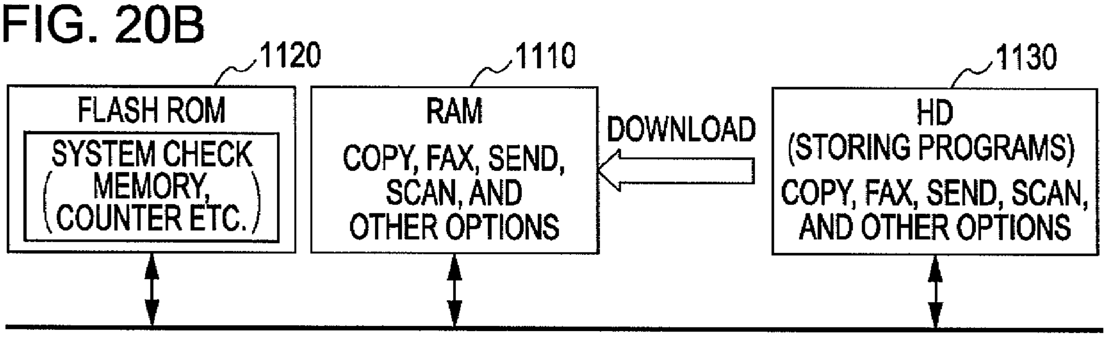
Figure 20C:
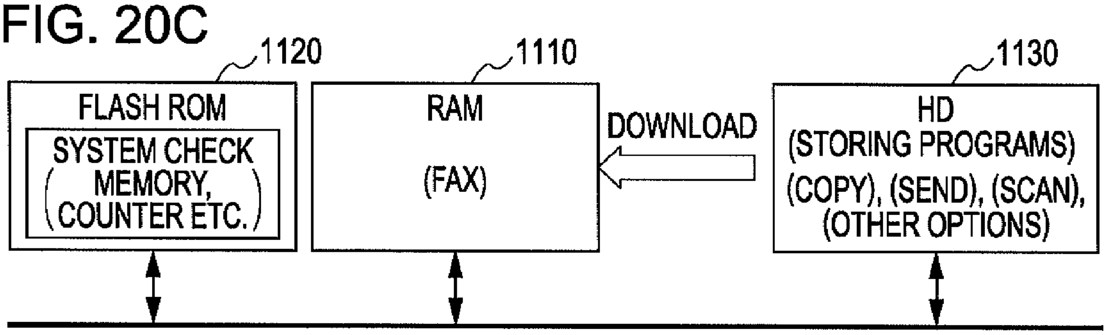

FIGS. 20A to 20C show system software stored in the HDD 1130 shown in FIG. 14 and also show a manner in which a system is started up.

FIG. 20A shows system software in the form of split programs stored in the HDD 1130 shown in FIG. 14. The split programs shown in FIG. 20A are similar to those according to the third embodiment described above with reference to FIG. 15, and thus a further detailed explanation thereof is omitted herein.

[Start-Up Process According to Conventional Technique]

FIG. 20B shows a manner in which a system is started up in a MFP according to a conventional technique. In this case, the CPU 1100 starts up the system by performing steps (A) to (C) described below.

In step (A), the CPU 1100 loads a system check program from a flash ROM (ROM 1120) and starts up the system. The system checking includes access checking of the RAM 1110, access checking of the input/display unit I/F 1500, and access checking of the card reader 1230.

In step (B), the CPU 1100 all functions including the copy function, the facsimile function, the scan function, the send function and other functions from the HDD 1130 into the RAM 1110.

In step (C), the CPU 1100 starts up the system by executing the programs loaded in the RAM 1110.

In the conventional method shown in FIG. 20B, the system is started up in steps (B) and (C) by loading all functions of the MFP 10, including the copy function, the facsimile function, the scan function, the send function and other functions, into the RAM 1110, and thus it takes a long time until the MFP 10 becomes ready for use.

The program size increases with the number of functions provided by the MFP 10. Therefore, as the number of functions increases, it takes a longer time to start up the system and thus a user has to wait for a longer time. It is possible to immediately use the MFP 10, if the MFP 10 is maintained in the ON state. However, this causes the MFP 10 to uselessly consume electric power when the MFP 10 is not used.

[Exemplary Start-Up of MFP by Loading Split Programs Depending on Necessary Functions]

FIG. 20C shows a manner in which the MFP 10 is started up by loading split programs according to the present embodiment of the invention.

In the start-up method according to the present embodiment, the programs are split into modules corresponding to the functions, and a program of a function with highest priority is first loaded and is made executable. Thereafter, the programs of the other functions are sequentially loaded and made executable, via a procedure including steps (i) to (iv) described below.

(i) If a command to turn on the power of the MFP 10 or a command to resume MFP 10 from the sleep mode is issued, the CPU 1100 loads a system check program from a flash ROM (ROM 1120) and starts up the system.

(ii) After start-up of the system is completed, the user information stored in the authentication card 70 is read via the card reader 1230, and information indicating a function to be activated preferentially for a user identified by the user information is read from the priority function storage unit 1600. In the present example, it is assumed that the facsimile function is specified as a priority function in the priority function storage unit 1600. Note that a function used by a user in a previous operation is regarded as a priority function and information indicating this function is recorded in the priority function storage unit 1600. In the present embodiment, when a user uses the MFP 10, user authentication is first performed using the authentication card 70. In the authentication process, the controller 100 identifies the user. Instead of using the authentication card, user authentication may be performed using other methods. For example, user authentication may be performed on the basis of a user ID and a password input via the input/display unit 2000 or may be performed using a known biometric authentication technique.

In accordance with the data stored in the priority function storage unit 1600, the CPU 1100 loads the facsimile program 3132 from the HDD 1130 into the RAM 1110. The facsimile function display program 3137 may be loaded together with the facsimile program 3132 into the RAM 1110.

(iii) The CPU 1100 executes the facsimile program 3132 loaded in the RAM 1110 to make the facsimile function ready for use.

(iv) In the state in which the facsimile function is ready to be used, the CPU 1100 sequentially loads programs of other functions from the HDD 1130 into the RAM 1110 and makes these functions ready for use.

Via the above-described steps (i) to (iv), the MFP 10 is started up such that the facsimile function is first made usable in advance to the other functions.

Although in the example shown in FIG. 20C, the facsimile function is first made usable in advance to the other functions, any other function may be first started up by loading a corresponding split program.

Figure 21:
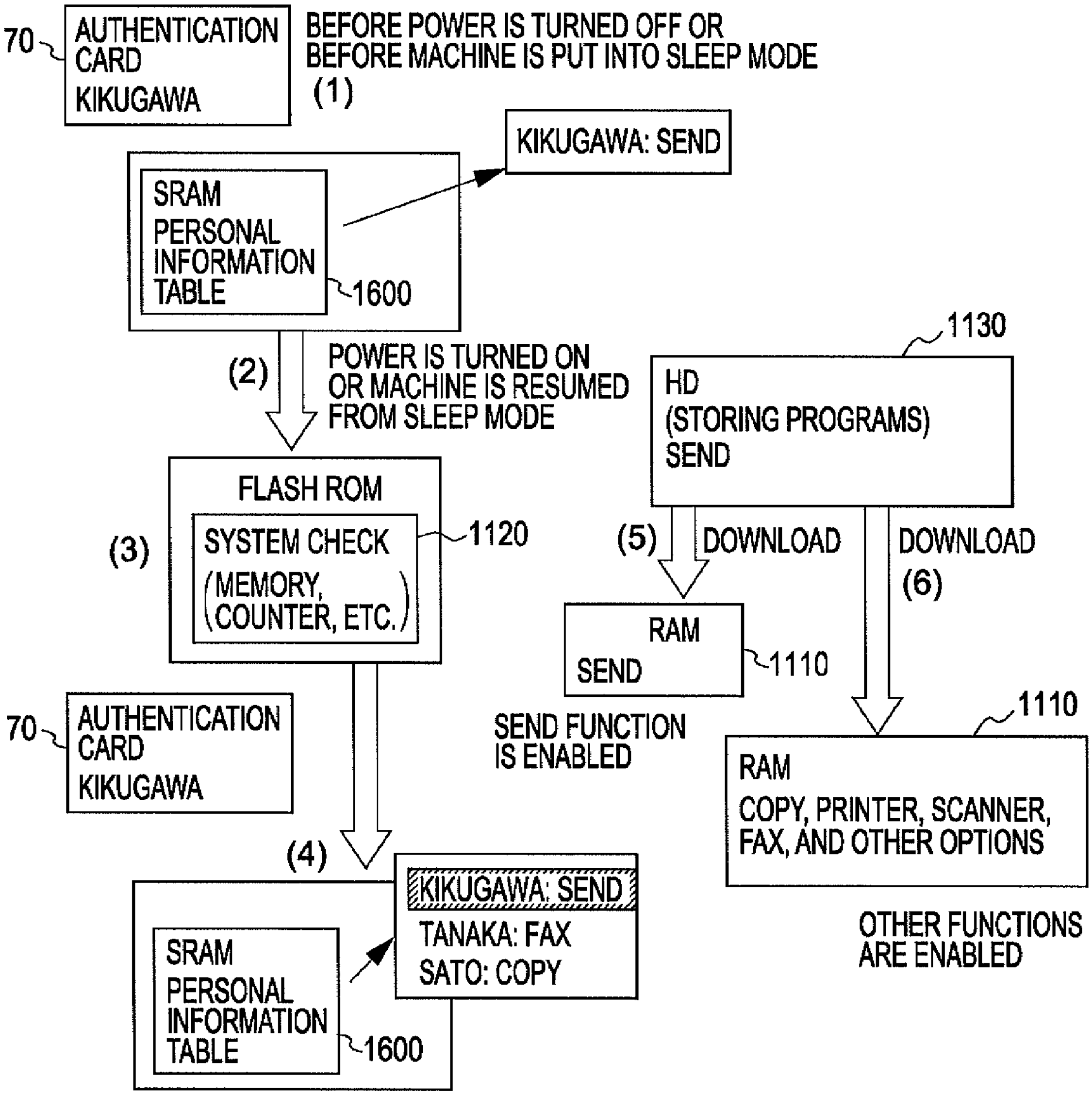
FIG. 21 is a diagram showing an exemplary manner in which when electric power of a digital multifunction apparatus is turned on, a particular program of a function is loaded and activated depending on a user, in accordance with user information and usage history information stored in an authentication card.

FIG. 21 shows a manner in which when electric power of a MFP 10 is turned on, a particular program of a function is loaded and activated depending on a user, in accordance with user information and usage history information stored in an authentication card 70. Note that this process is performed under the control of the controller unit 100 shown in FIG. 19.

When a particular function is used by a user, if the user wants to use this function in the preferential start-up mode in a next operation, the user inserts the authentication card 70 into the card reader 1230 at a proper time before the power of the MFP 10 is turned off. The CPU 1100 reads the personal information from the authentication card 70 and stores information indicating the function and the usage conditions in connection with the personal information into an SRAM (the priority function storage unit 1600).

For example, if a user "Kikugawa" uses the send function, the CPU 1100 reads user information and associated information from the authentication card 70 and stores, in the priority function storage unit 1600, information indicating the send function and the conditions under which the send function was used together with the personal information of "Kikugawa".

The power of the MFP 10 is then turned off, or the MFP 10 is turned into the sleep mode ((2) in FIG. 21).

Thereafter, if the user inserts the authentication card 70 into the card reader 1230 and turns on the power or resumes the MFP 10 from the sleep mode, the CPU 1100 executes system check program stored in the ROM 1120 to start up the MFP 10 as shown in (3) of FIG. 21.

Thereafter, as shown in (4) of FIG. 21, the CPU 1100 reads information stored in the authentication card 70 inserted in the card reader 1230. The CPU 1100 further reads information from the priority function storage unit 1600 to detect a function specified to be activated preferentially for the user.

Herein, let us assume by way of example that data stored in the priority function storage unit 1600 indicates that the send function is specified as a function with highest priority for a user "Kikugawa", the facsimile function for a user "Tanaka", and the copy function for a user "Sato".

Thus, when user "Kikugawa" turns on the power with the authentication card 70 being inserted in the card reader 1230, the send function is specified as the highest-priority function. When user "Tanaka" turns on the power with the authentication card 70 being inserted in the card reader 1230, the facsimile function is specified as the highest-priority function. When user "Sato" turns on the power with the authentication card 70 being inserted in the card reader 1230, the copy function is specified as the highest-priority function.

Thereafter, as shown in (5) of FIG. 21, the CPU 1100 first loads the program of the highest-priority function (for example, the send function) from the HDD 1130 into the RAM 1110. As a result, the send function is first started up and becomes usable first in advance to the other functions.

Furthermore, as shown in (6) of FIG. 21, the CPU 1100 loads remaining programs of functions other than the send program from the HDD 1130 into the RAM 1110. As a result, all functions of the MFP 10 become usable.

[Exemplary Process Performed When Power is Turned Off or MPF is Put Into Sleep Mode]

Figure 22:
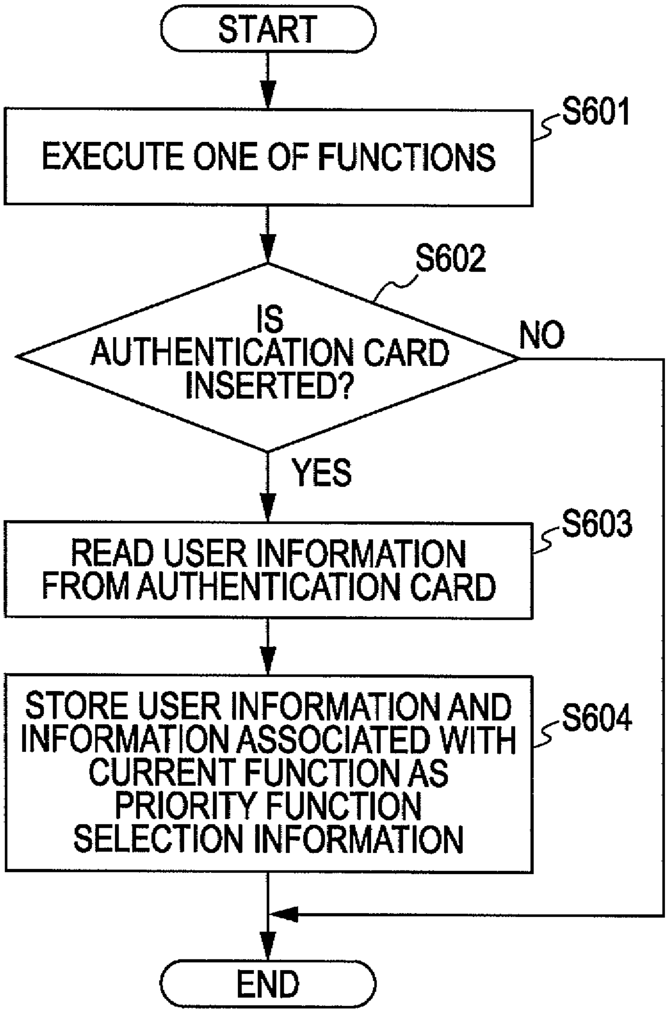
FIG. 22 is a flow chart showing an example of a control procedure according to an embodiment of the present invention.

FIG. 22 is a flow chart showing an example of a control procedure to shut down the MFP 10 or put the MFP 10 into the sleep mode. Note that the process shown in this flow chart is performed by the controller unit 100, and more specifically, the process is realized by executing the system boot program stored in the ROM 1120 by the CPU 1100. In this figure, S601 to S604 denote step numbers. With reference to this figure, the respective steps are described in detail below.

First, if a user performs an operation of associated with one of functions including the copy function, the facsimile function, the send function, and the scan function (step S601), the CPU 1100 advances the process to step S602.

In step S602, the CPU 1100 determines whether the authentication card 70 is connected to the card reader 1230 (and thus it is possible to read data stored in the authentication card 70). If the authentication card 70 is not connected to the card reader 1230 (that is, if it is impossible to read data from the authentication card 70), the CPU 1100 ends the present process.

In the case in which it is determined in step S602 that the authentication card 70 is in the connected state (and thus it is possible to read data stored in the authentication card 70), the CPU 1100 advances the process to step S603. In step S602 described above, when no inserted authentication card is detected, if user authentication has been performed for the present user and if the controller 100 can identify the present user, the process may proceed to step S603.

In step S603, the CPU 1100 reads user information from the authentication card 70.

Next, in step S604, the CPU 1100 stores, in the priority function storage unit 1600, user information read in step S603 and information indicating the function operated in step S601 (the function being currently used), and the CPU 1100 ends the present process.

Thereafter, if a command to turn off the power or turn the operation mode into the sleep mode, the CPU 1100 turns off the power of the MFP 10 or puts the MFP 10 into the sleep mode.

In the process according to the present embodiment described above with reference to the flow chart shown in FIG. 22, each time an operation is performed, information indicating which function is operated is stored in the priority function storage unit 1600 together with user information indicting the user. Alternatively, when a power-off command or a sleep command is detected, information indicating a function selected at this point of time may be stored together with user information in the priority function storage unit 1600.

[Exemplary Start-Up Operation]

Figure 23:
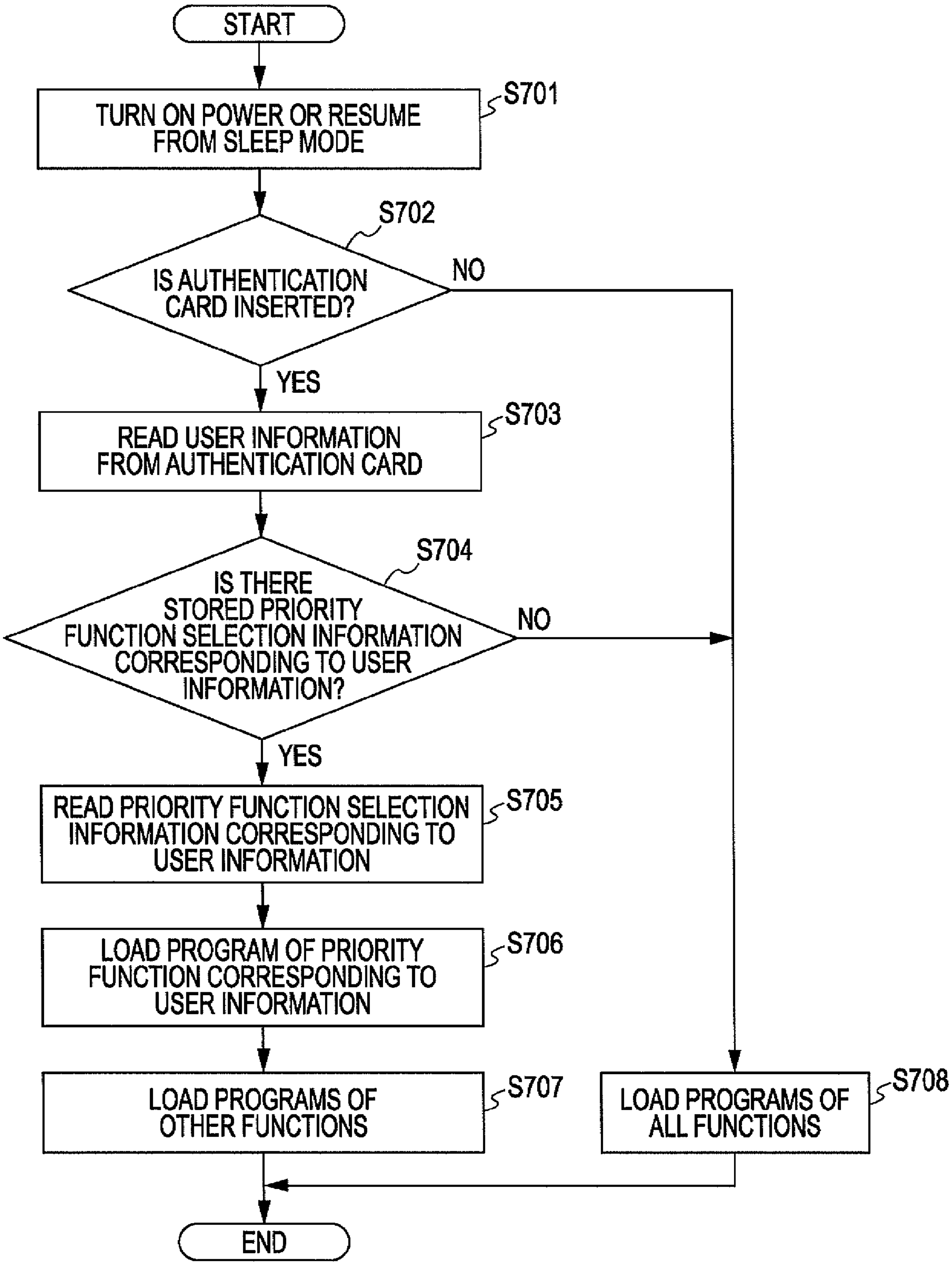
FIG. 23 is a flow chart showing an example of a control procedure according to an embodiment of the present invention.

FIG. 23 is a flow chart showing an example of a control procedure to start up the MFP 10 when the power of the MFP 10 is turned on or the MFP 10 is resumed from the sleep mode according to the present embodiment of the invention. Note that the process shown in this flow chart is performed by the controller unit 100, and more specifically, the process is realized by executing the system boot program stored in the ROM 1120 by the CPU 1100. In this figure, S701 to S708 denote step numbers. With reference to this figure, the respective steps are described in detail below.

First, in step S701, if the power of the MFP 10 is turned on or the MFP 10 is resumed from the sleep mode, which needs a boot procedure similar to that performed when the power is turned on, then in step S702, the CPU 1100 determines whether the authentication card 70 is connected to the card reader 1230 (and thus it is possible to read data stored in the authentication card 70). If it is determined that the authentication card 70 is connected to the card reader 1230 (that is, if it is possible to read data from the authentication card 70), then, in step S703, the CPU 1100 reads user information from the authentication card 70.

Next, in step S704, the CPU 1100 determines whether the priority function storage unit 1600 includes priority function selection information corresponding to the user information read in step S703. If the answer to step S704 is Yes, then in step S705, the CPU 1100 reads the priority function selection information corresponding to the user information from the priority function storage unit 1600.

Next, in step S706, the CPU 1100 loads a program corresponding to the priority function selection information read in step S705 and a function display program corresponding to this function from the HDD 1130 into the RAM 1110. The CPU 1100 then activates the programs such that the function becomes usable. For example, when the send function is specified by the priority function selection information corresponding to the user information, the send program 3133, and the send function display program 3138 are loaded from the HDD 1130 into the work memory area of the RAM 1110. The CPU 1100 then activates the programs such that the send function becomes usable.

After completion of loading of the above programs, in step S707, the CPU 1100 loads the remaining programs of other functions from the HDD 1130 into the RAM 1110, and the CPU 1100 activates these programs such that the functions corresponding to these programs also become usable.

On the other hand, in the case in which it is determined in step S702 that the authentication card 70 is not connected to the card reader 1230 (that is, if it is impossible to read data from the authentication card 70), the CPU 1100 advances the process to step S708. Also in the case in which it is determined in step S704 that the priority function storage unit 1600 does not include priority function selection information corresponding to the user information, the CPU 1100 advances the process to step S708.

In step S708, the CPU 1100 loads the programs of all functions of the MFP 10 from the HDD 1130 into the RAM 1110 in the default order. After all programs have been loaded, the CPU 1100 enables the MFP 10 to be used. When the start-up process is completed, the CPU 1100 ends the process.

In the present embodiment, as described above, user authentication is performed using the authentication card 70, and the start-up operation is performed so that the function used in the previous operation by the user identified by the user information described in the authentication card 70 becomes first usable in advance to the other function. This makes it possible to start up the system so that a function most likely to be used by each user becomes quickly usable.

In the present embodiment, when the power of the MFP 10 is turned on, user information is read from the authentication card 70 via the card reader 1230. Alternatively, when the power of the MFP 10 is turned on, a boot program of user information input function may be first executed, and user information may be input via the input/display unit 2000.

The authentication card 70 may be of a contact read type or a non-contact read type. Alternatively, user information may be read using an RF-ID technique. The user information may be a user ID or other information as long as the user information definitely identifies a user. For example, biometric information (such as a fingerprint, a voice print, a cornea pattern, a vein pattern, etc.) of a user may be used. In the case in which biometric information of a user is used, when the power of the MFP 10 is turned on, biometric information is read using biometric information input unit (such as fingerprint reader, a microphone, a corneal pattern reader, or a palm vein pattern reader). Instead of providing an authentication card reader or a biometric information reader, a user ID and/or a password may be input via the input/display unit 2000.

The priority function data 74 shown in FIG. 17 may be easily changed by a user. For example, in a state in which the authentication card 70 is inserted in the card reader 1230, a user may be allowed to rewrite the priority function data 74 by operating the input/display unit 2000.

Exemplary Fifth Embodiment

In a fifth embodiment described below, when a start key is pressed within a predetermined time period (a timeout value set in a function determination timer 1620) after the power of the MFP 10 is turned on, a determination is made as to whether to preferentially load program modules necessary to read documents or to load program modules of all functions, depending on whether there is a document on a document feeder.

[Exemplary Controller Unit]

Figure 24:
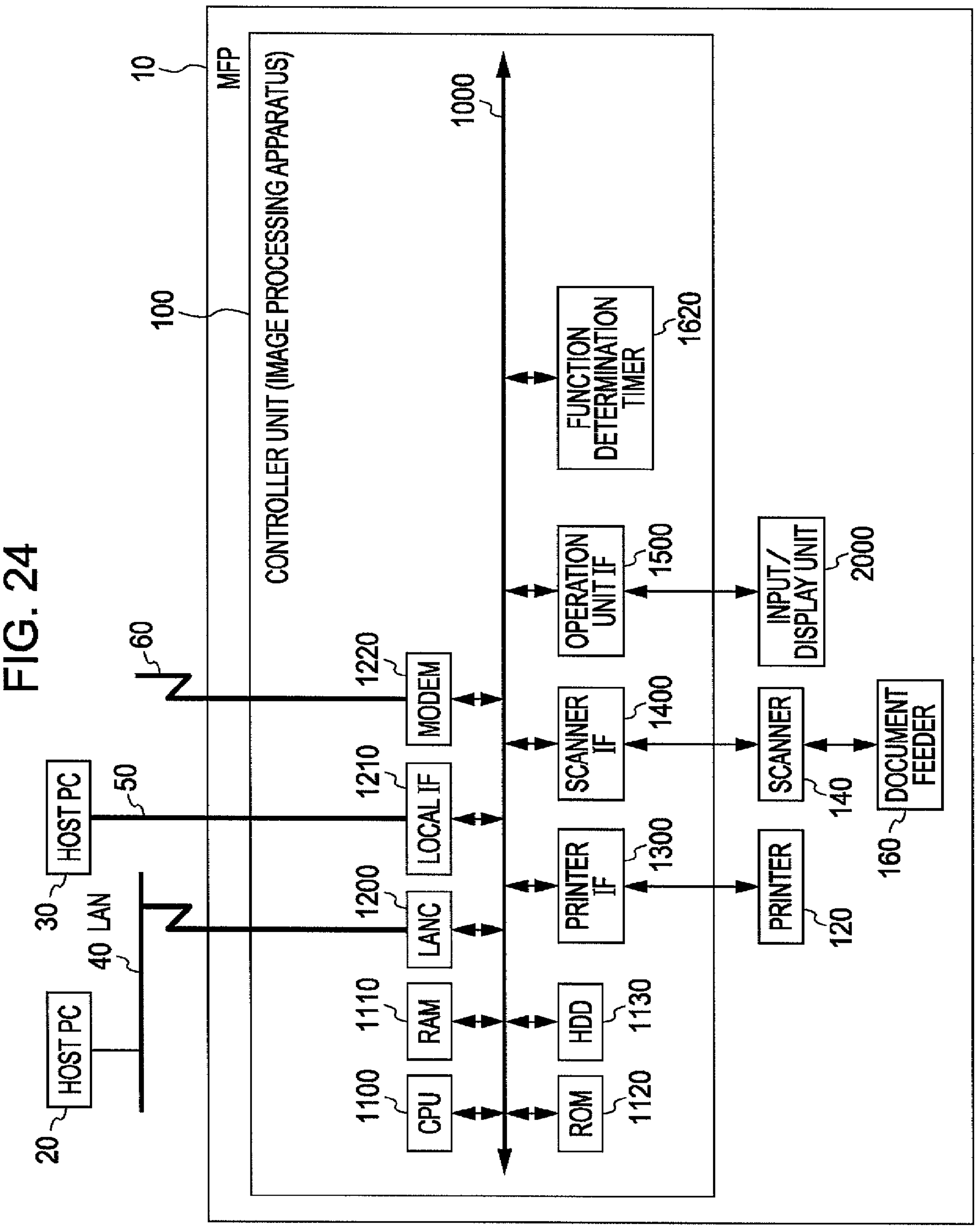
FIG. 24 is a block diagram showing an example configuration of a digital multifunction apparatus and a controller unit thereof according to an embodiment of the present invention.

FIG. 24 is a block diagram showing an example configuration of a MFP 10 and a controller unit 100 thereof according to a fifth embodiment of the present invention. In FIG. 24, similar parts to those in FIG. 14 are denoted by similar reference numerals and a duplicated explanation thereof is omitted herein.

The input/display unit 2000 is connected to the input/display unit I/F 1500. The input/display unit I/F 1500 is an interface with the input/display unit 2000 and outputs, to the input/display unit 2000, image data to be displayed on the LCD display 2232 (FIG. 27) of the input/display unit 2000. The input/display unit I/F 1500 also serves to transfer information input by a user by operating the input/display unit 2000 of the MFP 10 to the CPU 1100.

The function determination timer 1620 counts a time elapsed since the main power of the MFP 10 is turned on. Depending on whether the start key is pressed within a predetermined time period, it is determined whether the MFP 10 is started up in a mode in which functions are limited particular ones or a particular function is activated preferentially in advance to the other functions or in a mode in which all functions are activated. The setting of the function determination timer 1620 is performed using a register which is not shown in FIG. 24. The predetermined time period may be arbitrarily set or changed by an administrator or an operator of the MFP 10 by operating the input/display unit 2000.

For example, the MFP 10 is operated as follows. First, the main power of the MFP 10 is turned on. A user then sets a stack of documents on the document feeder 160 of the MFP 10 and presses the start key 2229 (FIG. 27) disposed on the input/display unit 2000 of the MFP 10. If it is determined that the start key 2229 was pressed within the predetermined time period, the MFP 10 is started up in a copy mode, and copying of documents set on the document feeder 160 is started.

The MFP 10 has a power switch (in the form of a hard switch) although not shown in FIG. 19. When the power switch is pressed, the electric power is turned on and electric power is supplied from a power supply unit (not shown).

[Exemplary Split Program]

Figure 25:
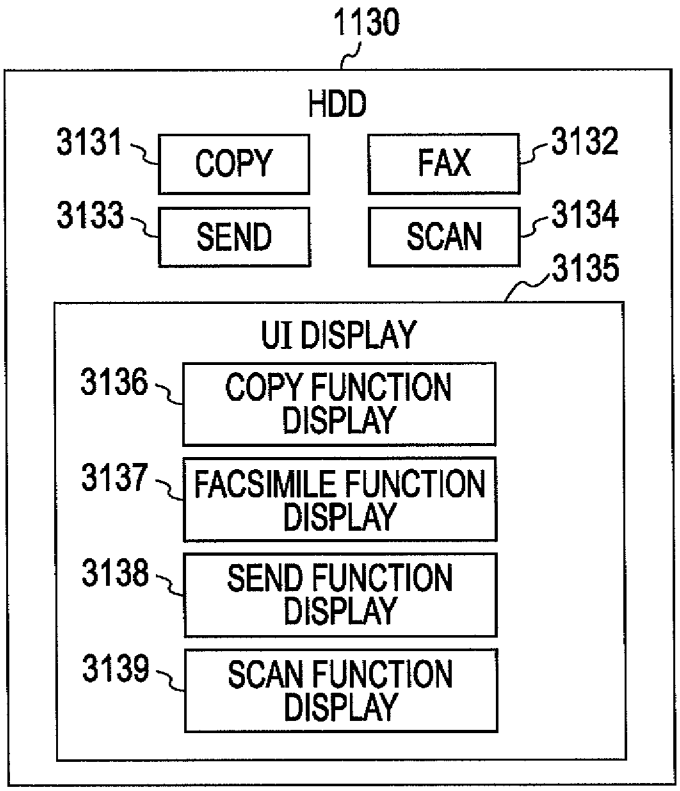
FIG. 25 is a block diagram showing an exemplary bootable system software in the form of split programs stored in an HDD shown in FIG. 24.
Figure 26A:
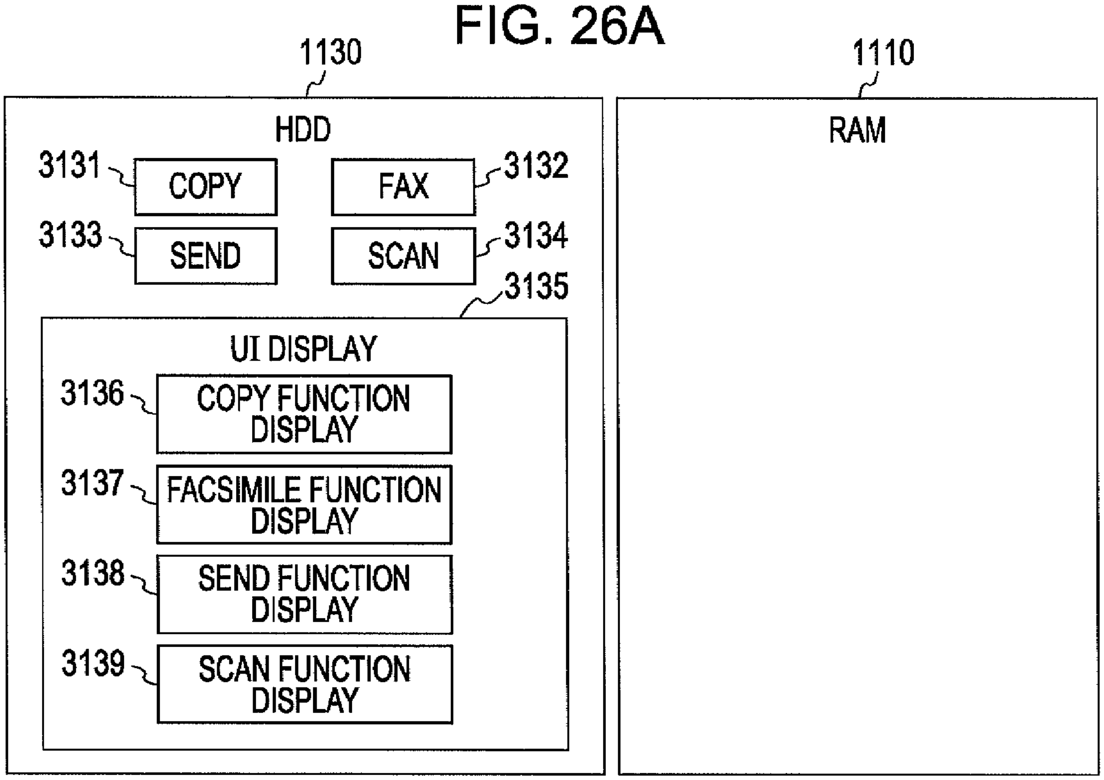
FIGS. 26A to 26D are diagrams showing an exemplary manner in which a CPU loads bootable split programs shown in FIG. 25 into a work memory area of a RAM.
Figure 26B:
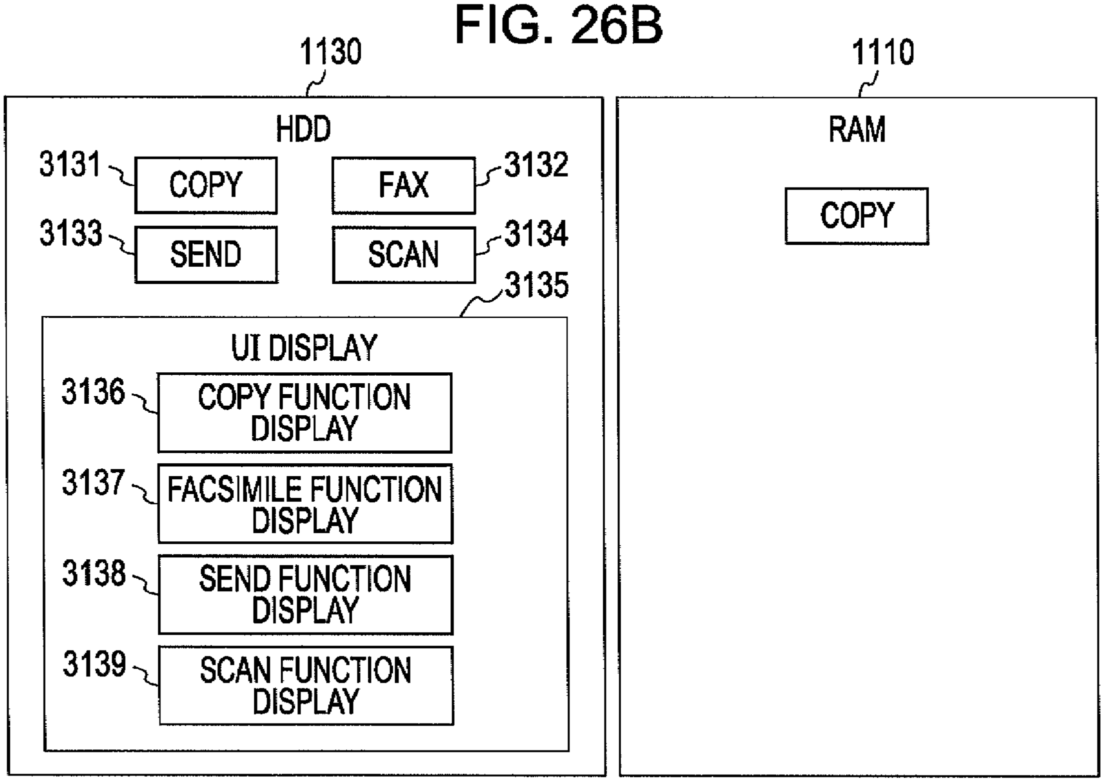
Figure 26C:
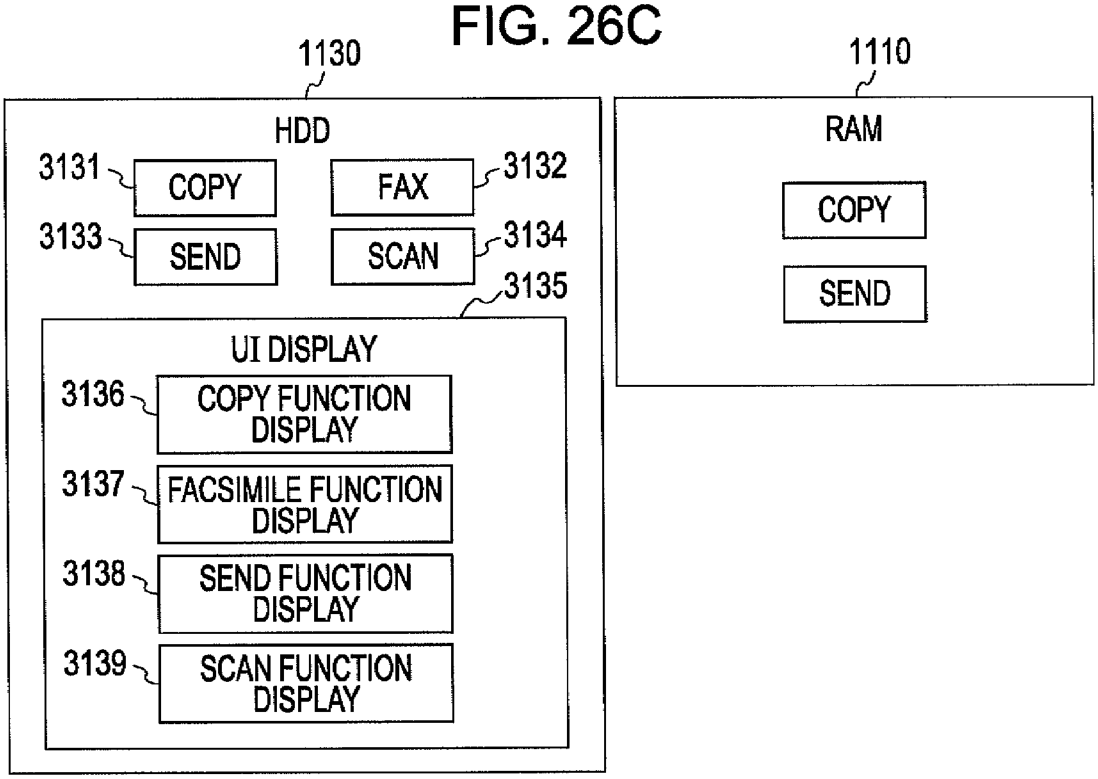
Figure 26D:
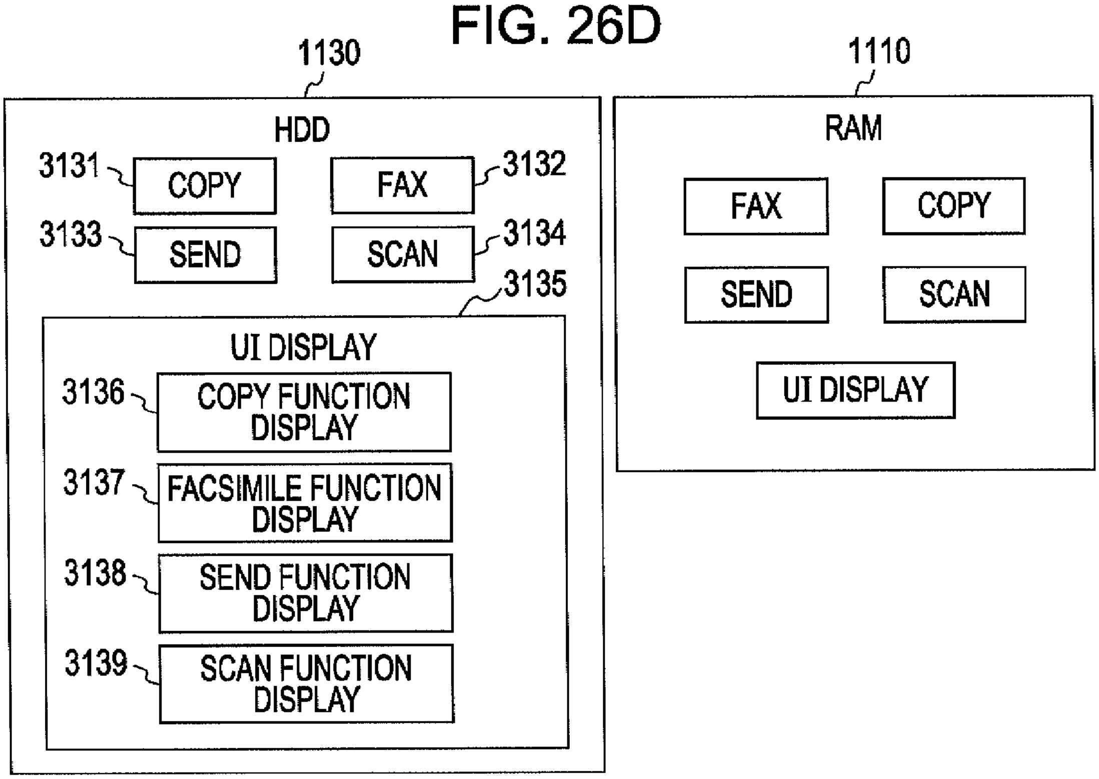

FIG. 25 is a block diagram showing system software in the form of split programs stored in the HDD 1130 shown in FIG. 24. The split programs shown in FIG. 25 are similar to those according to the third embodiment described above with reference to FIG. 15, and thus a further detailed explanation thereof is omitted herein.

[Exemplary Loading of Split Programs]

FIGS. 26A to 26D show an example of a manner in which the CPU 1100 loads split programs shown in FIG. 25 into the work memory area in the RAM 1110. The loading of the split programs may be performed in a similar manner to the third embodiment described above with reference to FIGS. 26A to 26D, and thus a further detailed explanation thereof is omitted herein.

Figure 27:
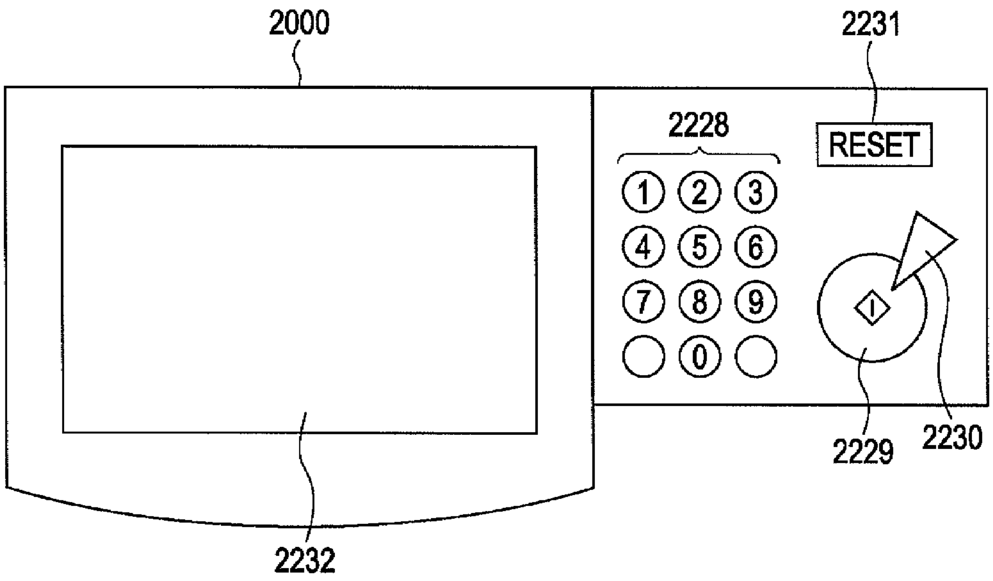
FIG. 27 is a diagram showing an example of an appearance of an input/display unit shown in FIG. 24.

FIG. 27 is a diagram showing an example of an appearance of an input/display unit 2000 shown in FIG. 24.

In FIG. 27, the LCD display 2232 has a touch panel sheet stuck to the LCD. A system operation screen is displayed on the LCD such that if one of displayed keys is pressed, position information of the pressed key is sent to the controller unit 100.

A numeric keypad 2228 is used to input a numeric value, for example, to specify the number of copies. The start key 2229 is pressed, for example, to start a document reading operation. A stop key 2230 is used to stop an operation being currently performed. A reset key 2231 is used to initialize the setting made via the input/display unit.

[Exemplary Start-Up Operation]

Figure 28:
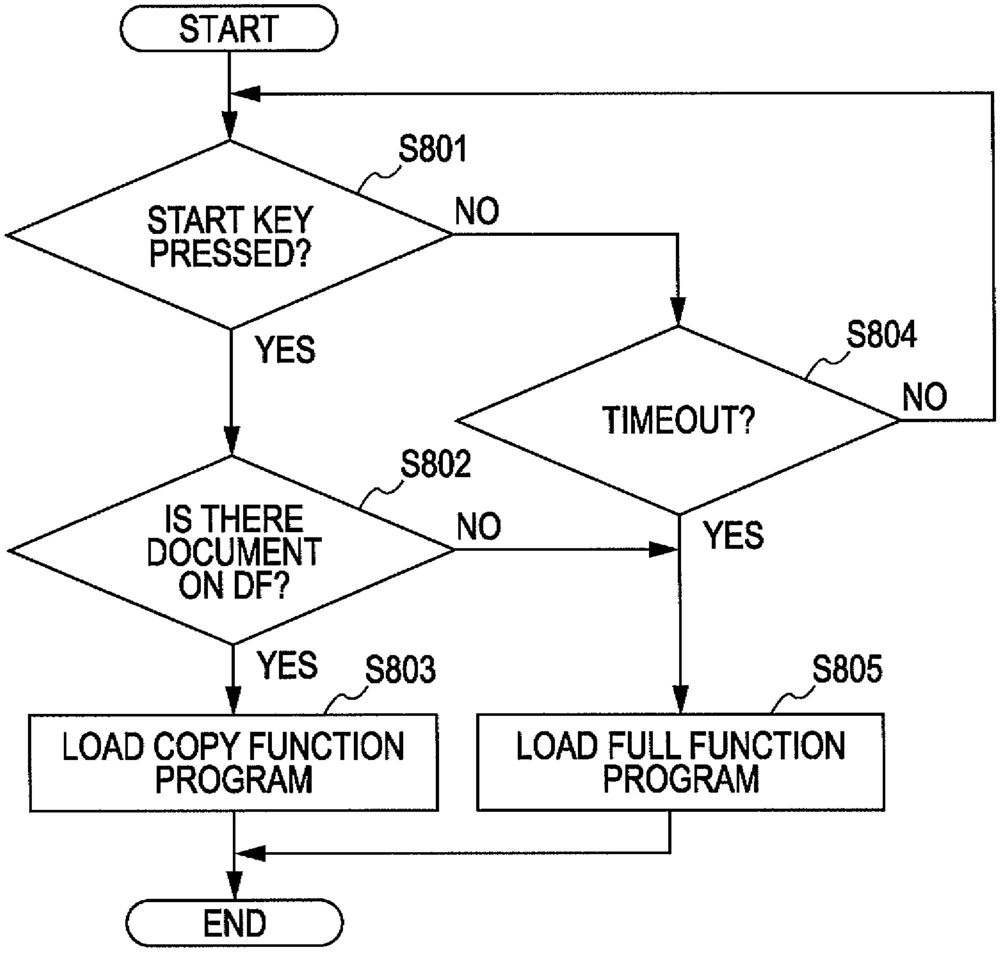
FIG. 28 is a flow chart showing an example of a control procedure according to an embodiment of the present invention.

FIG. 28 is a flow chart showing an example of a control procedure to load the copy program 3131 when the main power of the MFP 10 is turned on, according to an embodiment of the present invention. Note that the process shown in this flow chart is performed by the controller unit 100, and more specifically, the process is realized by executing the system boot program stored in the ROM 1120 by the CPU 1100. In this figure, S801 to S805 denote step numbers. With reference to this figure, the respective steps are described in detail below.

When the power of the MFP 10 is turned on or when the MFP 10 is resumed from the sleep mode and thus the main power MFP 10 is turned on, a booting process is performed according to the flow chart shown in FIG. 28 as described below.

In step S801, the CPU 1100 determines whether the start key 2229 on the input/display unit 2000 has been pressed.

If the CPU 1100 determines in step S801 that the start key 2229 on the input/display unit 2000 has not been pressed, the CPU 1100 advances the process to step S804. In step S804, the CPU 1100 determines whether the elapsed time counted by the function determination timer 1620 has reached the predetermined value. If the answer to step S804 is No, the CPU 1100 returns the process to step S801 to again check the status of the start key.

On the other hand, in the case in which it is determined in step S804 the elapsed time counted by the function determination timer 1620 has reached the predetermined value, the CPU 1100 advances the process to step S805.

In step S805, the CPU 1100 loads all programs from the HDD 1130 into the RAM 1110 in a predetermined order. The CPU 1100 then executes the loaded programs so as to make all functions usable. This process is performed in a similar manner to a conventional normal mode. The CPU 1100 then ends the present process.

On the other hand, in the case in which it is determined in step S801 that the start key 2229 has been pressed, the CPU 1100 advances the process to step S802.

In step S802, the CPU 1100 determines whether there is a document on the document feeder (DF) 160. If it is determined in step S802 that there is a document on the document feeder 160, the CPU 1100 advances the process to step S803.

In step S803, the CPU 1100 loads the copy program 3131 and the copy function display program 3136 needed for the copy function from the HDD 1130 into the RAM 1110. The CPU 1100 executes these loaded programs to make the copy function operable. As a result, the MFP 10 is started in the copy mode, and copying of documents set on the document feeder 160 is started. The CPU 1100 then ends the present process.

On the other hand, in the case in which it is determined in step S802 that there is no document on the document feeder 160, the CPU 1100 advances the process to step S805 to load program modules of all functions.

In the above-described step S803 in FIG. 28, after the copy function is made operable, the other programs may be loaded into the RAM 1110 and all functions may be made operable. Alternatively, programs of the other functions may not be loaded into the RAM 1110 until a request for a function is issued.

In step S803 in FIG. 28, in response to detection of presence of documents, the copy function, the scan function, and the facsimile function may be activated in a priority mode, because all these functions include reading of documents.

Alternatively, after the main power of the MFP 10 is turned on or the MFP 10 is resumed from the sleep mode, if it is detected within the predetermined time period that a document is placed on the document feeder 160, then the following process may be performed regardless of whether the start key 2229 is pressed or not. The programs for functions which need reading of documents, that is, the copy function, the scan functions, and the send function and associated function display programs may be loaded into the RAM 1110, and these programs are executed to make the functions operable in the priority mode.

As described above, after a user turns on the power of the MFP 10, if the user operates the MFP 10 in accordance with a predetermined procedure within the predetermined time period (timeout value set in the function determination timer 1620), a particular function is started up in a short time and the function becomes usable on the MFP 10.

In the case in which a document is set on the document feeder or the document scanning plate before the power of the MFP 10 is turned on, functions such as the copy function and the scan function which include reading of document may be activated in the priority mode.

Sixth Exemplary Embodiment

In the fifth embodiment described above, when the start key is pressed within the predetermined time period (timeout value set in the function determination timer 1620) after the power of the MFP 10 is turned on, a determination as to whether to preferentially load program modules necessary for the copy function or to load program modules of all functions is made depending on whether there is a document on the document feeder. In a sixth embodiment described below, the determination as to whether to load program modules necessary for the copy function or to load program modules of all functions is made not only depending on whether there is a document on the document feeder but also depending on whether the pressure plate is open or closed.

Figure 29:
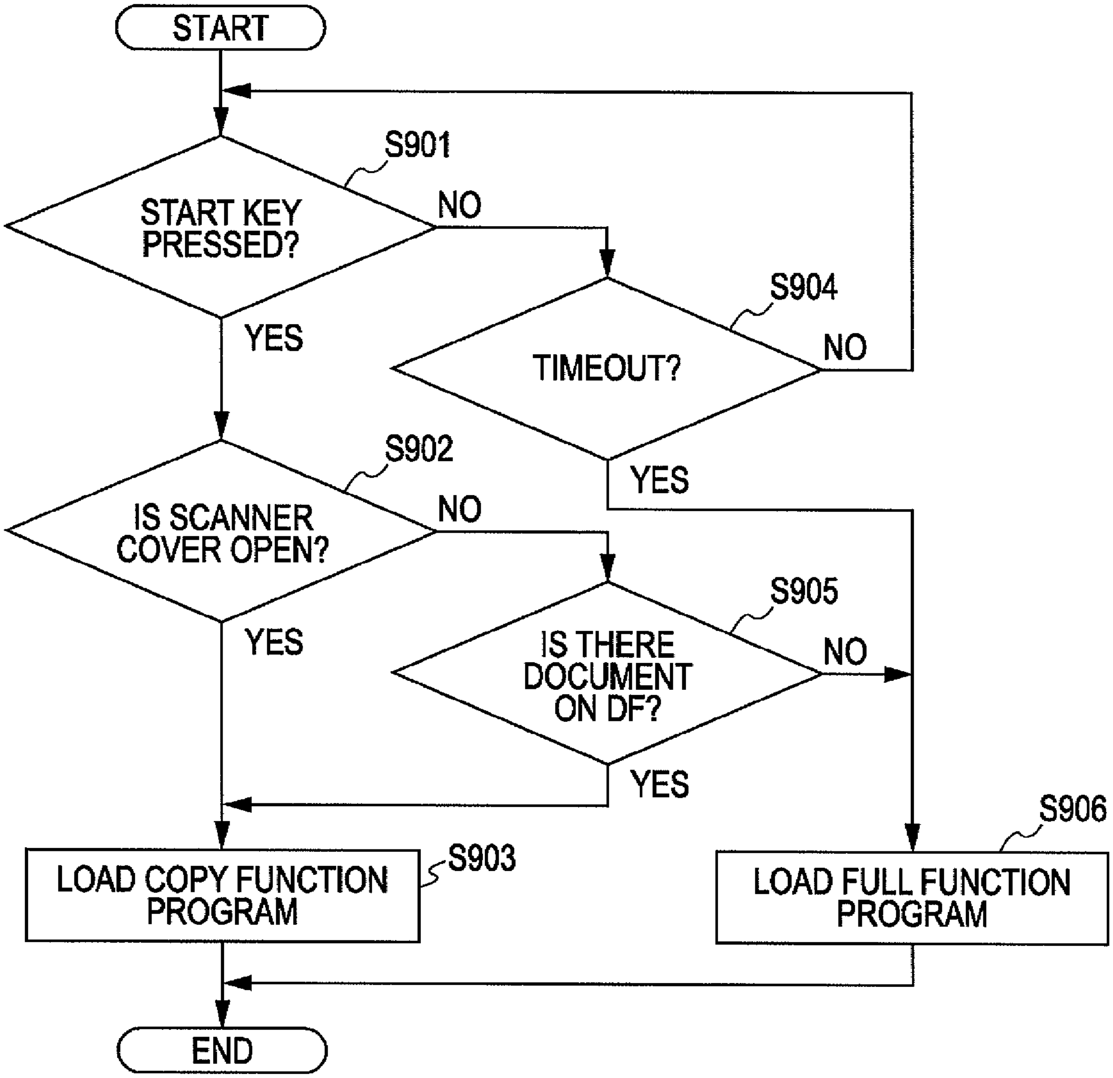
FIG. 29 is a flow chart showing an example of a control procedure according to an embodiment of the present invention.

Referring to FIG. 29, processing steps different from those in the fifth embodiment are described below. In the present embodiment, as shown in FIG. 2, the document feeder 160 of the MFP 10 also serves as a pressure plate. That is, the document feeder 160 is configured to be operable/closable. When the document feeder 160 is in the closed state, the document feeder 160 presses a document placed on the document glass (platen) 203 against the document glass 203. The open/closed state of the document feeder 160 is detected by the controller 100.

[Exemplary Start-Up Operation]

FIG. 29 is a flow chart showing an example of a control procedure to load the copy program 3131 when the power of the MFP 10 is turned on, according to the present embodiment of the invention. Note that the process shown in this flow chart is performed by the controller unit 100, and more specifically, the process is realized by executing the system boot program stored in the ROM 1120 by the CPU 1100. In this figure, S901 to S906 denote step numbers. With reference to this figure, the respective steps are described in detail below.

When the power of the MFP 10 is turned on or when the MFP 10 is resumed from the sleep mode and thus the main power MFP 10 is turned on, a booting process is performed according to the flow chart shown in FIG. 29 as described below.

In step S901, the CPU 1100 determines whether the start key 2229 on the input/display unit 2000 has been pressed. If the CPU 1100 determines in step S901 that the start key 2229 on the input/display unit 2000 has not been pressed, the CPU 1100 advances the process to step S904. In step S904, the CPU 1100 determines whether the elapsed time counted by the function determination timer 1620 has reached the predetermined value. If the answer to step S904 is No, the CPU 1100 returns the process to step S901 to again check the status of the start key.

On the other hand, in the case in which it is determined in step S904 the elapsed time counted by the function determination timer 1620 has reached the predetermined value, the CPU 1100 advances the process to step S906.

In step S906, the CPU 1100 loads programs of all functions of the MFP 10 from the HDD 1130 into the RAM 1110. The CPU 1100 executes the loaded program so as to make all functions usable. This process is performed in a similar manner to a conventional normal mode. The CPU 1100 then ends the present process.

On the other hand, in the case in which it is determined in step S901 that the start key 2229 has been pressed, the CPU 1100 advances the process to step S902.

In step S902, the CPU 1100 determines whether the pressure plate (that is, the document feeder) 160 on the document glass 203 of the scanner 140 is open. If it is determined that the pressure plate (the document feeder) 160 on the document glass 203 of the scanner 140 is open, the CPU 1100 advances the process to step S903.

In step S903, the CPU 1100 loads the copy program 3131 and the copy function display program 3136 needed for the copy function from the HDD 1130 into the RAM 1110, and the CPU 1100 executes the loaded copy program 3131 and the copy function display program 3136 to make the copy function usable. As a result, the MFP 10 is set up in the copy mode, and copying of the document set on the document glass (not shown) is started when the pressure plate (the document feeder) 160 is closed. The CPU 1100 then ends the present process.

On the other hand, in the case in which it is determined in step S902 that the pressure plate (the document feeder) 160 on the document glass 203 of the scanner 140 is not open, the CPU 1100 advances the process to step S905.

In step S905, the CPU 1100 determines whether there is a document on the document feeder 160. If it is determined in step S905 that there is a document on the document feeder 160, the CPU 1100 advances the process to step S903 to load the program module of the copy function.

On the other hand, in the case in which it is determined in step S905 that there is no document on the document feeder 160, the CPU 1100 advances the process to step S906 to load program modules of all functions.

In the above-described step S903 in FIG. 29, after the copy function is made operable, the other programs may be loaded into the RAM 1110 to make all functions usable.

In the above-described step S903 in FIG. 29, the copy function and the scan function may be activated in the priority mode.

Alternatively, after the main power of the MFP 10 is turned on or the MFP 10 is resumed from the sleep mode, if it is detected within the predetermined time period that a document is placed on the document feeder 160 or if it is detected that the pressure plate 160 is open, then the following process may be performed regardless of whether the start key 2229 is pressed or not. The programs for functions which need reading of documents, that is, the copy function, the scan functions, and the send function and associated function display programs may be loaded into the RAM 1110, and these programs are executed to make the functions operable in the priority mode.

As described above, after a user turns on the power of the MFP 10, if the user operates the MFP 10 in accordance with a predetermined procedure, the copy function is started up in a short time and the copy function becomes usable on the MFP 10.

Seventh Exemplary Embodiment

In a seventh embodiment described below, when the power of the MFP 10 is turned on, a function to be started up in the priority mode is selected on the basis of numbers of times functions have been used, as described in detail below.

[Exemplary Controller Unit]

Figure 30:
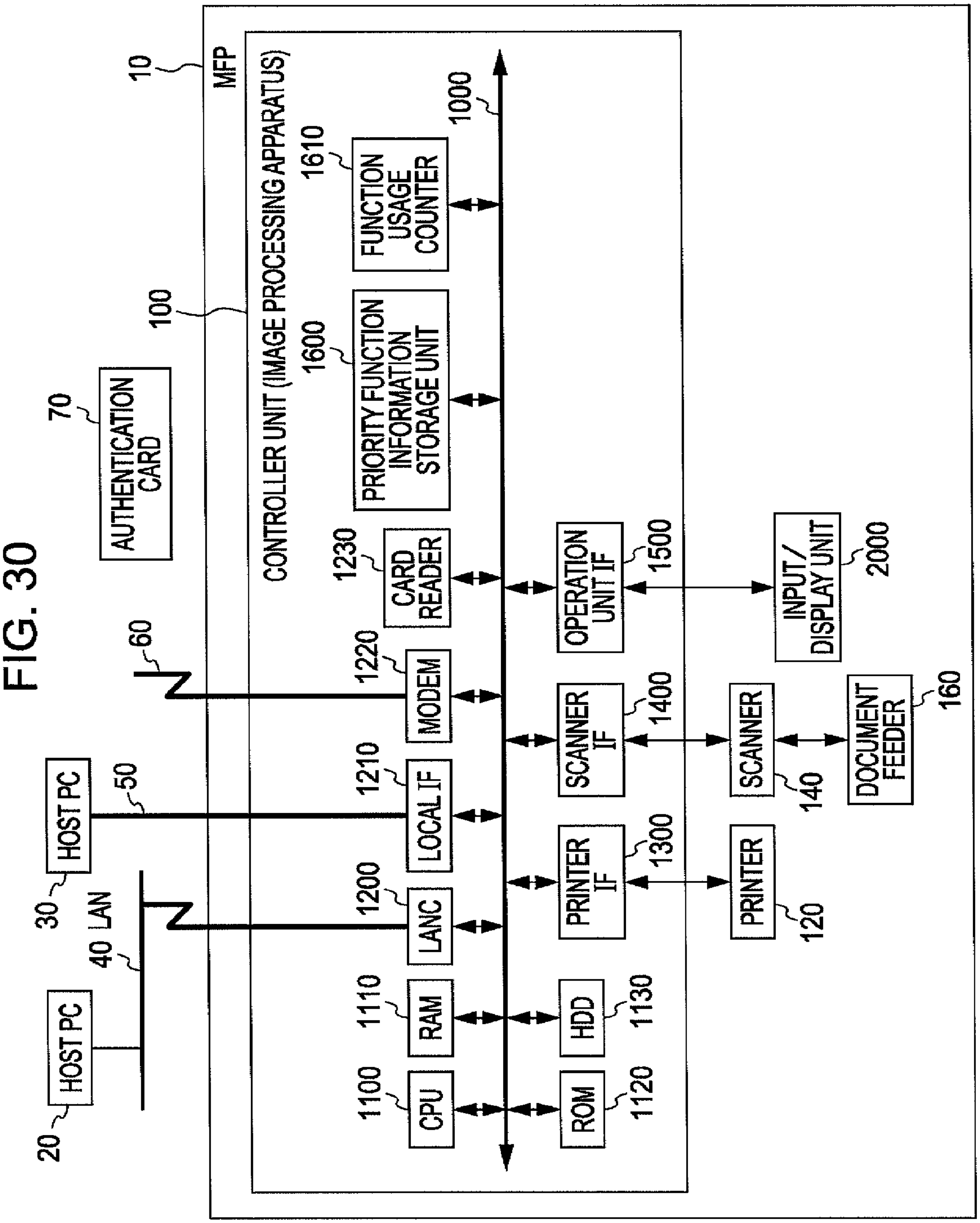
FIG. 30 is a block diagram showing an example configuration of a digital multifunction apparatus and a controller unit thereof according to an embodiment of the present invention.

FIG. 30 is a block diagram showing a configuration of a MFP 10 and a controller unit 100 thereof according to a seventh embodiment of the present invention. In FIG. 30, similar parts to those in FIG. 3 are denoted by similar reference numerals and a duplicated explanation thereof is omitted herein.

The priority function storage unit 1600 stores information indicating which one of the functions (the copy function, the facsimile function, the send function, and the printer function) of the MFP 10 should be started up preferentially when the power of the MFP 10 is turned on or when the MFP 10 is resumed from the sleep mode.

A function usage count storage unit 1610 stores information indicating the number of times a function has been used, separately for each of the functions of the MFP 10.

The MFP 10 has a power switch (in the form of a hard switch) although not shown in FIG. 30. When the power switch is pressed, the electric power is turned on and electric power is supplied from a power supply unit (not shown).

[Exemplary Split Program]

Figure 31:
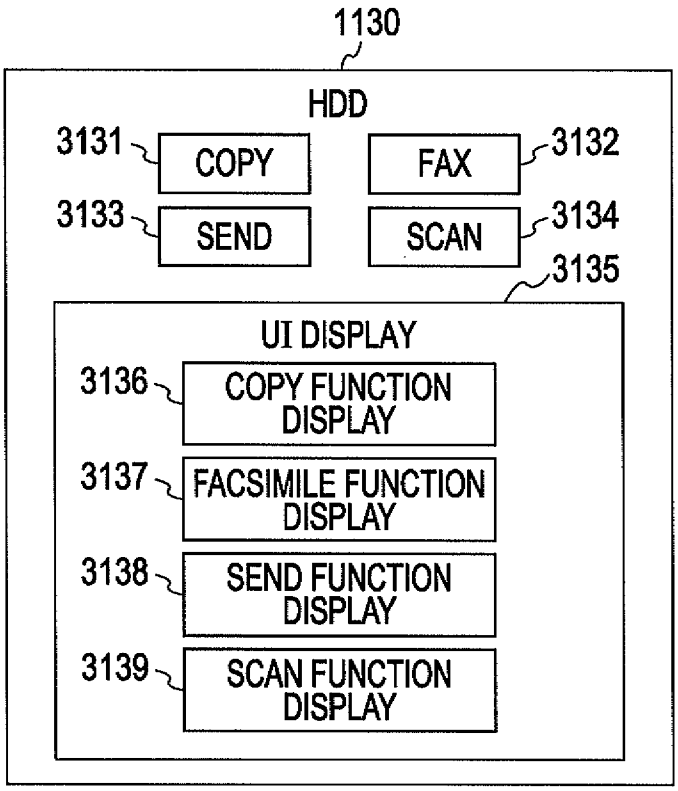
FIG. 31 is a block diagram showing an exemplary bootable system software in the form of split programs stored in an HDD shown in FIG. 30.

FIG. 31 is a block diagram showing system software in the form of split programs stored in the HDD 1130 shown in FIG. 30. The split programs shown in FIG. 31 are similar to those according to the third embodiment described above with reference to FIG. 15, and thus a further detailed explanation thereof is omitted herein.

[Exemplary Loading of Split Programs]

FIGS. 32A to 32D show an example of a manner in which the CPU 1100 loads split programs shown in FIG. 31 into the work memory area in the RAM 1110. The loading of the split programs may be performed in a similar manner to the third embodiment described above with reference to FIGS. 26A to 26D, and thus a further detailed explanation thereof is omitted herein.

[Exemplary Loading of Programs When Power is Turned On]

Figure 33:
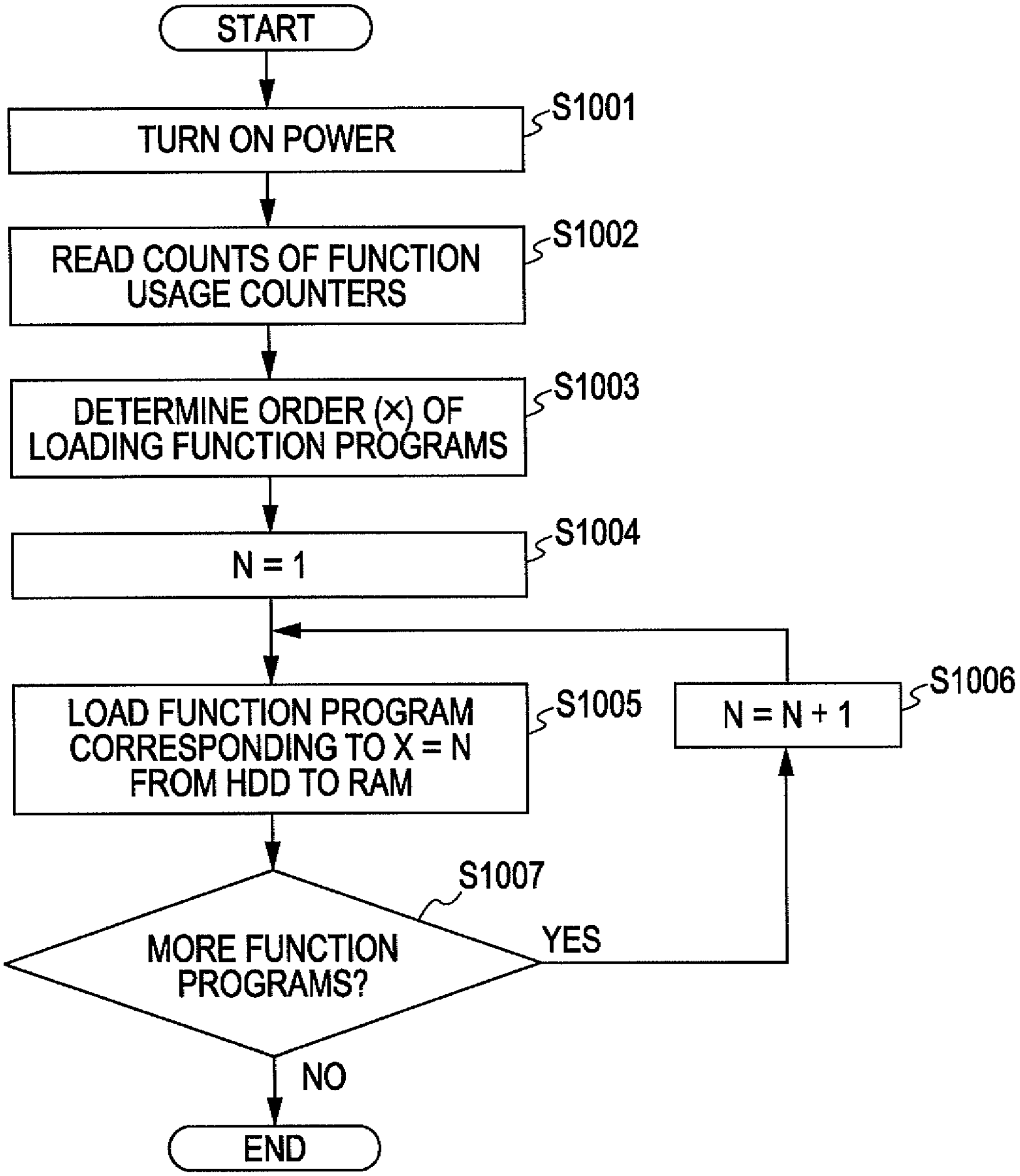
FIG. 33 is a flow chart showing an example of a control procedure according to an embodiment of the present invention.

FIG. 33 is a flow chart showing an example of a control procedure to load programs when the power of the MFP 10 is turned on according to an embodiment of the present invention. Note that the process shown in this flow chart is performed by the controller unit 100, and more specifically, the process is realized by executing the system boot program stored in the ROM 1120 by the CPU 1100. In this figure, S1001 to S1007 denote step numbers. With reference to this figure, the respective steps are described in detail below.

A nonvolatile memory is used as the function usage count storage unit 1610 to retain information indicating the numbers of times the respective programs of functions have been used.

If the power of the MFP 10 is turned on (step S1001), the CPU 1100 executes a boot program stored in the ROM 1120 and performs initial setting. In this initial setting, the CPU 1100 checks the function usage count storage unit 1610 (step S1002).

Next, in step S1003, the CPU 1100 determines the order, X, of loading programs of functions on the basis of the counts detected in step S1002 in terms of the numbers of times the functions have been used, and the CPU 1100 stores information indicating the determined order X in the priority function storage unit 1600 (step S1003).

The CPU 1100 then sets a variable N to an initial value N=1 (step S1004). The CPU 1100 loads a function program assigned X=N indicated by the loading order data stored in the priority function storage unit 1600, from the HDD 1130 into the RAM 1110. The CPU 1100 then executes the loaded program to make the corresponding function usable (step S1005).

The CPU 1100 then determines whether there are more programs to be loaded (step S1007). If it determined there is a program to be loaded, the CPU 1100 advances the process to step S1006.

In step S1006, the CPU 1100 increments the variable N (such that N=N+1). The CPU 1100 then returns the process to step S1005 to repeat the program loading process until all programs are loaded.

If it is determined in step S1007 that all programs have been loaded, the CPU 1100 ends the program loading process.

In the above-described step S1005, programs are loaded in the order (X) of highest to lowest number of times functions have been used in accordance with the data stored in the priority function storage unit 1600.

For example, in the case in which the data stored in the function usage count storage unit indicates that numbers of times are 150 for the copying function, 120 for the send function, 50 for the scan function, and 20 for the facsimile function, the priority order is assigned in the priority function storage unit for each function as follows: copy (N=1)→send (N=2)→scan (N=3)→facsimile (N=4). In accordance with the value of N indicating the priority order, the CPU 1100 loads the functions from the HDD 1130 into the RAM 1110.

Figure 32A:
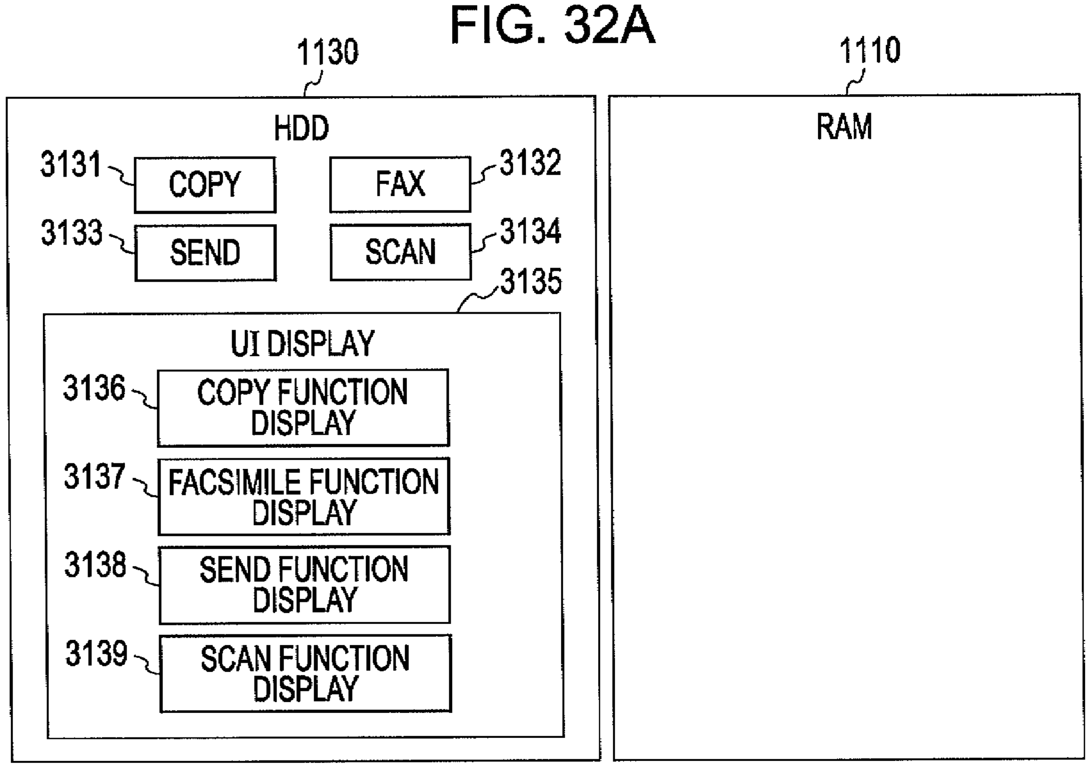
FIGS. 32A to 32D are diagrams showing an example of a manner in which a CPU loads bootable split programs shown in FIG. 31 into a work memory area of a RAM.
Figure 32B:
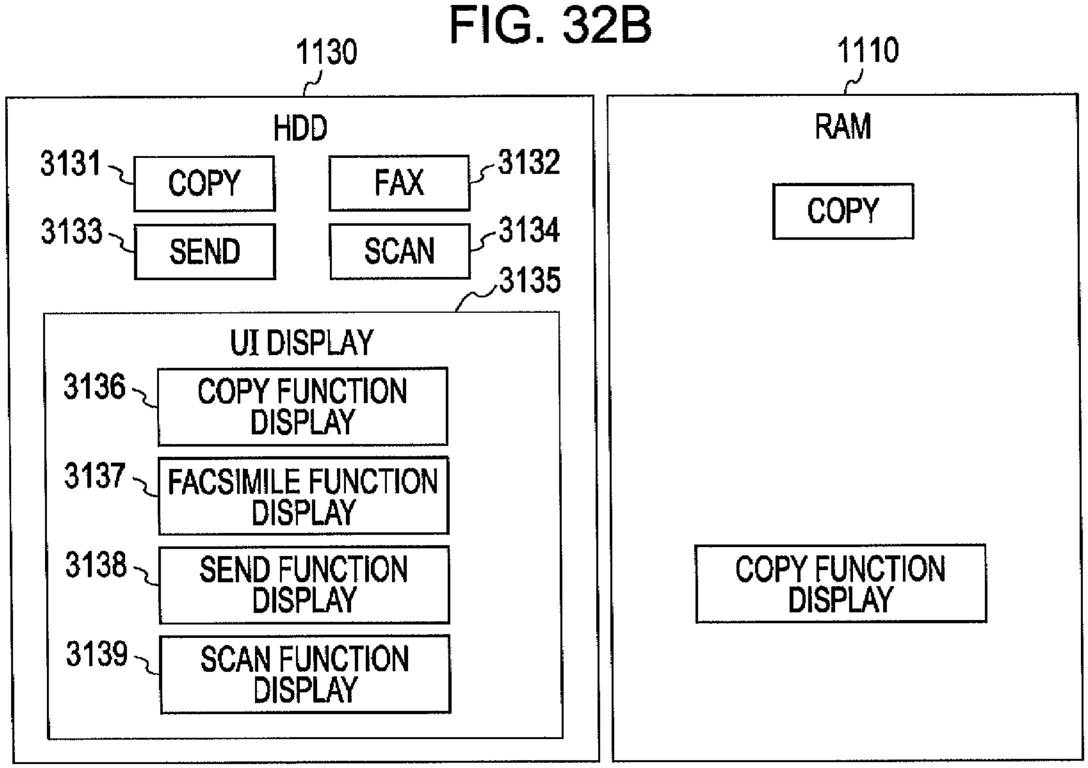
Figure 32C:
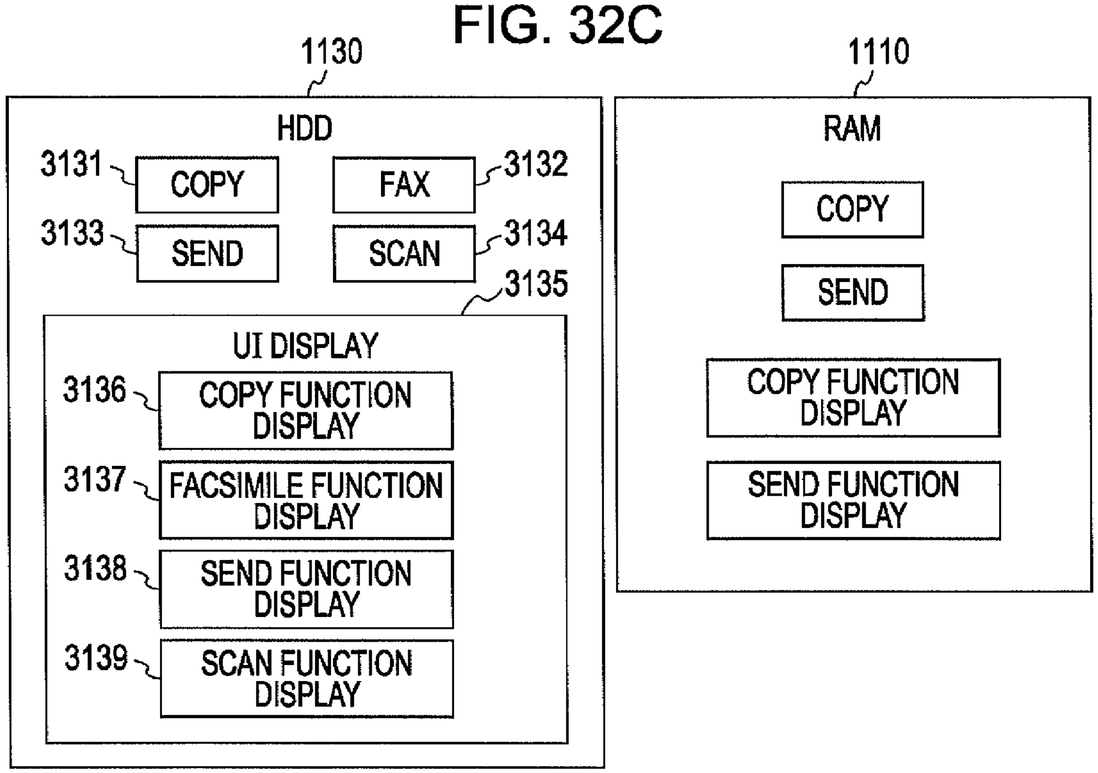
Figure 32D:
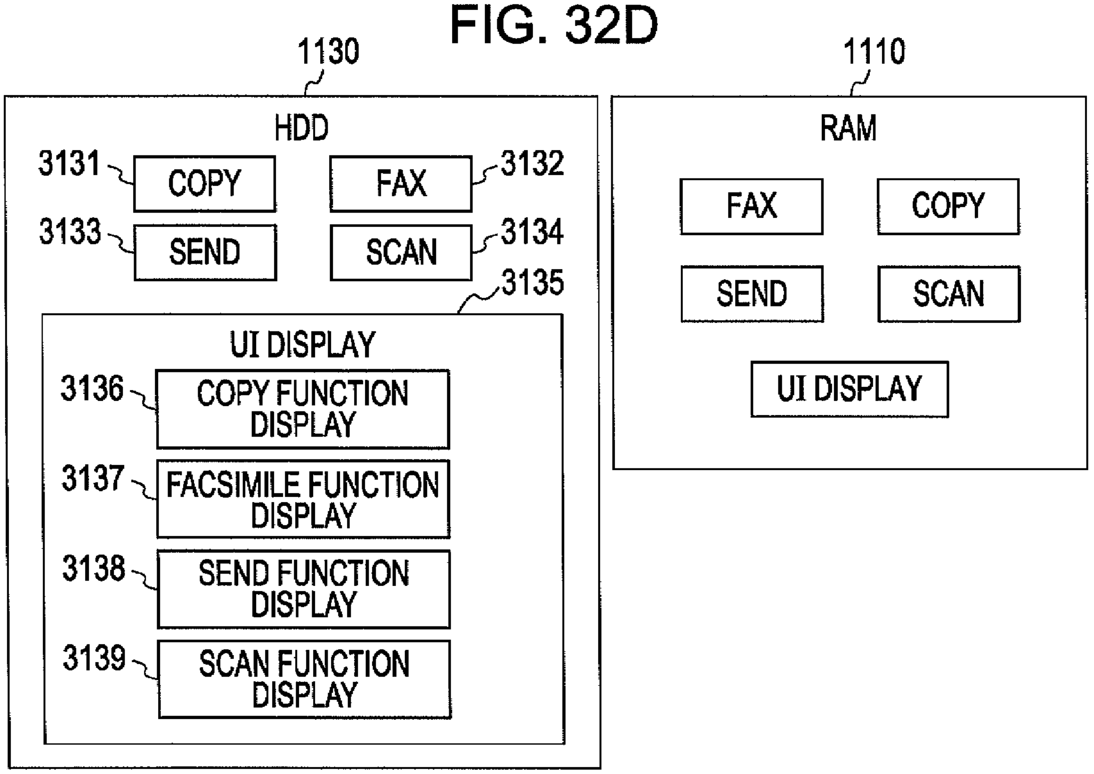

FIG. 32B shows a state in which the copy program (with N=1) has been loaded into the RAM 1110. FIG. 32C shows a state in which the copy program and the send program (with N=1 and 2) have been loaded into the RAM 1110. FIG. 32D shows a state in which all programs (with N=1 to 4) have been loaded into the RAM 1110.

In the present embodiment, as described above, after the power of the MFP 10 is turned on, function programs are loaded and executed preferentially in the order of highest to lowest numbers of times functions have been used. This allows it to make functions usable in the order in the order of highest to lowest numbers of times functions have been used, thereby allowing a user to use the MFP 10 without having to wait for a long time.

User authentication may be performed, and counts of numbers of times functions have been used may be recorded for each user. In this case, when a user turns on the power of the MFP 10, user authentication may be performed to identify the user, and a particular function may be started up in the priority mode depending on the recorded counts of the numbers of times functions have been used.

That is, a priority function is determined for use each on the basis of the numbers of times functions have been used by the user. For example, for a certain user, if the copy function has been used the greatest number of times, then the copy function is started in advance to the other functions. This allows a reduction in the user's waiting time.

Eighth Exemplary Embodiment

In the seventh embodiment described above, function programs are loaded in the order of highest to lowest numbers of times functions have been used. In an eight embodiment, the data stored in the function usage count storage unit 1610 includes not only the data indicating the cumulative numbers of times the functions have been used but also additional data indicating numbers of pages processed by respective functions, and numbers of times functions were used in an immediately previous operation during a last ON-to-OFF period. The order of priority is determined according to the numbers of pages processed by the respective functions or the numbers of times the functions were used in the last ON-to-OFF period, and the order of priority is described in the priority function storage unit 1600. When the power of the MFP 10 is turned on next time, the functions programs are loaded in the order of the priority.

Ninth Exemplary Embodiment

In a ninth embodiment described blow, when the power of the MFP 10 is turned on, a priority function is selected depending on a connection status of each interface.

Controller Unit

Figure 34:
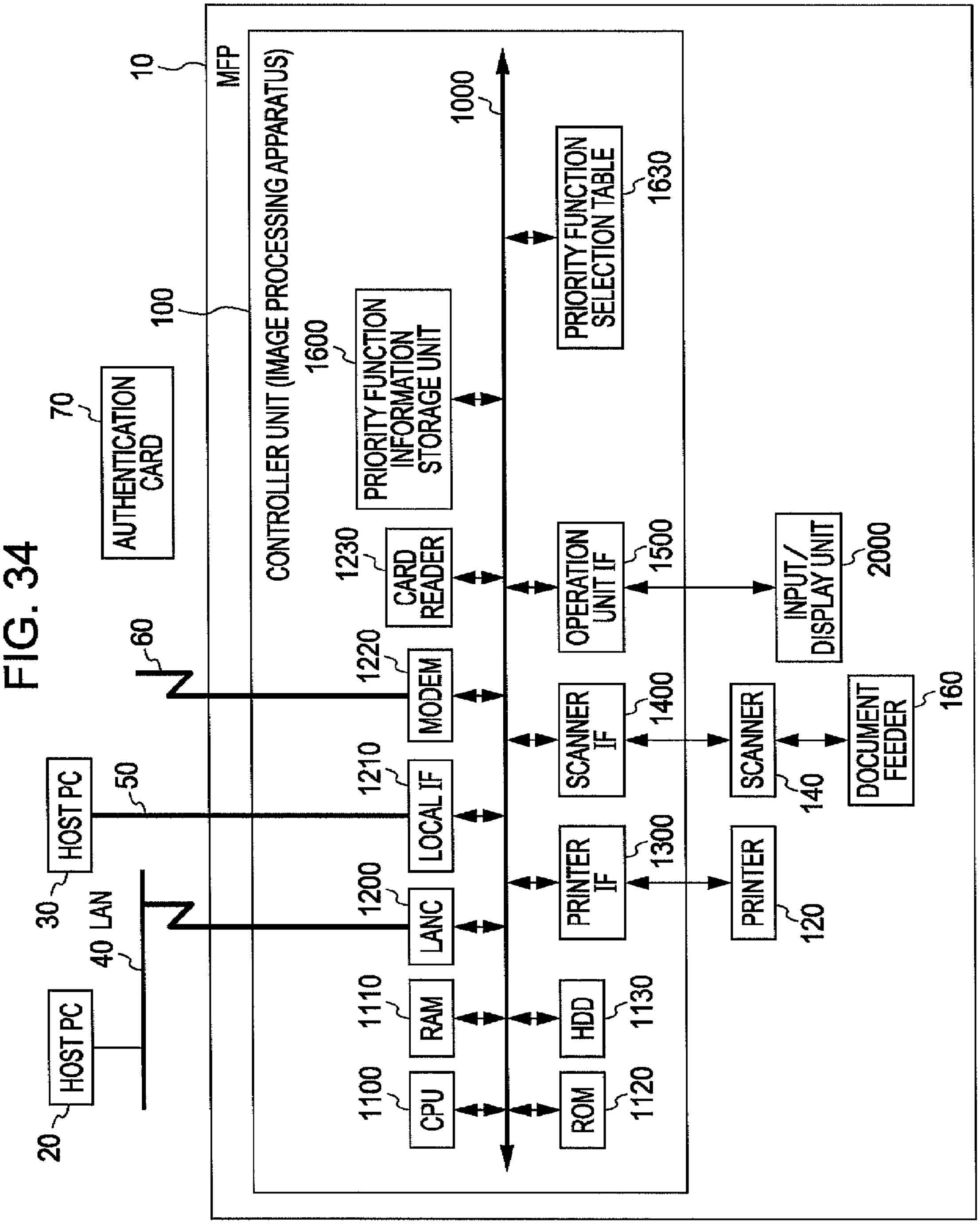
FIG. 34 is an example configuration of a digital multifunction apparatus and a controller unit thereof according to an embodiment of the present invention.

FIG. 34 is a block diagram showing a configuration of a MFP 10 and a controller unit 100 thereof according to a ninth embodiment of the present invention. In FIG. 34, similar parts to those in FIG. 3 are denoted by similar reference numerals and a duplicated explanation thereof is omitted herein.

The priority function storage unit 1600 stores information indicating which one of the functions (the copy function, the facsimile function, the send function, and the printer function) of the MFP 10 should be started up preferentially when the power of the MFP 10 is turned on or when the MFP 10 is resumed from the sleep mode.

A priority function selection table 1630 includes flags indicating whether programs corresponding to the respective functions have been loaded in the RAM 1110. More specifically, in the priority function selection table 1630, program load completion flags are stored to indicate whether the respective programs of the copy function, the facsimile function, the send function, and the scan function have been loaded. That is, if a function program is loaded into the RAM 1110, a corresponding flag in the priority function selection table 1630 is set into a "loaded" state.

The MFP 10 has a power switch (in the form of a hard switch) although not shown in FIG. 34. When the power switch is pressed, the electric power is turned on and electric power is supplied from a power supply unit (not shown).

[Exemplary Split Program]

Figure 35:
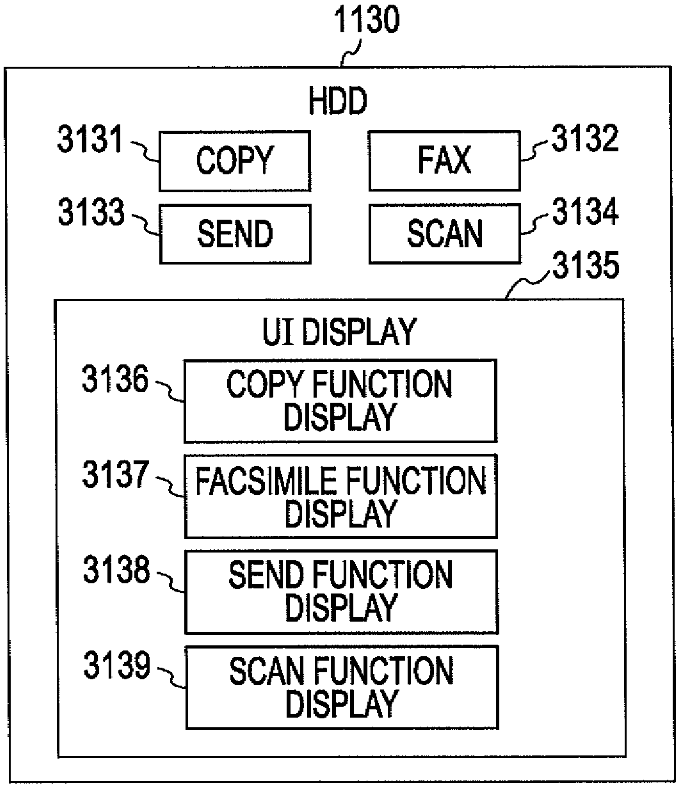
FIG. 35 is a diagram showing an exemplary bootable system software in the form of split programs stored in an HDD shown in FIG. 34.

FIG. 35 is a diagram showing system software in the form of split programs stored in the HDD 1130 shown in FIG. 34. The split programs shown in FIG. 35 are similar to those according to the third embodiment described above with reference to FIG. 15, and thus a further detailed explanation thereof is omitted herein.

[Exemplary Loading of Split Programs]

FIGS. 36A to 36D are diagrams showing an example of a manner in which a CPU 1100 loads bootable split programs shown in FIG. 35 into a work memory area of the RAM 1110. The loading of the split programs may be performed in a similar manner to the third embodiment described above with reference to FIGS. 26A to 26D, and thus a further detailed explanation thereof is omitted herein.

[Exemplary Loading of Programs When Power is Turned On]

Figure 37:
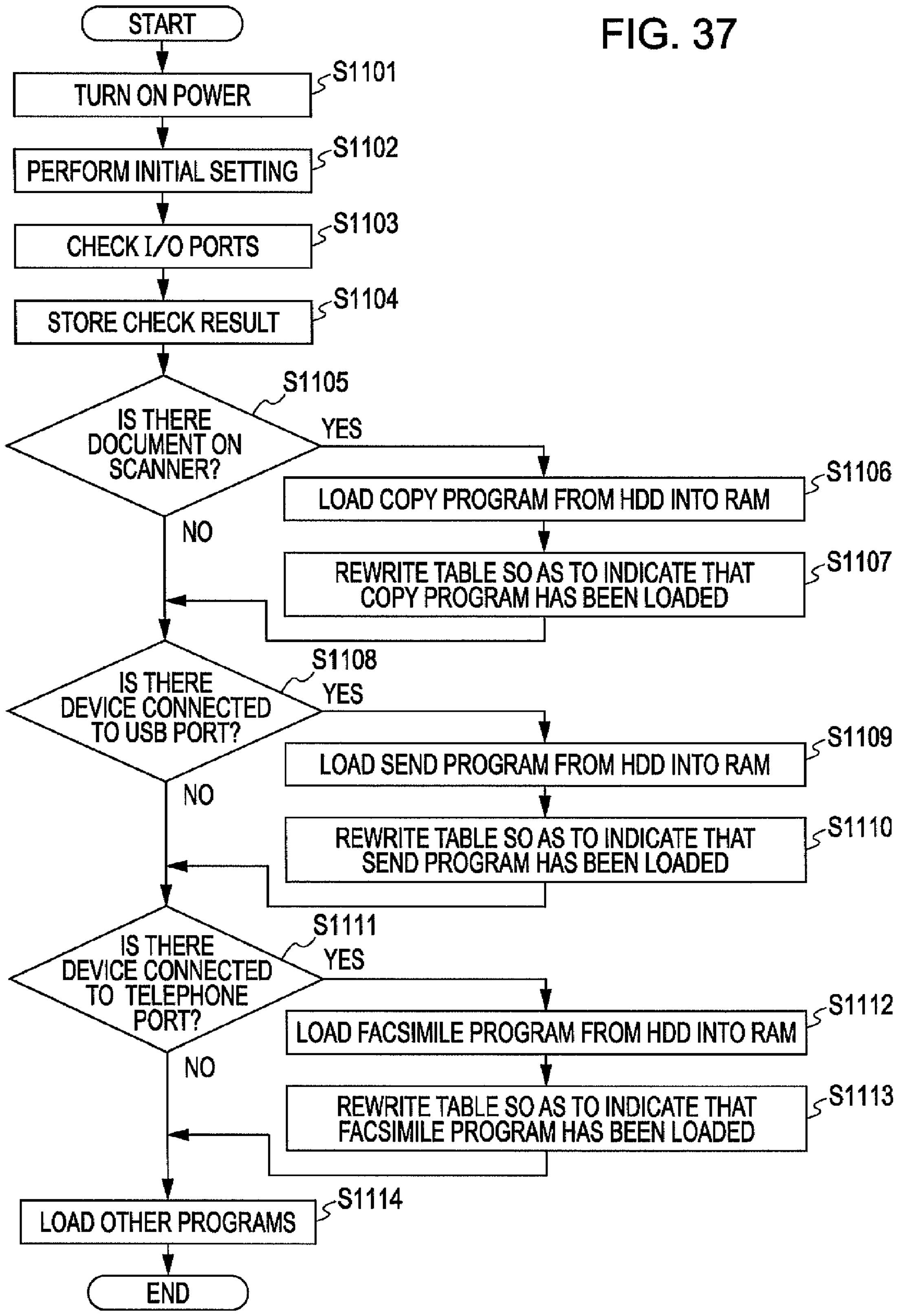
FIG. 37 is a flow chart showing an example of a control procedure according to an embodiment of the present invention.

FIG. 37 is a flow chart showing an example of a control procedure to load programs when the power of the MFP 10 is turned on according to an embodiment of the present invention. Note that the process shown in this flow chart is performed by the controller unit 100, and more specifically, the process is realized by executing the system boot program stored in the ROM 1120 by the CPU 1100. In this figure, S1101 to S1114 denote step numbers. With reference to this figure, the respective steps are described in detail below.

If the power of the MFP 10 is turned on (step S1101), the CPU 1100 executes a boot program stored in the ROM 1120 and performs initial setting (step S1102). In this initial setting, the CPU 1100 performs setting of each I/O port and checks the status of each interface of the MFP 10 (step S1103).

More specifically, in the checking of the status of each interface of the MFP 10, the CPU 1100 checks, for example, (1) whether there is a document placed on the document feeder 160 of the scanner 140, (2) whether the local I/F 1210 is connected to the host PC 30, and (3) whether the modem 1220 is connected to the PSTN 60.

The CPU 1100 describes, in the priority function selection table 1630, data indicating the connection statuses of the respective I/O ports detected in step S1103 (step S1104).

The CPU 1100 then loads functions programs from the HDD 1130 into the RAM 1110 in the order determined in accordance with the statuses of the respective I/O ports described in the priority function selection table 1630.

The program loading process is described in further detail below. First, in step S1105, the CPU 1100 determines whether there is a document placed on the document feeder 160 or the document glass 203. If a document is detected, the CPU 1100 loads the copy program 3131, and the copy function display program 3136 from the HDD 1130 into the RAM 1110. The CPU 1100 then executes the copy program 3131 to make the copy function usable (step S1106). The CPU 1100 then updates the priority function selection table 1630 so as to indicate that the copy program 3131 has been loaded (step S1107). The CPU 1100 then advances the process to step S1108. In steps S1106 and S1107 described above, the scan functions may be activated in addition to the copy function.

In the case in which no document is detected in step S1105, the process proceeds to step S1108 without loading the copy program.

In step S1108, the CPU 1100 determines whether the local I/F 1210 is connected to the host PC 30 or the LANC 1200 is connected to the host PC 20 via the LAN 40. If the answer to step S1108 is Yes, the process proceeds to step S1109.

In step S1109, the CPU 1100 loads the send program 3133, and the send function display program 3138 from the HDD 1130 into the RAM 1110 (step S1109). The CPU 1100 executes these loaded programs to enable the functions of the programs. The CPU 1100 then updates the priority function selection table 1630 so as to indicate that the send program has been loaded (step S1110). The CPU 1100 then advances the process to step S1111.

If it is determined in step S1108 that neither the local I/F 1210 is connected to the host PC 30 and nor the LANC 1200 is connected to the host PC 20 via the LAN 40, the CPU 1100 advances the process to step S1111 without loading the send program.

In step S1111, the CPU 1100 determines whether the modem 1220 is connected to the PSTN 60. If the modem 1220 is connected to the PSTN 60, the CPU 1100 loads the facsimile program 3132 and the facsimile function display program 3137 from the HDD 1130 into the RAM 1110 (step S1112), and the CPU 1100 executes these loaded programs to make the facsimile function usable. The CPU 1100 then updates the priority function selection table 1630 so as to indicate that the facsimile program has been loaded (step S1113). The CPU 1100 then advances the process to step S1114.

On the other hand, in the case in which it is determined in step S1108 that the modem 1220 is not connected to the PSTN 60, the CPU advances the process to step S1114 without loading the facsimile program and the associated program.

Thus, when the priority function programs have been loaded depending on the statuses of the respective I/O ports of the MFP 10 in the above-described manner, the process proceeds to step S1114. In step S1114, the CPU 1100 checks the priority function selection table 1630 to detect programs which have not yet been loaded, and loads the detected programs from the HDD 1130 into the RAM 1110. The CPU 1100 then ends the present process.

Figure 36A:
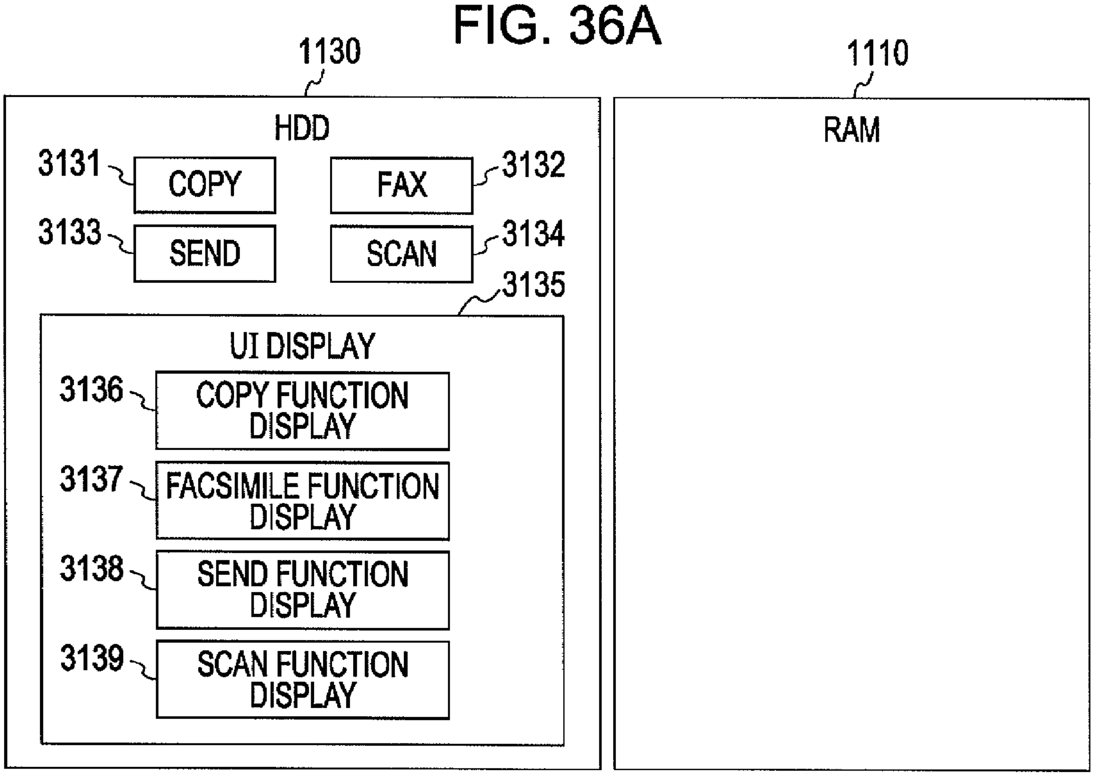
FIGS. 36A to 36D are diagrams showing an example of a manner in which a CPU loads bootable split programs shown in FIG. 34 into a work memory area of a RAM.
Figure 36B:
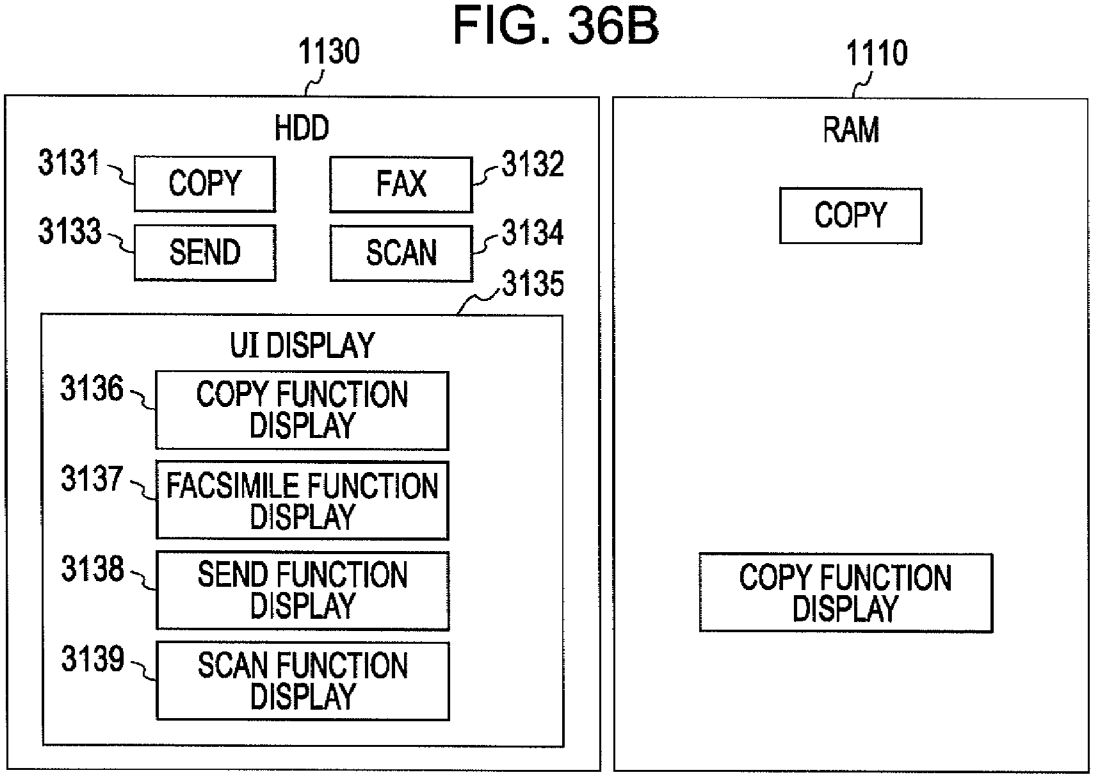
Figure 36C:
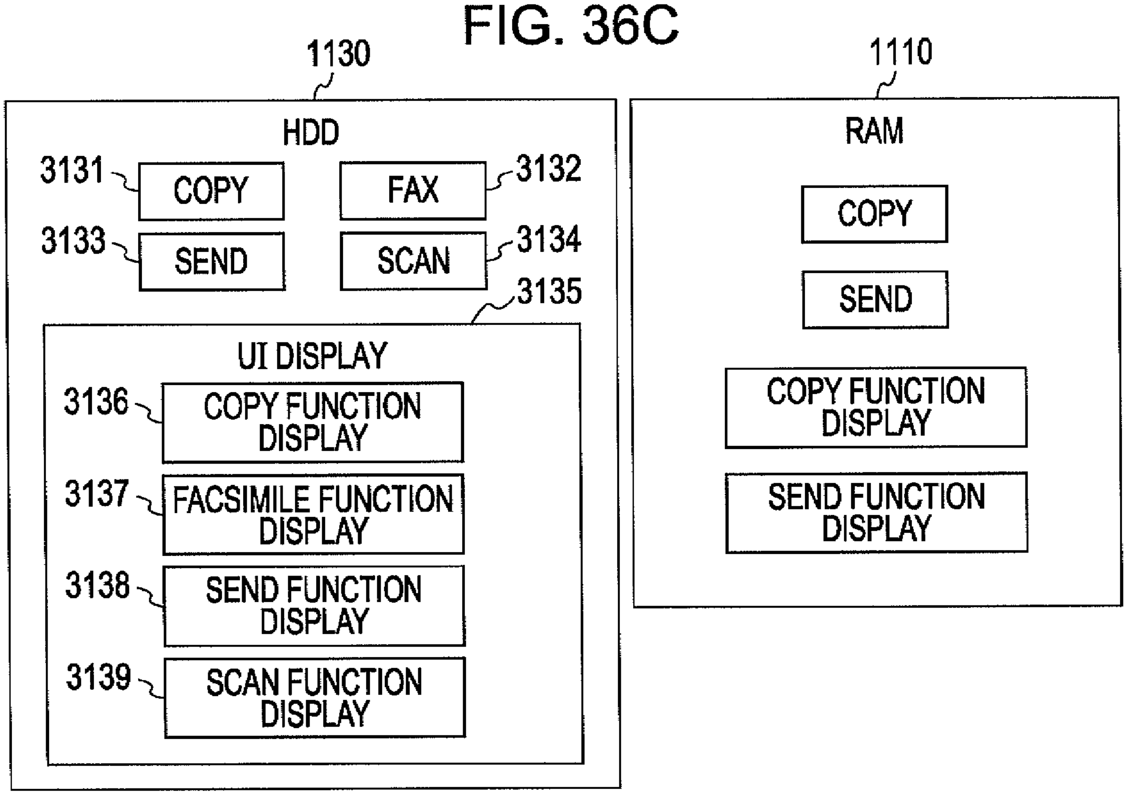
Figure 36D:
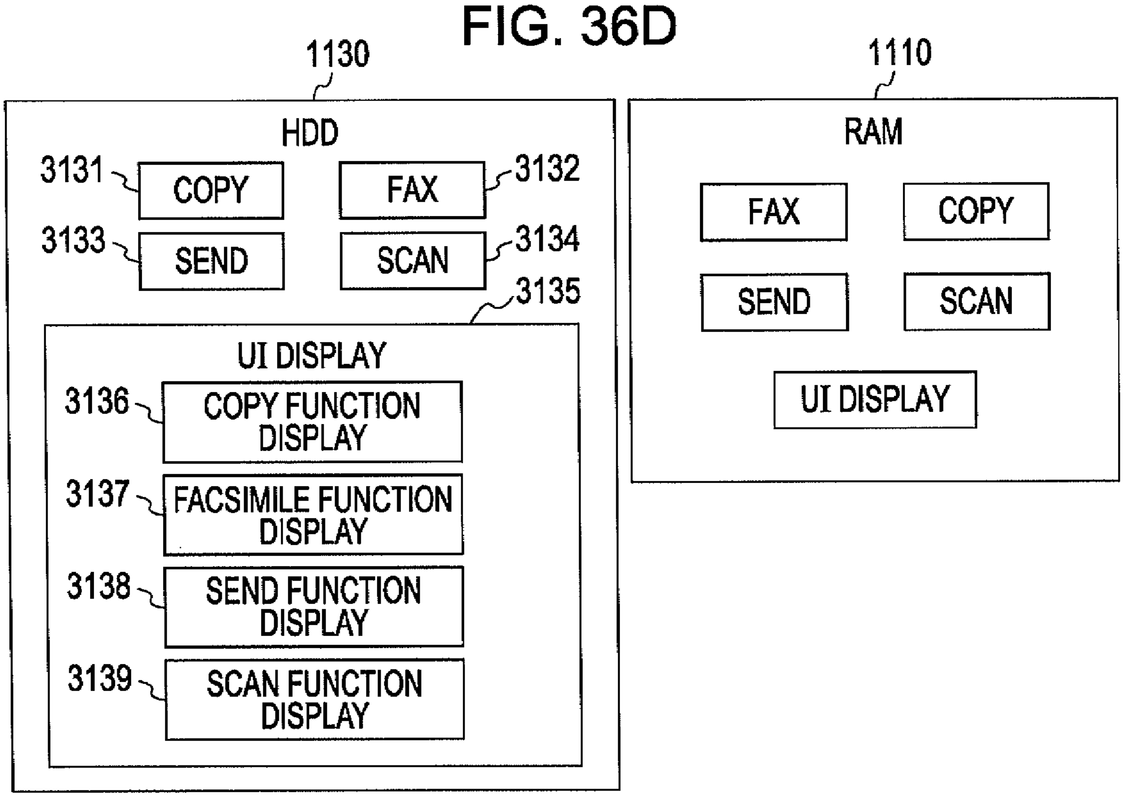

For example, in the checking of the statuses of the interfaces, if it is determined that there is a document placed on the document feeder 160, the local I/F 1210 is connected to the host PC 30, and the modem 1220 is connected to the PSTN 60, the copy program and the send program are preferentially loaded into the RAM 1110. That is, in step S1114 in the flow chart shown in FIG. 37, the status of the RAM 1110 becomes as shown in FIG. 36C, and thus the copy function and the send function become usable in the priority mode.

When the MFP 10 has the printing capability, if it is detected that the USB port is connected to a device, the printer program may be loaded into the RAM 1110. For example, a removable memory such as a USB memory is connected to the USB port, the loading of the printer program into the RAM 1110 makes it possible to print image data stored in the removable memory, that is, direct printing is possible.

It may be allowed to define, by operating the input/display unit 2000, the order of priority in terms of loading function programs into the RAM 1110 depending on the statuses of the respective physical interfaces. This operation may be allowed only for particular persons such as an administrator of the MFP 10.

In the present embodiment, as described above, when the power of the MFP 10 is turned on, various units used to perform functions, such as the document feeder 160 and the interfaces (the local interface, the PSTN, etc.) are checked to determine the status thereof, and the order of loading the function programs are controlled in accordance with the detected statuses of the units. This makes it possible to load a program of a function highly likely to be used by a user in preference to the other programs, and thus a user is allowed to use the MFP 10 for his/her purpose without having to wait for a long time.

In the respective embodiments described above, the process performed in response to turning-on of the power of the MFP 10 may also be performed in a similar manner when the MFP 10 is resumed from the low-power standby state (the sleep state).

The data format and/of the data content are not limited to those described above, but they may be modified depending on purposes or situations.

The present invention may be achieved in various forms such as a system, an apparatus, a method, a program, a storage medium, etc. For example, the present invention may be applied to a singly-installed independent apparatus or a system including a plurality of apparatuses.

Now, referring to FIG. 38, an explanation is given in terms of a memory map of a storage medium that stores various data processing programs readable by an image processing apparatus (MFP 10) according to an embodiment of the present invention.

FIG. 38 is a diagram showing a memory map of a storage medium that stores various data processing programs readable by an image processing apparatus (MFP 10) according to an embodiment of the present invention.

Other Exemplary Embodiments

Note that in addition to information shown in FIG. 38, information for managing the programs stored in the storage medium, such as information indicating the version, a producer, or the like, and/or other additional information, such as icons indicating respective programs, depending on an operating system (OS) that reads the programs may also be stored in the storage medium.

Data associated with respective programs are also managed by directories. A program for installing a program on a computer may also be stored on the storage medium. When a program to be installed is stored in a compressed form, a program for decompressing the program may also be stored on the storage medium.

The functions according to any embodiment of the present invention, described above with reference to FIG. 6, FIG. 7A, FIG. 7B, FIG. 12, FIG. 13, FIG. 18, FIG. 22, FIG. 23, FIG. 28, FIG. 29, FIG. 33, or FIG. 37, may be realized by installing a program from the outside and executing it on a host computer. In this case, information including the program according to the present invention may be supplied to the host computer from a storage medium such as a CD-ROM, a flush memory, or an FD, or from an external storage medium via a network.

The present invention may also be achieved by providing to a system or an apparatus a storage medium having software program code stored thereon for implementing the functions disclosed in the embodiments described above and by reading and executing the program code on a computer (or a CPU or an MPU) disposed in the system or the apparatus.

In this case, the program code read from the storage medium implements the novel functions disclosed in the embodiments described above, and the storage medium on which the program code is stored falls within the scope of the present invention.

In this case, there is no particular restriction on the form of the program as long as it functions as a program. That is, the program may be realized in various forms such as an object code, a program executed by an interpreter, script data supplied to an operating system, etc.

Storage media which can be preferably employed in the present invention to supply the program code include a floppy disk, a hard disk, an optical disk, a magneto-optical disk, a CD-ROM disk, a CD-R disk, a CD-RW disk, a magnetic tape, a non-volatile memory card, a ROM, and a DVD disk.

In this case, the program code read from the storage medium implements the functions disclosed in the embodiments described above, and the storage medium on which the program code is stored falls within the scope of the present invention.

The program may also be supplied such that the computer is connected to an Internet Web site via a browser, and a computer program according any embodiment of the present invention is downloaded into a storage medium such as a hard disk of the computer. In this case, the program downloaded from an Internet Web site into the storage medium such as a hard disk may be in a compressed form. The program code of the program according an embodiment of the present invention may be divided into a plurality of files, and respective files may be downloaded from different Web sites. Thus, a WWW server, an ftp server and similar servers that provide a program or a file that allows the functions according to an embodiment of the present invention to be implemented on a computer also fall within the scope of the present invention.

The program according to the present invention may be stored in an encrypted form on a storage medium such as a CD-ROM and may be distributed to users. Particular authorized users are allowed to download key information used to decrypt the encrypted program from a Web site via the Internet. The decrypted program may be installed on a computer thereby achieving the functions according to an embodiment of the present invention.

The functions disclosed in the embodiments may be implemented not only by executing the program code on a computer, but part or all of the process may be performed by an operating system or the like running on the computer in accordance with a command issued by the program code. Such implementation of the functions also falls within the scope of the present invention.

To implement one or more functions according to any of the above-described embodiments of the invention, the program stored on a storage medium may be loaded into a memory of a function expand board inserted in a computer or into a memory of an extension unit connected to the computer, and part or all of the process may be performed by a CPU disposed on the extension card or the extension unit in accordance with the loaded program code. Note that such implementation of the functions also falls within the scope of the present invention.

The present invention may be applied to a singly-installed independent apparatus or a system including a plurality of apparatuses. The present invention may also be achieved by supplying a program to a system or an apparatus. In this case, the invention is implemented in the system or the apparatus by reading the software program from a storage medium and executing the program.

While the present invention has been described with reference to exemplary embodiments, it is to be understood that the invention is not limited to the disclosed exemplary embodiments. That is, various modifications or various combination of techniques disclosed in the respective embodiments described above are possible without departing from the spirit and the scope of the invention. The scope of the following claims is to be accorded the broadest interpretation so as to encompass all modifications, equivalent structures and functions.

This application claims the benefit of Japanese Application No. 20006-010655 filed Jan. 19, 2006, which is hereby incorporated by reference herein in its entirety.

What is claimed:

1. An image processing apparatus having a plurality of functions comprising:

a processor;

a memory;

a storage unit configured to store a plurality of split programs that are each individually bootable, wherein each of the plurality of split programs corresponds to each of the plurality of functions included in the image processing apparatus, and wherein by enabling the processor to execute one of the plurality of split programs loaded from the storage unit to the memory, a function corresponding to the loaded program becomes available;

a selection unit configured to, when power of the image processing apparatus is turned on or when operation of the image processing apparatus is resumed from a low-power standby state, select a function in accordance with a command issued by a user; and a control unit configured to perform control such that a program corresponding to the function selected by the selection unit is first loaded, in advance of the other programs from the plurality of split programs, from the storage unit to the memory and then the other programs from the plurality of split programs are loaded from the storage unit to the memory, wherein by the control performed by the control unit, the loaded program corresponding to the function selected by the selection unit is first executed based on immediate need as dictated by the selected function, by the processor in advance to the other programs and the function selected by the selection unit becomes available in advance to the other functions, wherein a user of the image processing apparatus is not required to input data into the image processing apparatus for setting a desired priority operation mode with respect to a preferred function.

2. The image processing apparatus according to claim 1, further including a setting unit configured to set the order of programs corresponding to the respective functions, wherein the control unit performs control such that the other programs from the plurality of split programs are loaded from the storage unit in the order set in the setting unit after the program corresponding to the function selected by the selection unit is loaded.

3. The image processing apparatus according to claim 1, wherein the selection unit is adapted to issue a command to turn on the power of the image processing apparatus or resume the image processing apparatus from the low-power standby state.

4. The image processing apparatus according to claim 1, wherein the selection unit is configured to arbitrarily select one of the functions independently.

5. The image processing apparatus according to claim 1, wherein the selection unit is configured to select a plurality of functions.

6. A method of controlling an image processing apparatus having a plurality of functions and comprising a processor, a memory and a storage unit configured to store a plurality of split programs that are each individually bootable, wherein each of the plurality of split programs corresponds to each of the plurality of functions, the method comprising:

selecting, when power of the image processing apparatus is turned on or when operation of the image processing apparatus is resumed from a low-power standby state, a function in accordance with a command issued by a user; and performing control such that a program corresponding to the selected function is first loaded, in advance of the other programs from the plurality of split programs, from the storage unit to the memory and then the other programs are loaded from the storage unit to the memory, wherein by the control, the loaded program corresponding to the selected function is first executed based on immediate need as dictated by the selected function, by the processor in advance to the other programs from the plurality of split programs and the selected function becomes available in advance to the other functions, wherein a user of the image processing apparatus is not required to input data into the image processing apparatus for setting a desired priority operation mode with respect to a preferred function.

7. A non-transitory computer readable medium containing computer-executable instructions for controlling an image processing apparatus having a plurality of functions and comprising a processor, a memory and a storage unit configured to a plurality of split programs that are each individually bootable, wherein each of the plurality of split programs corresponds to each of the plurality of functions, the computer readable medium comprising:

computer-executable instructions for selecting, when power of the image processing apparatus is turned on or when operation the image processing apparatus is resumed from a low-power standby state, a function in accordance with a command issued by a user; and computer-executable instructions for performing control such that a program corresponding to the selected function is first loaded, in advance of the other programs from the plurality of split programs, from the storage unit to the memory and then the other programs are loaded from the storage unit to the memory, wherein by the control, the loaded program corresponding to the selected function is first executed based on immediate need as dictated by the selected function, by the processor in advance to the other programs from the plurality of split programs and the selected function becomes available in advance to the other functions, wherein a user of the image processing apparatus is not required to input data into the image processing apparatus for setting a desired priority operation mode with respect to a preferred function.

* * * * *